(12) United States Patent
Zhou et al.

(10) Patent No.: US 12,225,459 B2
(45) Date of Patent: Feb. 11, 2025

(54) MULTIPLE-INPUT MULTIPLE-OUTPUT CAPABILITY INFORMATION FOR POWER SAVINGS

(71) Applicant: Ofinno, LLC, Reston, VA (US)

(72) Inventors: Hua Zhou, Vienna, VA (US); Esmael Hejazi Dinan, McLean, VA (US); Yunjung Yi, Vienna, VA (US); Ali Cagatay Cirik, Chantilly, VA (US); Youngwoo Kwak, Woodbury, NY (US); Hyukjin Chae, San Diego, CA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/599,935

(22) Filed: Mar. 8, 2024

(65) Prior Publication Data

US 2024/0357488 A1 Oct. 24, 2024

Related U.S. Application Data

(63) Continuation of application No. 17/945,834, filed on Sep. 15, 2022, now Pat. No. 11,930,450, which is a
(Continued)

(51) Int. Cl.
*H04B 7/0413* (2017.01)
*H04W 52/02* (2009.01)
*H04W 72/23* (2023.01)

(52) U.S. Cl.
CPC ...... *H04W 52/0209* (2013.01); *H04B 7/0413* (2013.01); *H04W 72/23* (2023.01)

(58) Field of Classification Search
CPC .......... H04W 52/0209; H04W 72/1289; H04B 7/0413; H04B 7/0486; H04L 5/0098; H04L 5/001
See application file for complete search history.

(56) References Cited

U.S. PATENT DOCUMENTS

2016/0295520 A1   10/2016   Dinan
2017/0231004 A1    8/2017   Babaei et al.
(Continued)

OTHER PUBLICATIONS

3GPP TS 38.211 V15.6.0 (Jun. 2019); Technical Specification; 3rd Generation Partnership Project; Technical Specification Group Radio Access Network; NR; Physical channels and modulation; (Release 15).
(Continued)

*Primary Examiner* — Fred A Casca
(74) *Attorney, Agent, or Firm* — Brett K. Gardner; Kavon Nasabzadeh; Jacob L. Mangan

(57) ABSTRACT

A wireless device transmits one or more maximum numbers of multiple-input multiple-output (MIMO) layers for reception of a physical downlink shared channel (PDSCH), of a cell, scheduled by downlink control information (DCI) from each transmit/receive point (TRP) of a plurality of TRPs of the cell. The wireless device receives one or more parameters indicating a first number of MIMO layers, for a first TRP of the plurality of TRPs of the cell, wherein the first number of MIMO layers is equal to or less than a first maximum number of MIMO layers, of the one or more maximum numbers of MIMO layers, corresponding to the first TRP. The wireless device receives one or more transport blocks with a second number of MIMO layers, wherein the second number is equal to or less than the first number.

20 Claims, 45 Drawing Sheets

Related U.S. Application Data continuation of application No. 17/383,804, filed on Jul. 23, 2021, now Pat. No. 11,470,550, which is a continuation of application No. PCT/US2020/048439, filed on Aug. 28, 2020.

(60) Provisional application No. 62/893,004, filed on Aug. 28, 2019.

(56) References Cited

U.S. PATENT DOCUMENTS

| | | | |
|---|---|---|---|
| 2019/0260428 A1 | 8/2019 | Hugl et al. | |
| 2019/0363843 A1 | 11/2019 | Gordaychik | |
| 2020/0359330 A1 | 11/2020 | Zacharias et al. | |
| 2021/0175935 A1 | 6/2021 | Kwon et al. | |
| 2022/0287025 A1* | 9/2022 | Jin | H04B 7/0413 |

OTHER PUBLICATIONS

3GPP TS 38.212 V15.6.0 (Jun. 2019); Technical Specification; 3rd Generation Partnership Project; Technical Specification Group Radio Access Network; NR; Multiplexing and channel coding; (Release 15).
3GPP TS 38.213 V15.6.0 (Jun. 2019); Technical Specification; 3rd Generation Partnership Project; Technical Specification Group Radio Access Network; NR; Physical layer procedures for control (Release 15).
3GPP TS 38.214 V15.6.0 (Jun. 2019); Technical Specification; 3rd Generation Partnership Project; Technical Specification Group Radio Access Network; NR; Physical layer procedures for data; (Release 15).
3GPP TS 38.321 V15.6.0 (Jun. 2019); Technical Specification; 3rd Generation Partnership Project; Technical Specification Group Radio Access Network; NR; Medium Access Control (MAC) protocol specification; (Release 15).
3GPP TS 38.331 V15.6.0 (Jun. 2019); Technical Specification; 3rd Generation Partnership Project; Technical Specification Group Radio Access Network; NR; Radio Resource Control (RRC) protocol specification; (Release 15).
3GPP TSG RAN WG1 Meeting #97; Reno, USA, May 13-17, 2019; Title: RAN1 Chairman's Notes.
R1-1908071; 3GPP TSG RAN WG1 Meeting #98; Prague, Czech Republic, Aug. 26-30, 2019; Agenda Item: 7.2.9.3; Source: Huawei, HiSilicon; Title: UE dynamic adaptation to the maximum number of MIMO layer; Document for: Discussion and Decision.
R1-1908172; 3GPP TSG RAN WG1 #98; Prague, Czech, Aug. 26-30, 2019; Source: vivo; Title: Discussion on UE adaptation to maximum number of MIMO layers; Agenda Item: 7.2.9.3; Document for: Discussion and Decision.
R1-1908200; 3GPP TSG RAN WG1 #98; Prague, Czech Republic, Aug. 26-30, 2019; Source: ZTE; Title: on UE Adaptation to Maximum number of MIMO Layer; Agenda Item: 7.2.9.3; Document for: Discussion/Decision.
R1-1908395; 3GPP TSG RAN WG1 Meeting #98; Prague, CZ, Aug. 26-30, 2019; Agenda Item: 7.2.9.3; Source: MediaTek Inc.; Title: Adaptation of maximum number of MIMO layers for UE Power Saving; Document for: Discussion and Decision.
R1-1908507; 3GPP TSG RAN WG1 #98; Prague, CZ, Aug. 26-30, 2019; Agenda Item: 7.2.9.3; Source: Samsung; Title: UE adaptation to maximum number of MIMO layers; Document for: Discussion/Decision.
R1-1908550; 3GPP TSG RAN WG1 Meeting #98; Prague, CZ, Aug. 26-30, 2019; Agenda Item: 7.2.9.3; Source: LG Electronics ; Title: Discussion on MIMO layer/number of antenna adaptation; Document for: Discussion and decision.
R1-1908607; 3GPP TSG RAN WG1 Meeting #98; Prague, CZ, Aug. 26-30, 2019; Source: CATT; Title: Power saving scheme with UE adaptation to maximum MIMO layer; Agenda Item: 7.2.9.3; Document for: Discussion and Decision.
R1-1908658; 3GPP TSG-RAN WG1 #98; Prague, CZ, Aug. 26-30, 2019; Source: Intel Corporation; Title: Discussion on UE adaptation to maximum number of MIMO layers; Agenda item: 7.2.9.3; Document for: Discussion and Decision.
R1-1908873; 3GPP TSG RAN WG1 #98; Prague, CZ, Aug. 26-30, 2019; Source: CMCC; Title: Discussion on per-BWP MIMO layer configuration; Agenda item: 7.2.9.3; Document for: Discussion & Decision.
R1-1908942; 3GPP TSG RAN WG1 Meeting #98; Prague, Czech, Aug. 26-Aug. 30, 2019; Agenda Item: 7.2.9.3; Source: Spreadtrum Communications; Title: Consideration on UE adaptation to maximum number of MIMO layers; Document for: Discussion and decision.
R1-1908978; 3GPP TSG RAN WG1 #98; Prague, CZ, Aug. 26-30, 2019; Source: Panasonic; Title: MIMO layer adaptation for NR power saving; Agenda Item: 7.2.9.3; Document for: Discussion.
R1-1909038; 3GPP TSG RAN WG1 #98; Prague, Czech Republic, Aug. 26-30, 2019; Agenda Item: 7.2.9.3; Source: InterDigital, Inc.; Title: MIMO Layer Adaptation for UE Power Saving; Document for: Discussion and Decision.
R1-1909060; 3GPP TSG RAN WG1 #98; Prague, CZ, Aug. 26-30, 2019; Agenda Item: 7.2.9.3; Source: Apple Inc.; Title: Maximum MIMO layer adaptation for UE power saving; Document for: Discussion, Decision.
R1-1909140; 3GPP TSG-RAN WG1 Meeting #98; Prague, Czech Republic, Aug. 26-30, 2019; Agenda Item: 7.2.9.3; Source: Ericsson; Title: MIMO layers configuration per BWP; Document for: Discussion and Decision.
R1-1909151; 3GPP TSG RAN WG1 #98; Prague, CZ, Aug. 26-30, 2019; Agenda Item: 7.2.9.3; Source: Motorola Mobility, Lenovo; Title: UE adaptation to maximum number of MIMO layers; Document for: Discussion.
R1-1909220; 3GPP TSG RAN WG1 #98; Prague, Czech, Aug. 26-30, 2019; Agenda Item: 7.2.9.3; Source: OPPO; Title: Discussion on UE adaptation to maximum number of MIMO layers; Document for: Discussion.
R1-1909277; 3GPP TSG-RAN WG1 #98; Prague, Czech Republic, Aug. 26-30, 2019; Agenda item: 7.2.9.3; Source: Qualcomm Incorporated; Title: Adaptation of maximum number of MIMO Layer; Document for: Discussion/ Decision.
R1-1909341; 3GPP TSG RAN WG1 meeting #98; Prague, Czech Republic, Aug. 26-30, 2019; Agenda item: 7.2.9.3; Source: Nokia, Nokia Shanghai Bell; Title: Adaptation of maximum number of DL MIMO layers; Document for: Discussion and Decision.
R2-1908777; 3GPP TSG-RAN WG2 Meeting #107; Prague, Czech Republic, Aug. 26-30, 2019; Agenda Item: 11.11.4; Source: OPPO; Title: MIMO layer adaptation for power saving; Document for: Discussion, Decision.
R2-1908891; 3GPP TSG-RAN WG2 Meeting #107; Prague, Czech Republic, Aug. 26-30, 2019; Source: CATT; Title: Per BWP configuration of maxMIMOLayer; Agenda Item: 11.11.4; Document for: Discussion and Decision.
R2-1909532; 3GPP TSG-RAN WG2 Meeting #107; Prague, Czech Republic, Aug. 26-30, 2019; Source: vivo; Title: Discussion on UE adaptation to maximum number of MIMO layers; Agenda Item: 11.11.4; Document for: Discussion and Decision.
R2-1909559; 3GPP TSG RAN WG2 Meeting #107; Prague, Czech Republic, Aug. 26-30, 2019; Agenda item: 11.11.4; Source: Intel Corporation; Title: MIMO and BWP adaptation; Document for: Discussion and decision.
R2-1909987; 3GPP TSG-RAN2 Meeting #107; Prague, Czech Republic, Aug. 26-30, 2019; Agenda Item: 11.11.4 MIMO layer adaptation; Source: Ericsson; Title: UE adaptation to maximum number of MIMO layers; Document for: Discussion and Decision.
R2-1910084; 3GPP TSG-RAN WG2 Meeting #107; Prague, Czech Republic, Aug. 26-30, 2019; Agenda Item: 11.11.4; Source: MediaTek Inc.; Title: On maximum number of MIMO layers; Document for: Discussion and decision.
R2-1910531; 3GPP TSG-RAN WG2 Meeting #107; Prague, Czech Republic, Aug. 26-30, 2019; Agenda item: 11.11.4; Source: Nokia, Nokia Shanghai Bell; Title: On MIMO layer adaptation; WID/SID: NR_UE_pow_sav-Core—Release 16; Document for: Discussion and Decision.

(56) References Cited

OTHER PUBLICATIONS

R2-1911008; 3GPP TSG-RAN2#107; Prague, Czech, Aug. 26-30, 2019; Agenda item: 11.11.4 (NR_UE_pow_sav-Core); Source: LG Electronics Inc.; Title: Multiple MIMO layer configuration for power saving; Document for: Discussion and Decision.

R2-1911247; 3GPP TSG-RAN2 Meeting#107; Prague, Czech Republic, Aug. 26-30, 2019; Agenda Item: 11.11.4; Source: Huawei, HiSilicon; Title: Discussion on MIMO layer adaptation; Document for: Discussion and decision.

R1-1911302; 3GPP TSG-RAN WG2 #107; Prague, Czech Republic, Aug. 26-30, 2019; Agenda item: 11.11.4; Source: Qualcomm Incorporated; Title: Adaptation of maximum number of MIMO Layer; WID/SID: FS_NR_UE_pow_sav; Document for: Discussion/Decision.

R2-1911354; 3GPP TSG-RAN WG2 Meeting #107; Prague, Czech Republic, Aug. 24-30, 2019; Agenda item: 11.11.4; Source: Samsung; Title: Support of BWP-based MIMO Layer Configurations; Document for: Discussion & Decision.

International Search Report and Written Opinion of the International Searching authority mailed Jan. 11, 2021, in International Application No. PCT/US2020/048439.

European Office Action, mailed Jan. 21, 2022, in European Patent Application No. 20768823.5.

R1-1906372; 3GPP TSG RAN WG1 Meeting #97; Reno, USA, May 13-May 17, 2019; Agenda Item: 7.2.9.2; Source: Spreadtrum Communications; Title: Discussion on cross-slot scheduling for UE power saving; Document for: Discussion and decision.

Extended European Search Report, mailed Jul. 19, 2023, in EP Patent Application No. 23152820.9.

R2-1911037; 3GPP TSG-RAN2 Meeting #107; Prague, Czech Republic, Aug. 26-30, 2019; CR-Form-v12.0; Change Request; 36.331 CR 4088; rev-; Current version: 15.6.0; Title: 36.331 CR for addressing overheating issue in EN-DC scenario—Option 1.

* cited by examiner

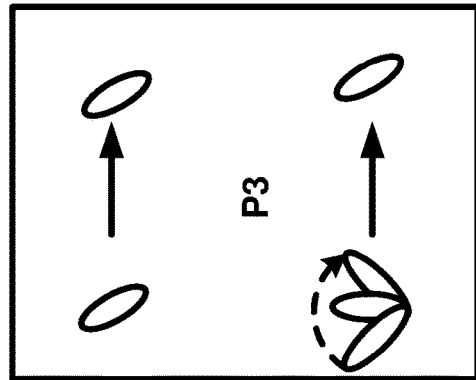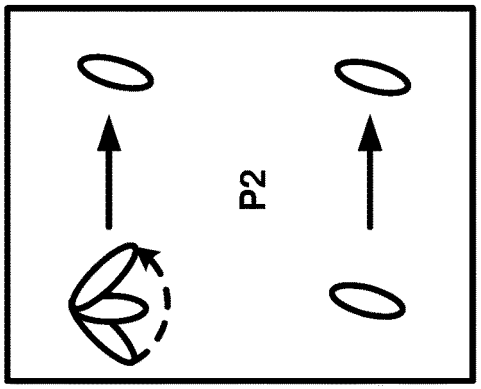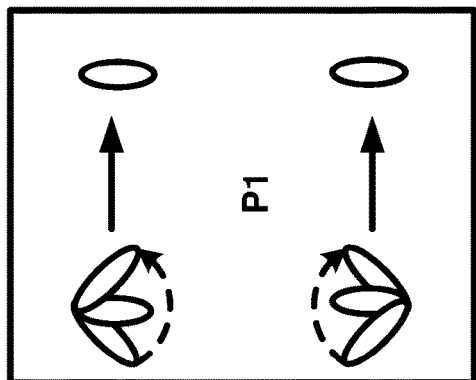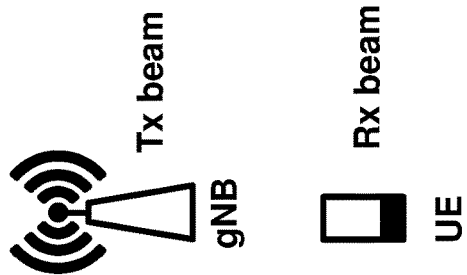
FIG. 12A
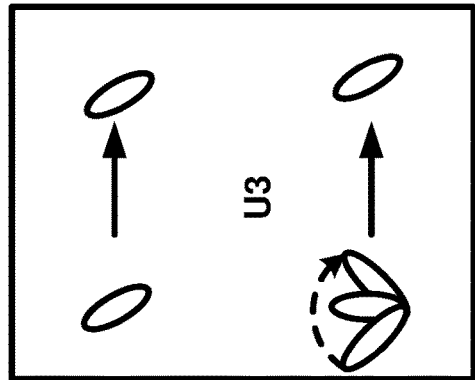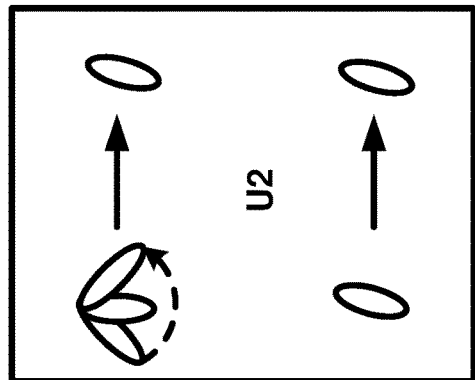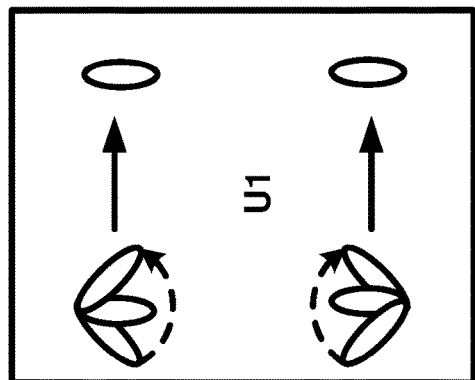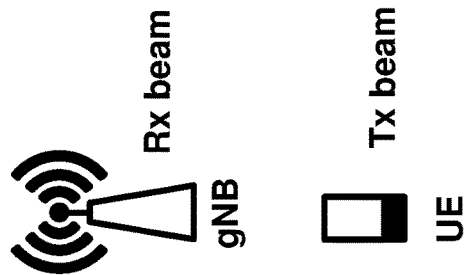
FIG. 12B

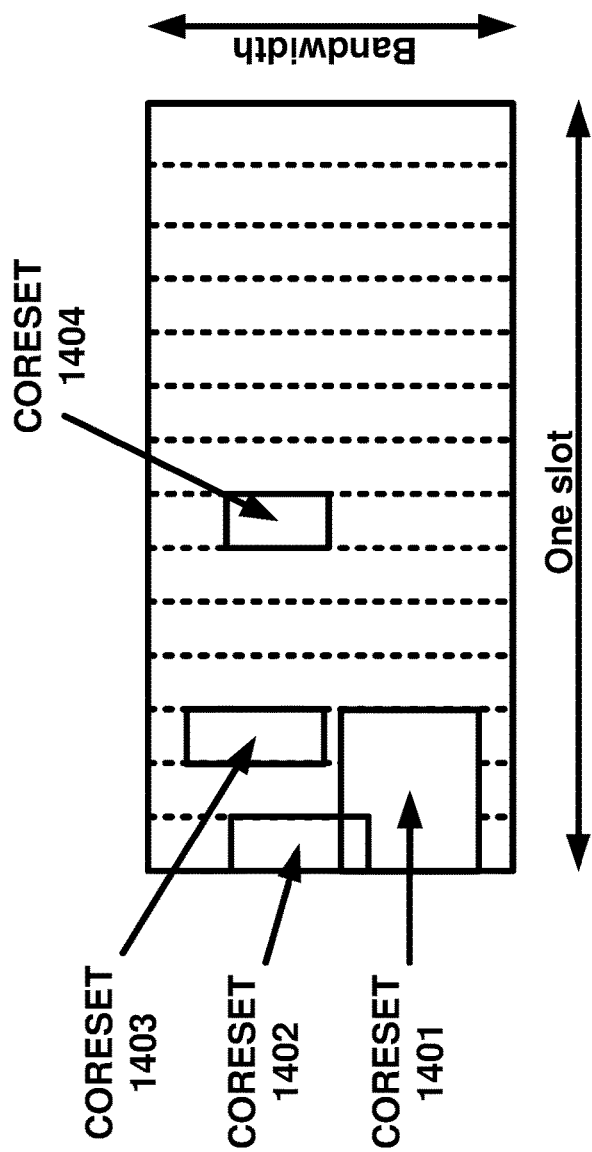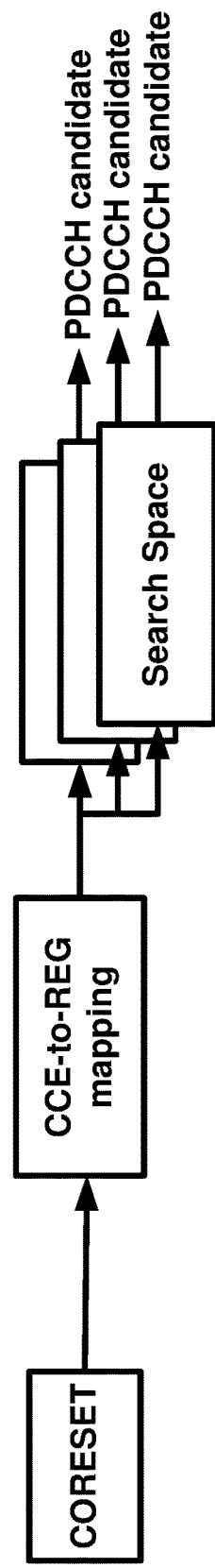
FIG. 14A
FIG. 14B

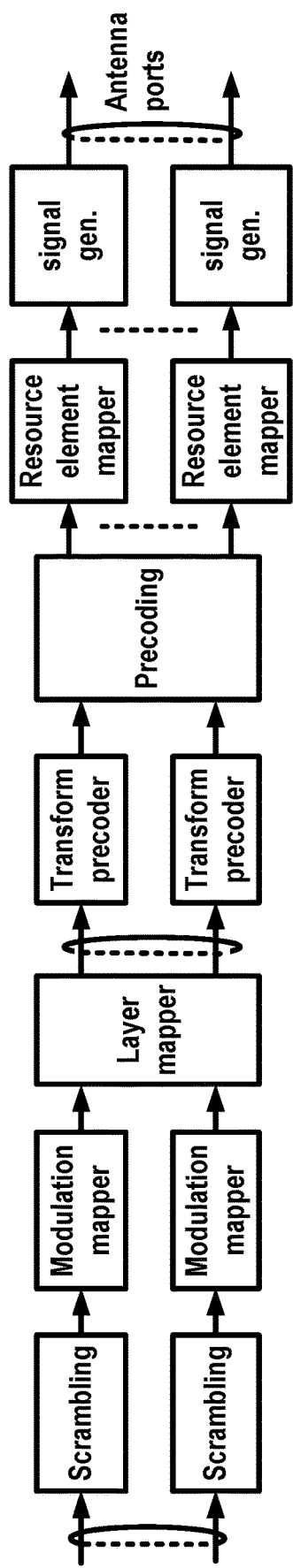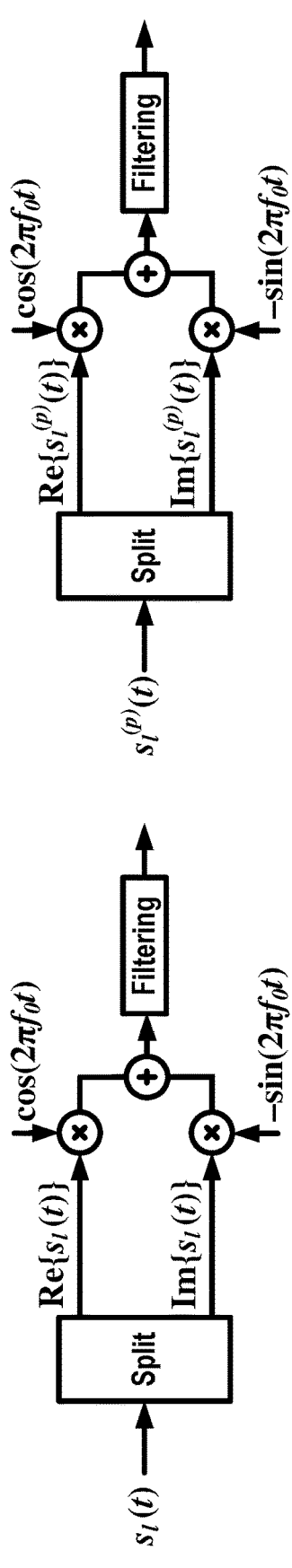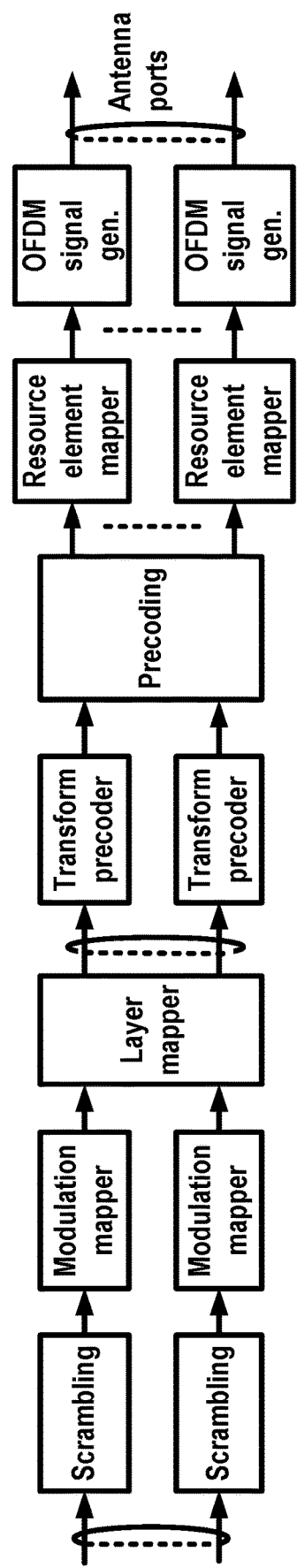
FIG. 16A
FIG. 16B
FIG. 16C
FIG. 16D

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

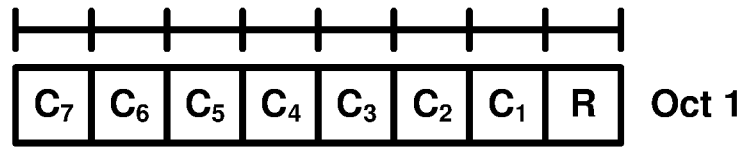
FIG. 22A
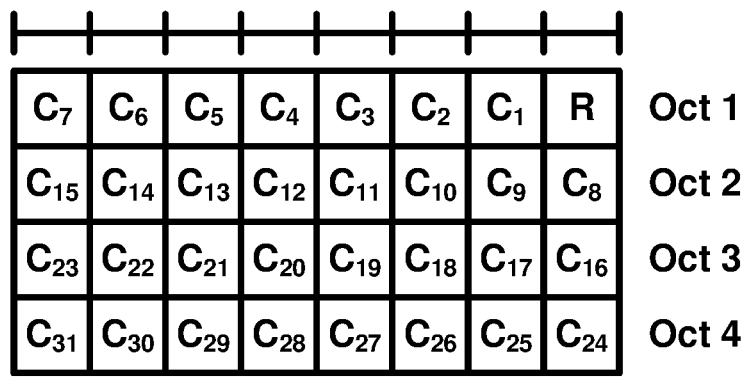
FIG. 22B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 22C – 
    *ServingCellConfig*
The IE *ServingCellConfig* is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.
    *ServingCellConfig* information element

```
ServingCellConfig ::=    SEQUENCE {
  tdd-UL-DL-ConfigurationDedicated  TDD-UL-DL-ConfigDedicated OPTIONAL,-- Cond TDD
  initialDownlinkBWP        BWP-DownlinkDedicated           OPTIONAL,  -- Need M
  downlinkBWP-ToReleaseList  SEQUENCE (SIZE (1..maxNrofBWPs)) OF BWP-Id OPTIONAL,-- Need N
  downlinkBWP-ToAddModList   SEQUENCE (SIZE (1..maxNrofBWPs)) OF BWP-Downlink    OPTIONAL,  -- Need N
  firstActiveDownlinkBWP-Id  BWP-Id  OPTIONAL,     -- Cond SyncAndCellAdd
  bwp-InactivityTimer        ENUMERATED {ms2, ...} OPTIONAL,  --Need R
  defaultDownlinkBWP-Id      BWP-Id  OPTIONAL,     -- Need S
  ...
  pdsch-ServingCellConfig    SetupRelease { PDSCH-ServingCellConfig } OPTIONAL,  -- Need M
  sCellDeactivationTimer     ENUMERATED {ms20, ms40, ...}   OPTIONAL,  -- Cond ServingCellWithoutPUCCH
  crossCarrierSchedulingConfig  CrossCarrierSchedulingConfig  OPTIONAL,-- Need M
  tag-Id                     TAG-Id,
  pathlossReferenceLinking   ENUMERATED {spCell, sCell} OPTIONAL,-- Cond CellOnly   ...,}
```

–
    *CrossCarrierSchedulingConfig*
The IE *CrossCarrierSchedulingConfig* is used to specify the configuration when the cross-carrier scheduling is used in a cell.
    *CrossCarrierSchedulingConfig* information element

```
CrossCarrierSchedulingConfig ::=   SEQUENCE {
  schedulingCellInfo          CHOICE {
    own                       SEQUENCE {             -- Cross carrier scheduling: scheduling cell
      cif-Presence            BOOLEAN
    },
    other                     SEQUENCE {             -- Cross carrier scheduling: scheduled cell
      schedulingCellId        ServCellIndex,
      cif-InSchedulingCell    INTEGER (1..7)  }  },  ...}
```

FIG. 25

—
SearchSpace
The IE SearchSpace defines how/where to search for PDCCH candidates. Each search space is associated with one ControlResourceSet. For a scheduled cell in the case of cross carrier scheduling, except for nrofCandidates, all the optional fields are absent.

SearchSpace information element

```
SearchSpace ::=            SEQUENCE {
    searchSpaceId          SearchSpaceId,
    controlResourceSetId   ControlResourceSetId   OPTIONAL,   -- Cond SetupOnly
    monitoringSlotPeriodicityAndOffset   CHOICE {
        sl1                NULL,
        sl2                INTEGER (0..1)
        ...
        duration           INTEGER (2..2559)                  OPTIONAL,           -- Cond Setup
        monitoringSymbolsWithinSlot   BIT STRING (SIZE (14))  OPTIONAL,   -- Need R
        nrofCandidates     SEQUENCE {
            aggregationLevel1  ENUMERATED {n0, n1, n2, n3, n4, n5, n6, n8},
            ...
        }                                                     OPTIONAL,   -- Cond Setup
        searchSpaceType    CHOICE {
            common         SEQUENCE {
                ...
            }                                                 OPTIONAL,   -- Need R
            ue-Specific    SEQUENCE {
                dci-Formats   ENUMERATED {formats0-0-And-1-0, formats0-1-And-1-1},
            }                                                 SEQUENCE {
                dci-Format0-0-AndFormat1-0   SEQUENCE {
                }
            }
        } OPTIONAL   -- Cond Setup
}
``` searchSpaceId

Identity of the search space. SearchSpaceId = 0 identifies the *searchSpaceZero* configured via PBCH (MIB) or *ServingCellConfigCommon* and may hence not be used in the SearchSpace IE. The searchSpaceId is unique among the BWPs of a Serving Cell. In case of cross carrier scheduling, search spaces with the same *searchSpaceId* in scheduled cell and scheduling cell are linked to each other. The UE applies the search space for the scheduled cell only if the DL BWPs in which the linked search spaces are configured in scheduling cell and scheduled cell are both active.

FIG. 26

– *PDSCH-ServingCellConfig*

The IE *PDSCH-ServingCellConfig* is used to configure UE specific PDSCH parameters that are common across the UE's BWPs of one serving cell.

PDSCH-ServingCellConfig information element

```
PDSCH-ServingCellConfig ::=           SEQUENCE {
    codeBlockGroupTransmission        SetupRelease { PDSCH-CodeBlockGroupTransmission }   OPTIONAL,  -- Need M
    xOverhead                         ENUMERATED { xOh6, xOh12, xOh18 }                   OPTIONAL,  -- Need S
    nrofHARQ-ProcessesForPDSCH        ENUMERATED {n2, n4, n6, n10, n12, n16}              OPTIONAL,  -- Need S
    pucch-Cell                        ServCellIndex                                       OPTIONAL,  -- Cond SCellAddOnly
    ...,
    [[ maxMIMO-Layers                 INTEGER (1..8)                                      OPTIONAL,  -- Need M
       processingType2Enabled         BOOLEAN                                             OPTIONAL,  -- Need M
    ]]
}
```

*maxMIMO-Layers*

Indicates the maximum MIMO layer to be used for PDSCH in all BWPs of this serving cell.

*pucch-Cell*

The ID of the serving cell (of the same cell group) to use for PUCCH. If the field is absent, the UE sends the HARQ feedback on the PUCCH of the SpCell of this cell group, or on this serving cell if it is a PUCCH SCell.

FIG. 27

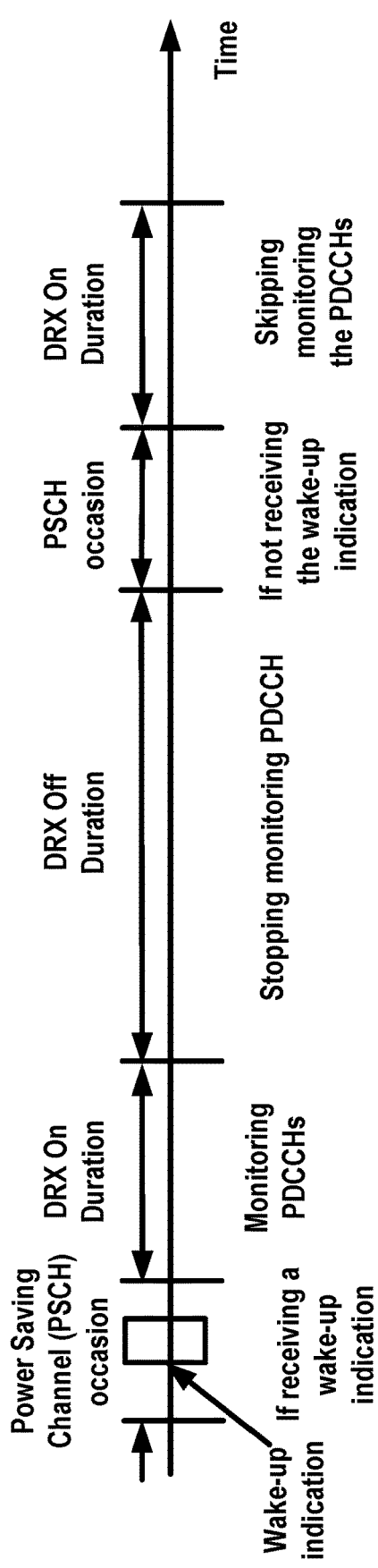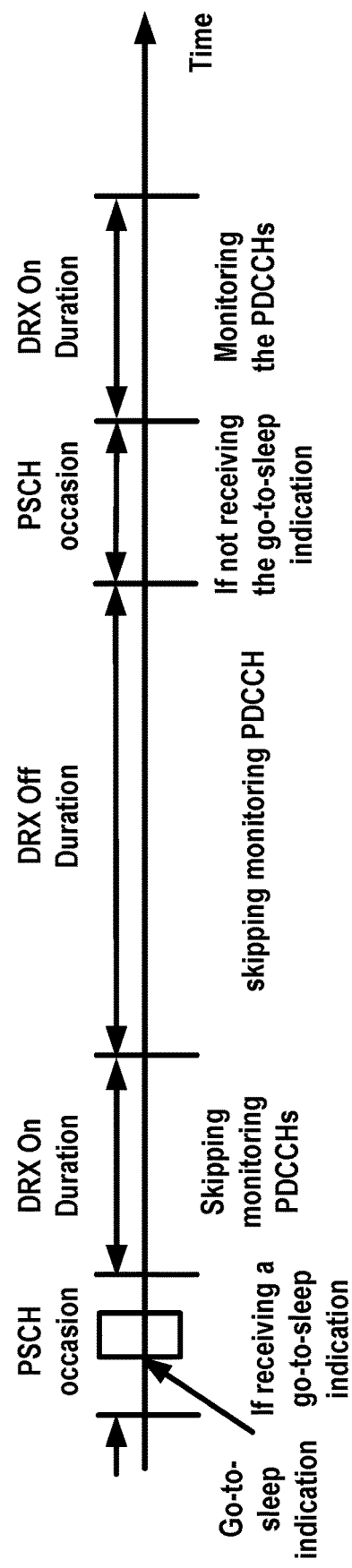
FIG. 30A
FIG. 30B

MULTIPLE-INPUT MULTIPLE-OUTPUT CAPABILITY INFORMATION FOR POWER SAVINGS

CROSS-REFERENCE TO RELATED APPLICATIONS

This application is a continuation of U.S. patent application Ser. No. 17/945,834, filed Sep. 15, 2022, which is a continuation of U.S. patent application Ser. No. 17/383,804, filed Jul. 23, 2021, which is a continuation of International Application No. PCT/US2020/048439, filed Aug. 28, 2020, which claims the benefit of U.S. Provisional Application No. 62/893,004, filed Aug. 28, 2019, all of which are hereby incorporated by reference in their entireties.

BRIEF DESCRIPTION OF THE DRAWINGS

Examples of several of the various embodiments of the present disclosure are described herein with reference to the drawings.

FIG. 12A and FIG. 12B respectively illustrate examples of three downlink and uplink beam management procedures.

FIG. 14A illustrates an example of CORESET configurations for a bandwidth part.

FIG. 14B illustrates an example of a CCE-to-REG mapping for DCI transmission on a CORESET and PDCCH processing.

FIG. 16A, FIG. 16B, FIG. 16C, and FIG. 16D illustrate example structures for uplink and downlink transmission.

FIG. 19 shows an example of multiple LCIDs of downlink.

FIG. 20 shows an example of multiple LCIDs of uplink.

FIG. 22A, FIG. 22B, and FIG. 22C show examples of SCell hibernation MAC CEs.

FIG. 25 illustrates an RRC message for cell configuration, according to some embodiments.

FIG. 26 illustrates an RRC message for search space configuration, according to some embodiments.

FIG. 27 illustrates an RRC message for PDSCH configuration, according to some embodiments.

FIG. 30A and FIG. 30B illustrates a power saving mechanism, according to some embodiments.

DETAILED DESCRIPTION

Figure 1A:
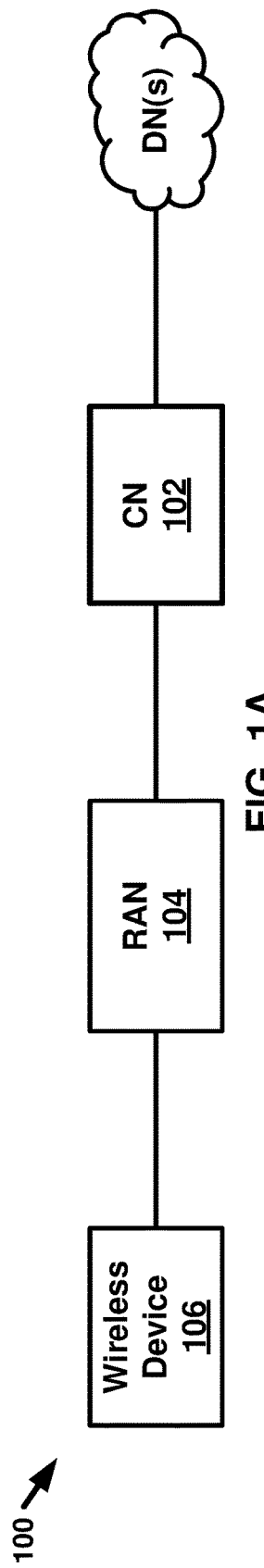
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
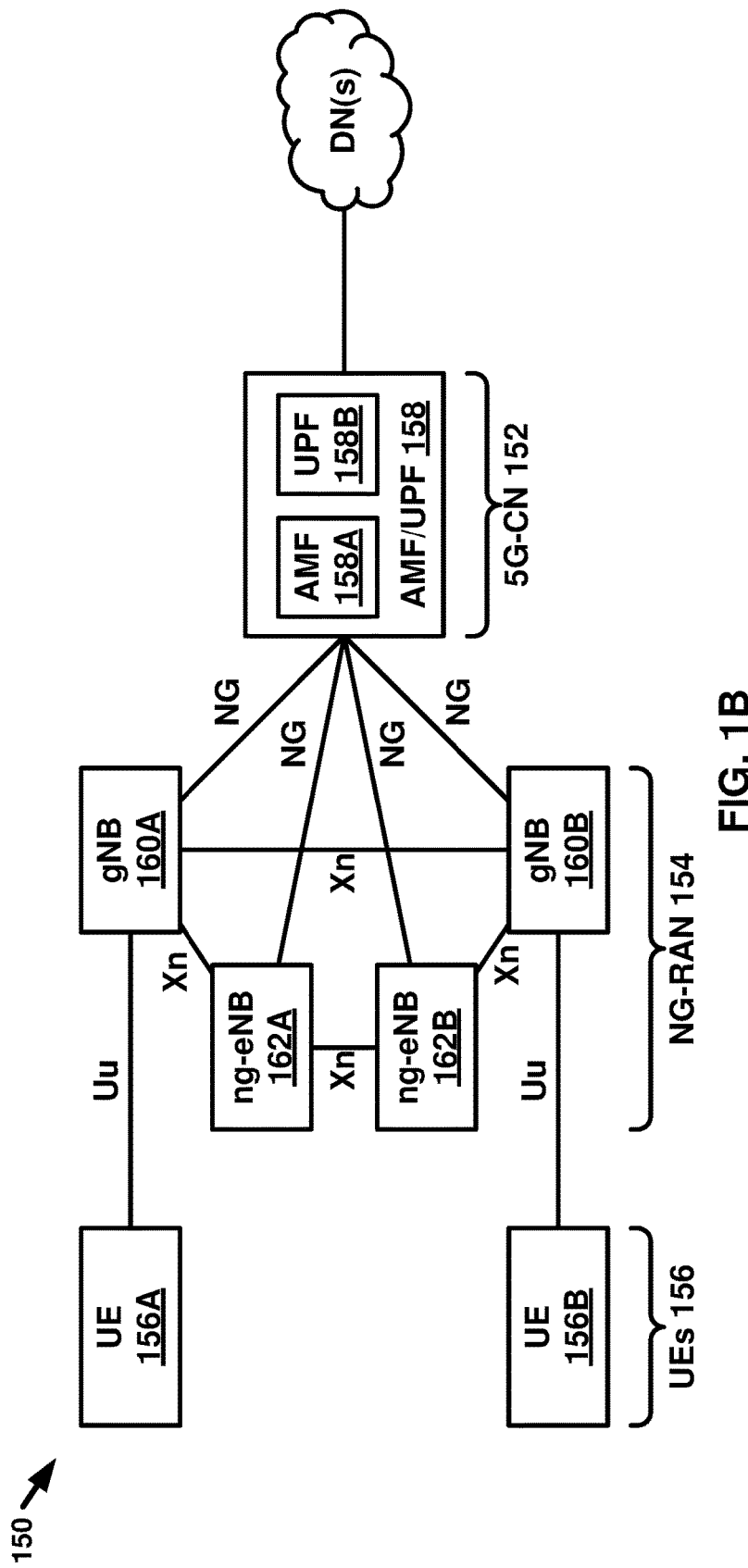

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
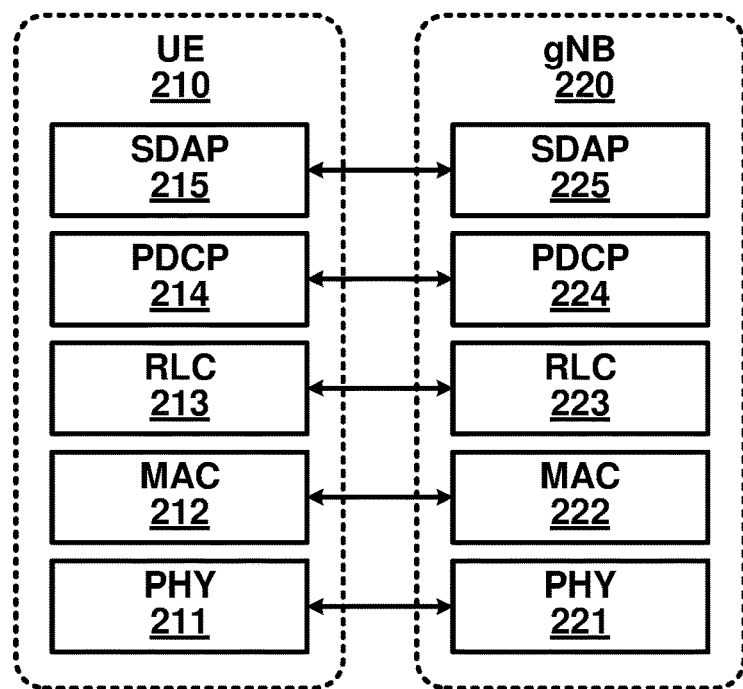
FIG. 2A and FIG. 2B respectively illustrate a New Radio (NR) user plane and control plane protocol stack.
Figure 2B:
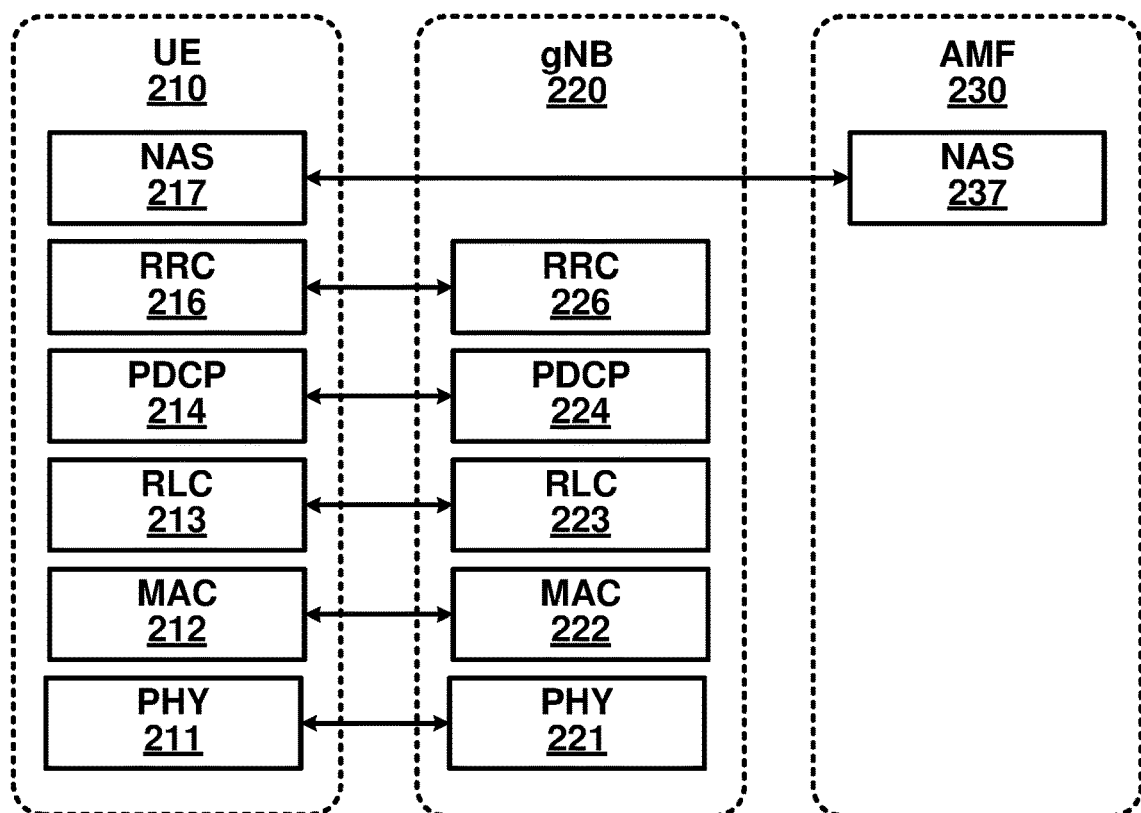

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
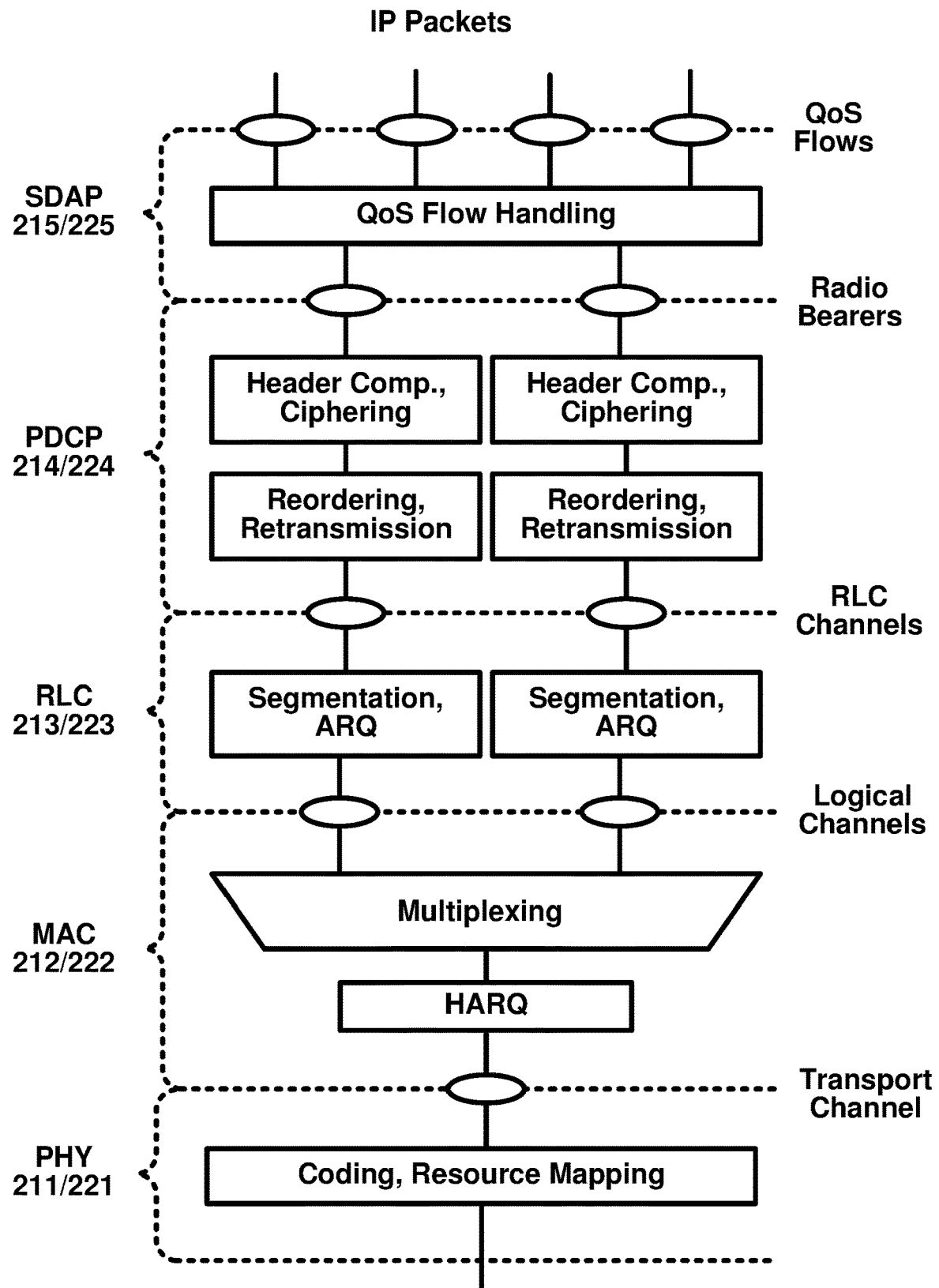
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
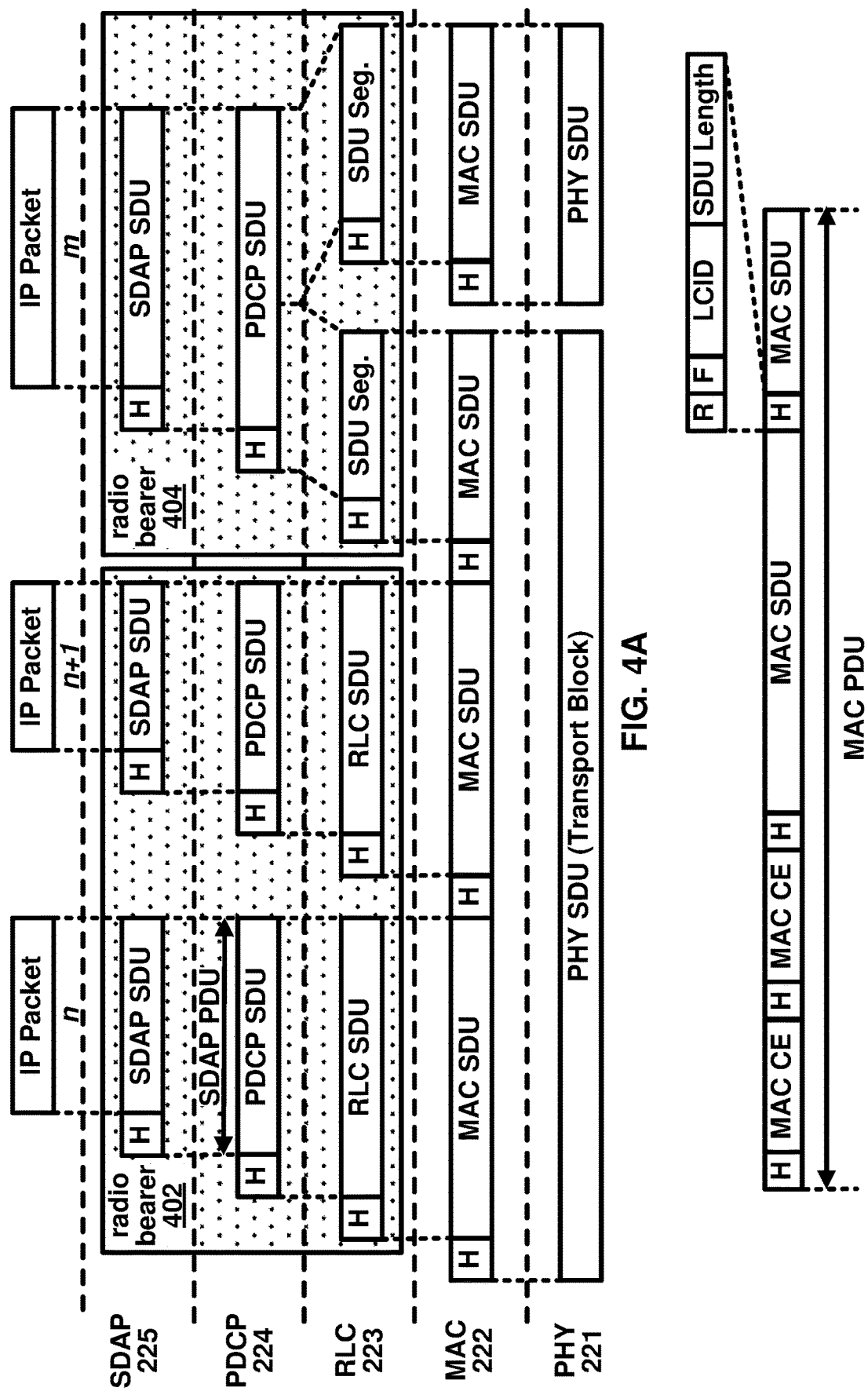
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
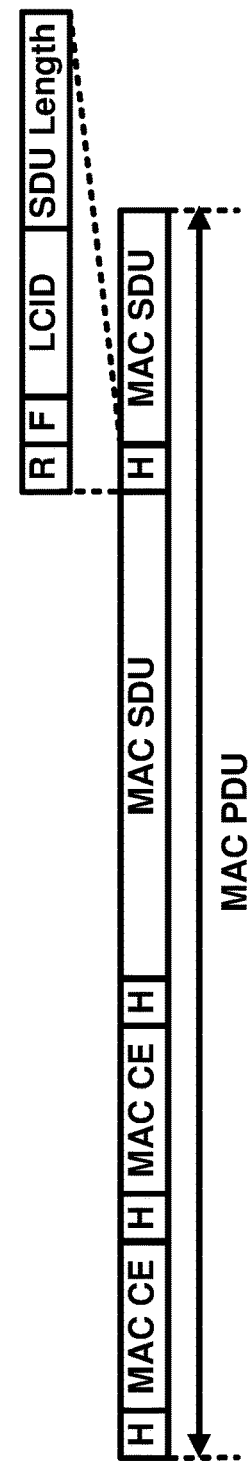
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
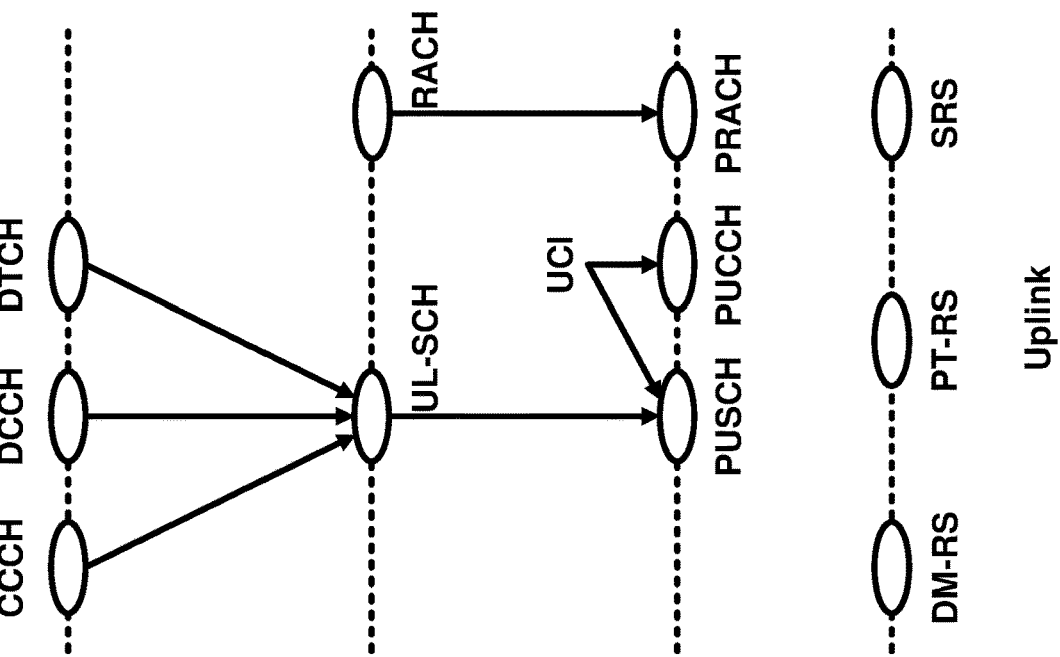
FIG. 5A and FIG. 5B respectively illustrate a mapping between logical channels, transport channels, and physical channels for the downlink and uplink.
Figure 5A:
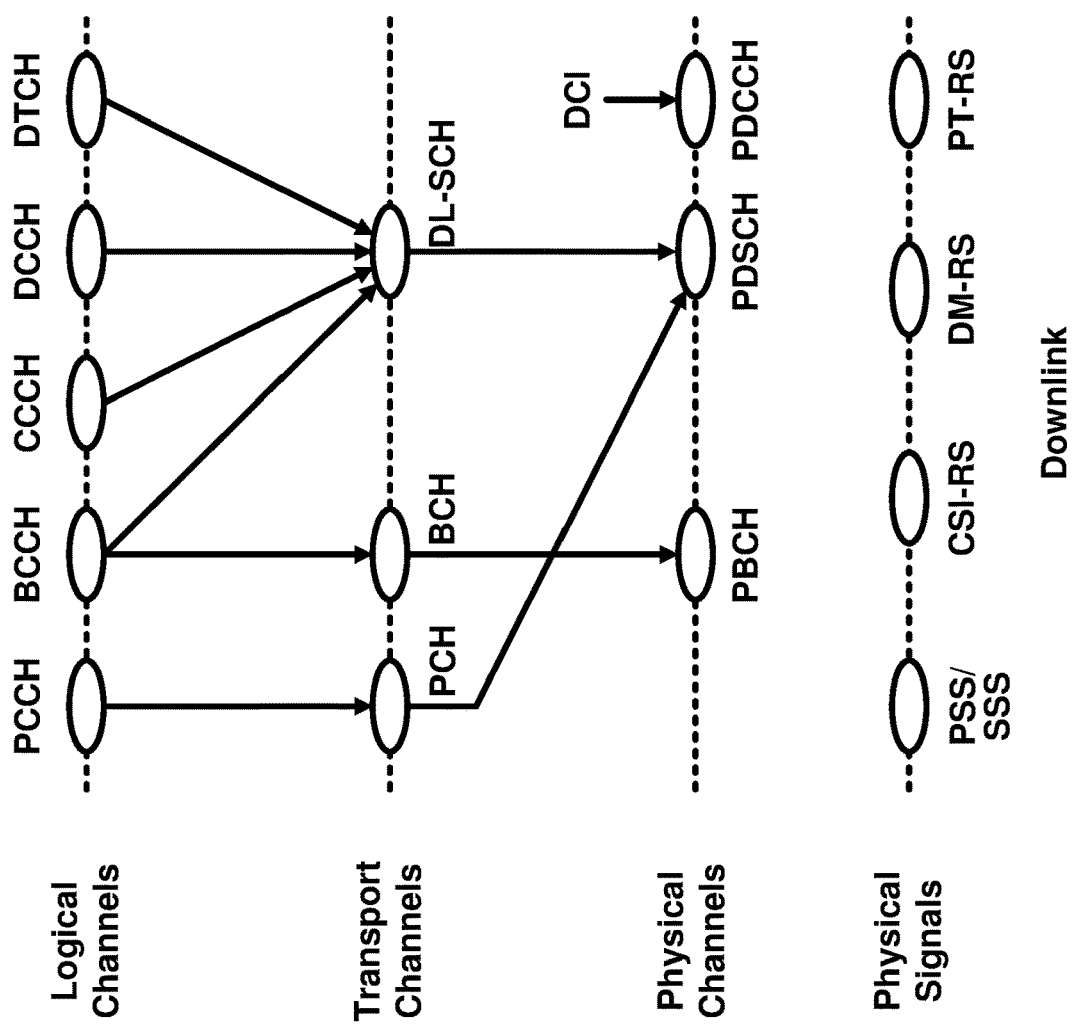

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
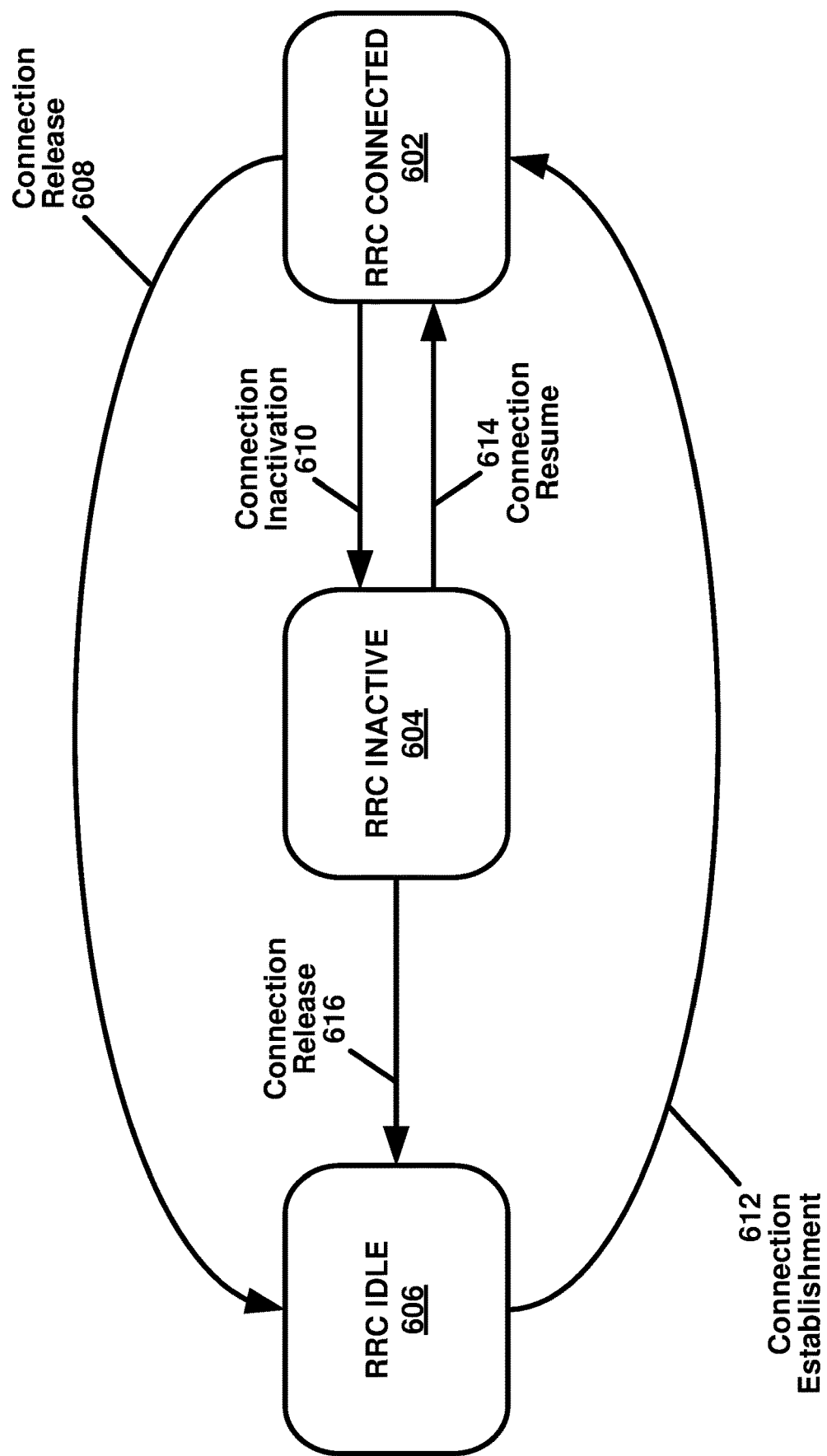
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
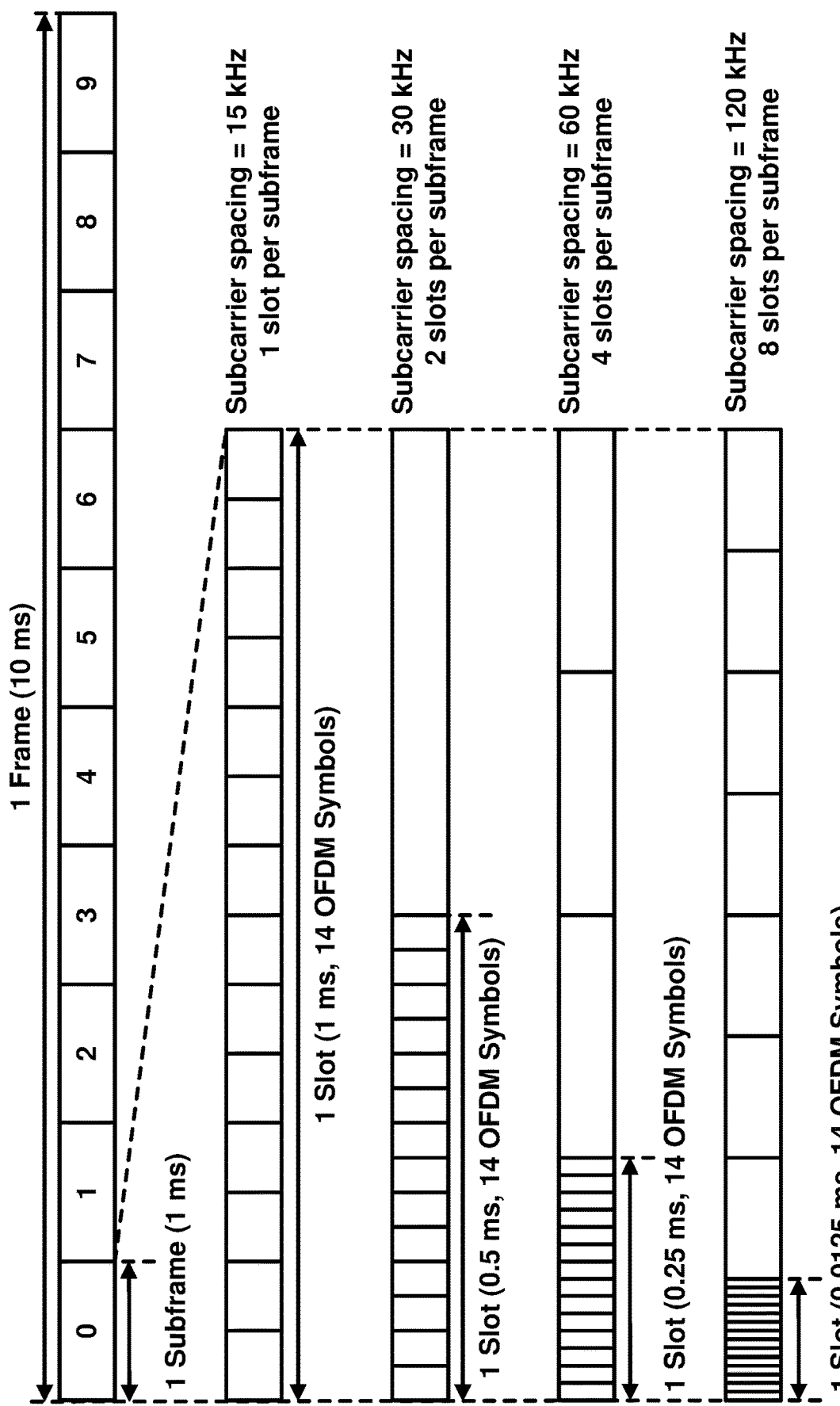
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHZ up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 KHz/2.3 µs; 60 KHz/1.2 µs; 120 KHz/0.59 µs; and 240 KHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
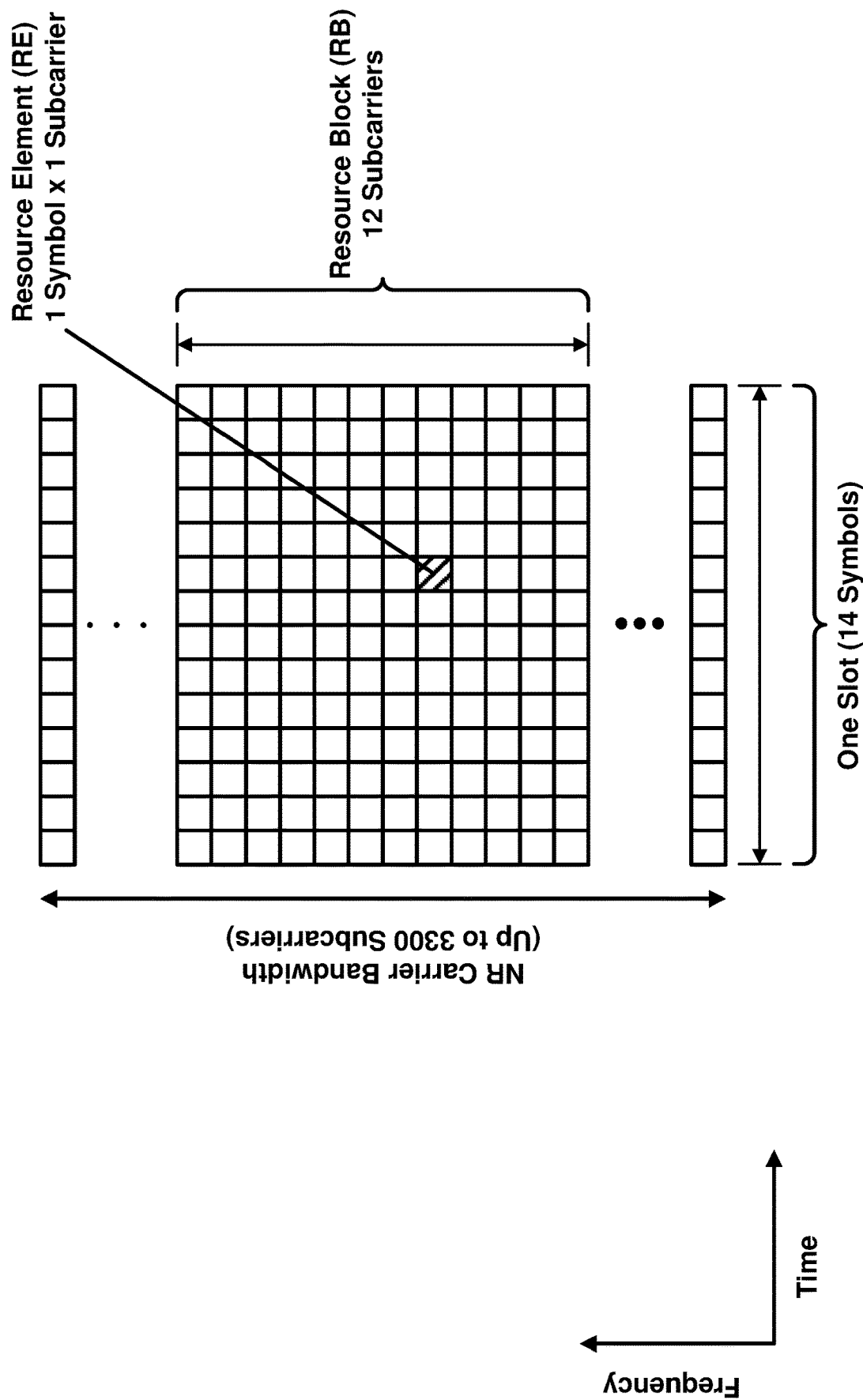
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 KHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
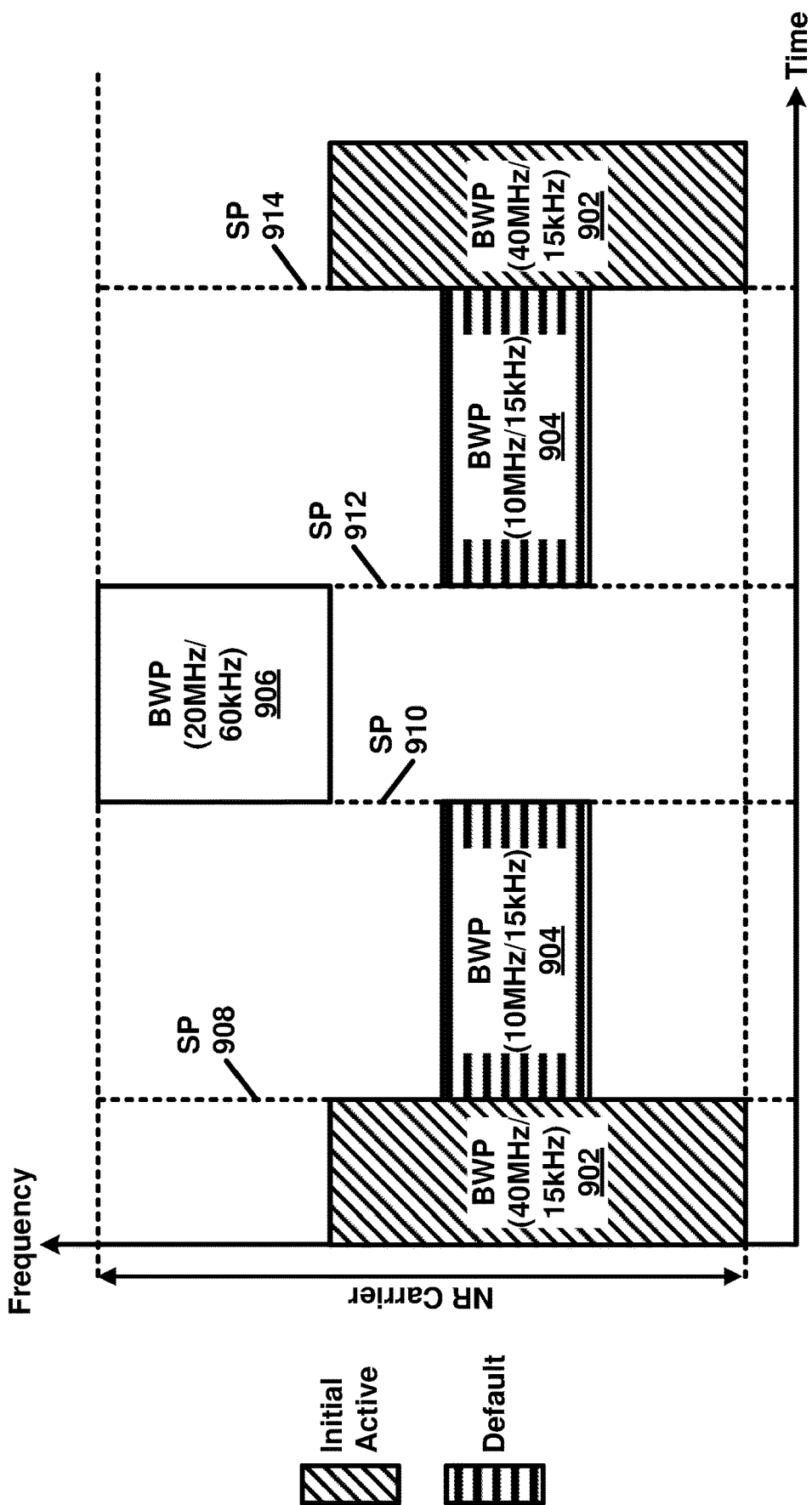
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP

906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
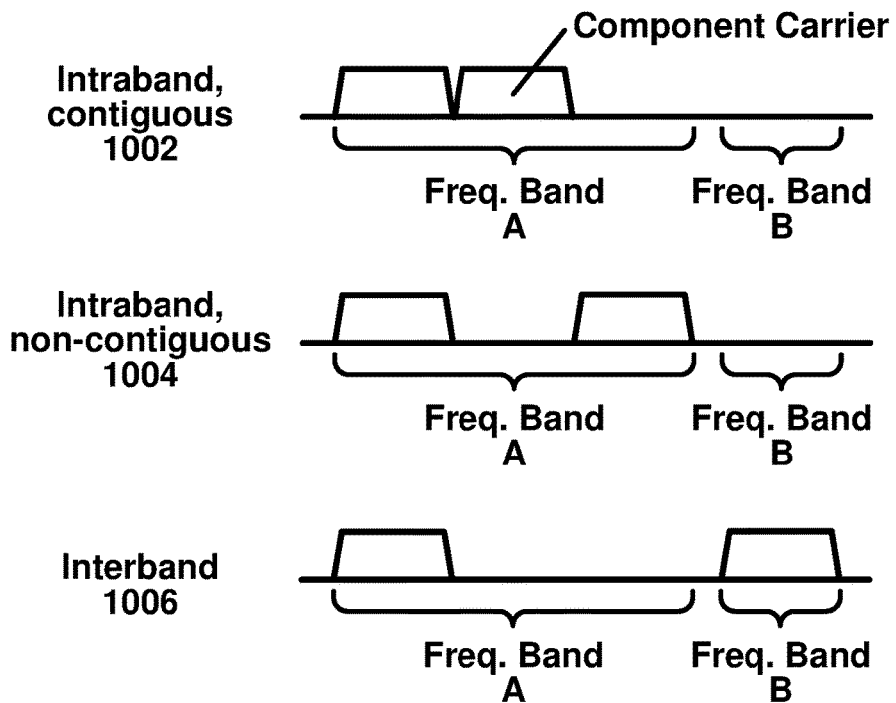
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
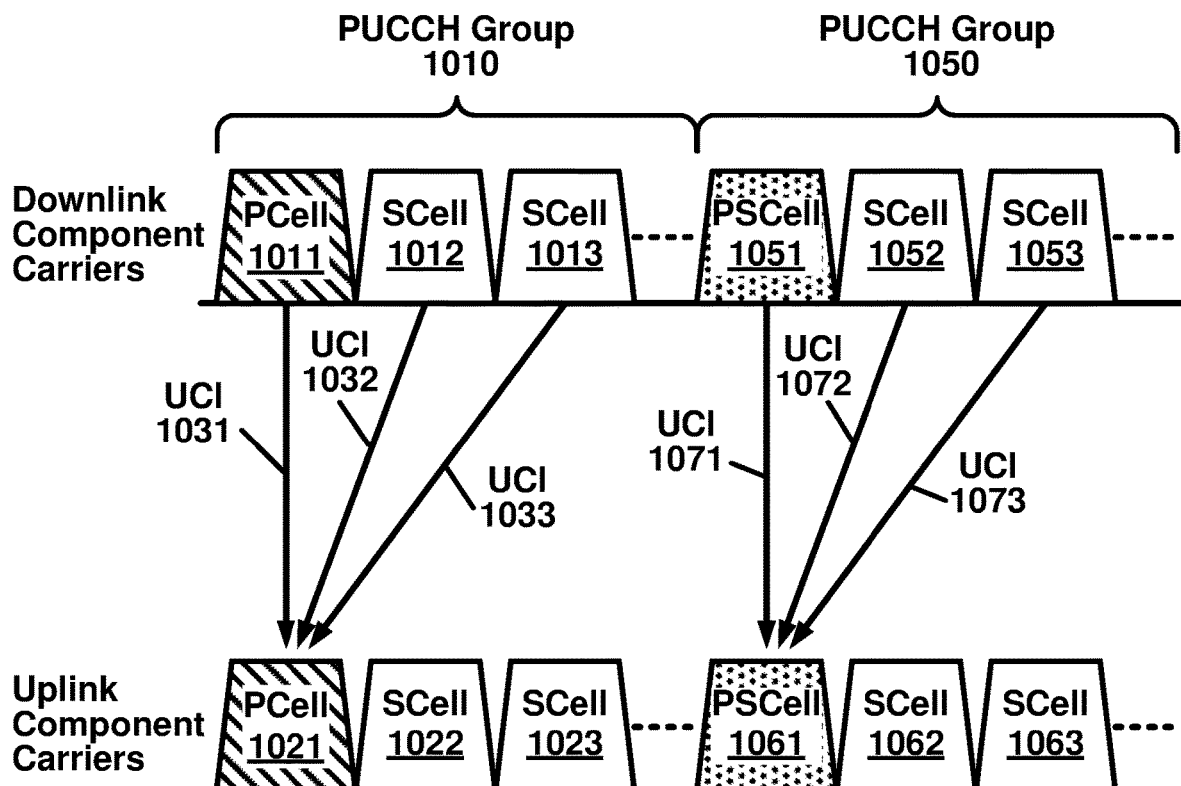
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
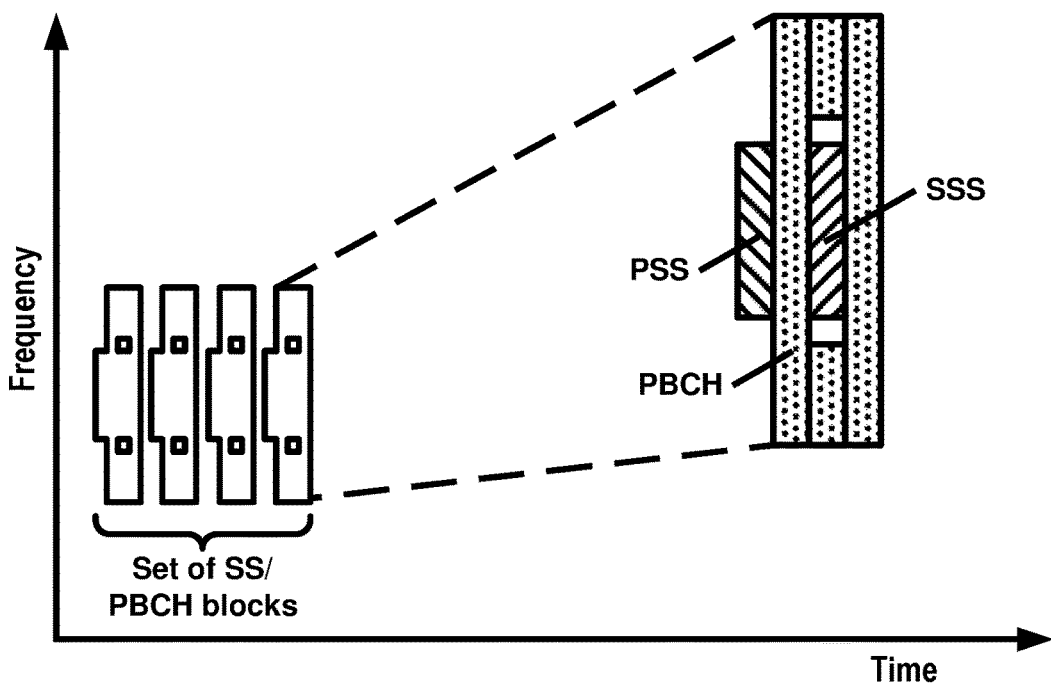
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
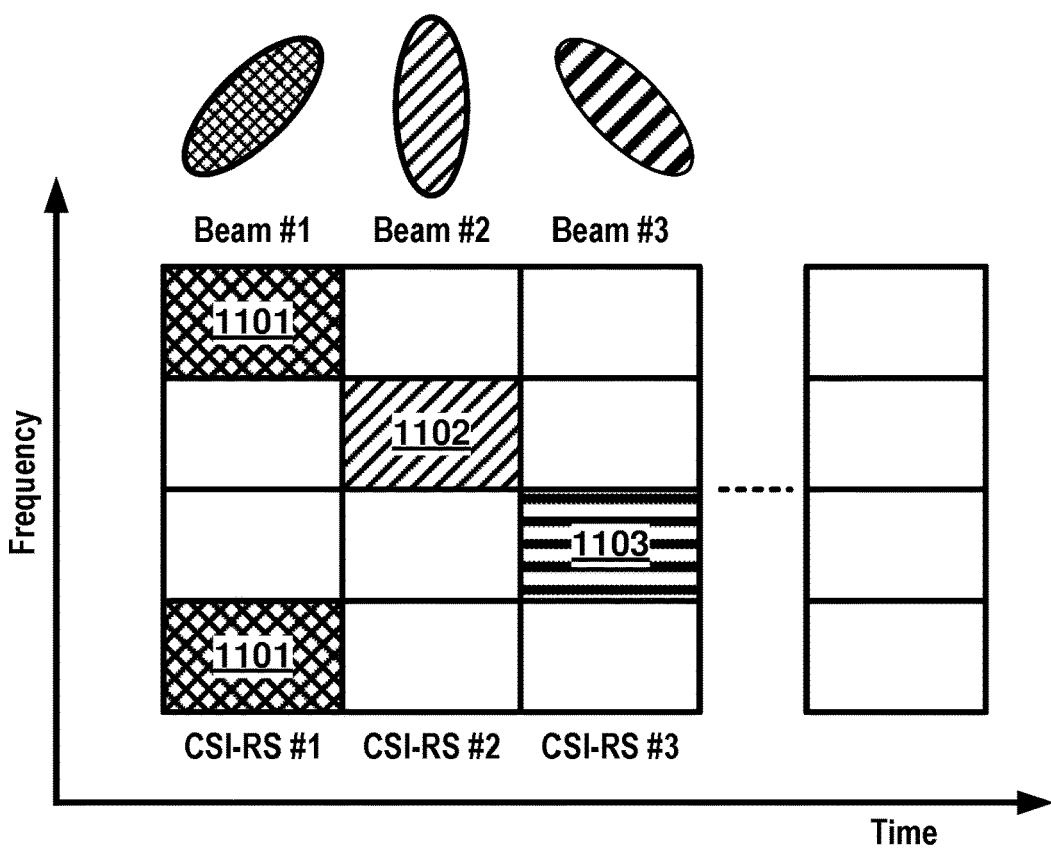
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
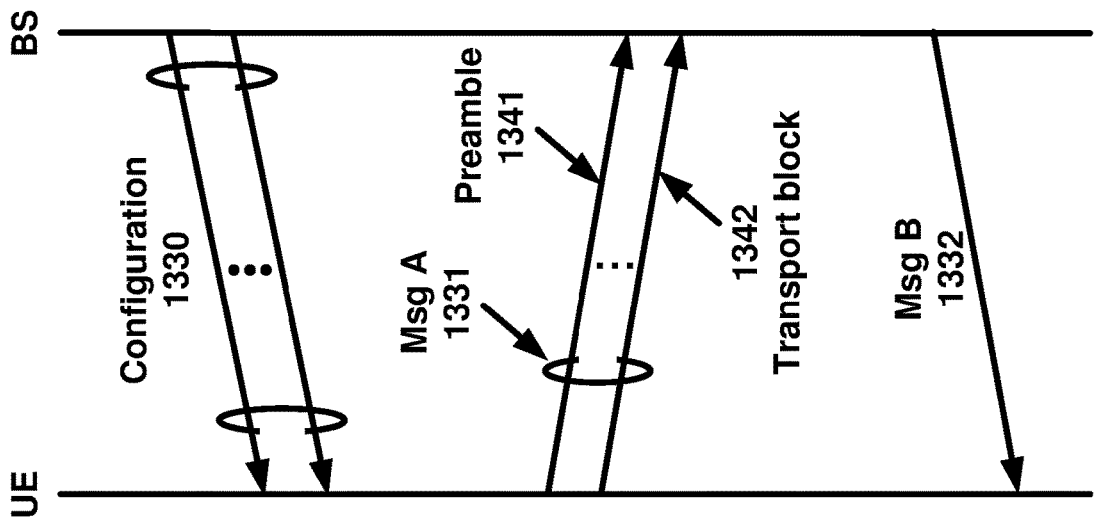
FIG. 13A, FIG. 13B, and FIG. 13C respectively illustrate a four-step contention-based random access procedure, a two-step contention-free random access procedure, and another two-step random access procedure.
Figure 13B:
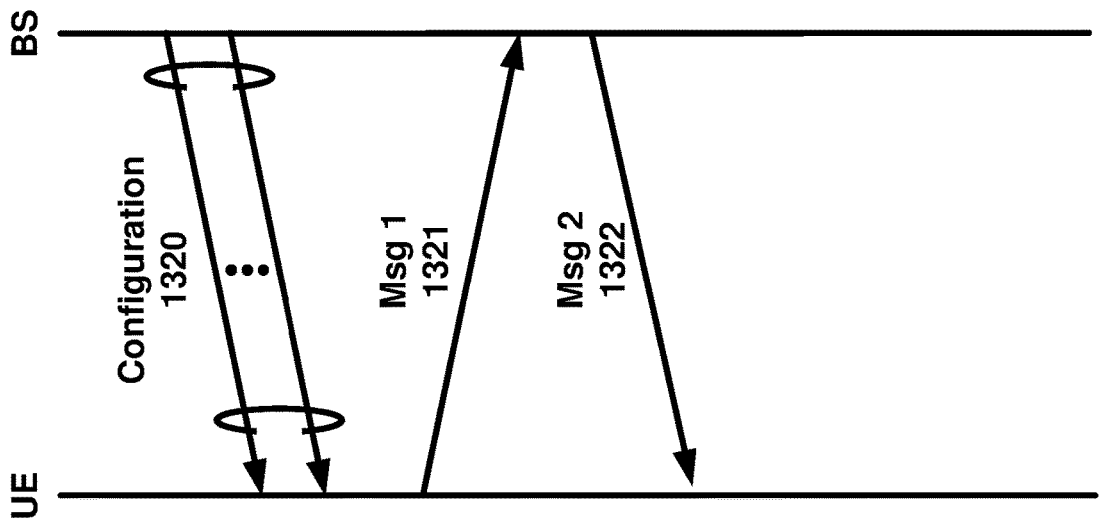
Figure 13A:
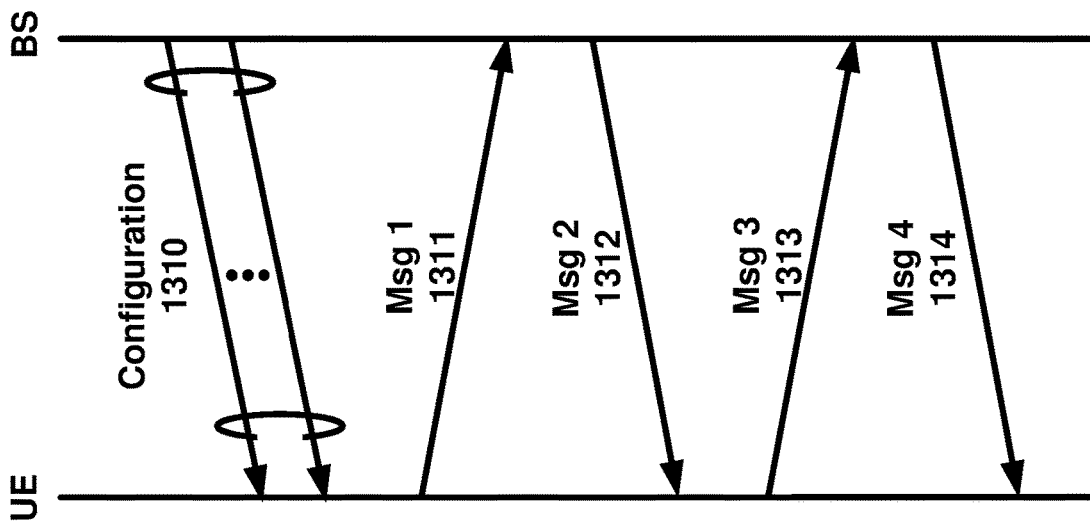

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤ s_id<14), t_id may be an index of a first slot of the PRACH occasion in a system frame (e.g., 0≤ t_id<80), f_id may be an index of the PRACH occasion in the frequency domain (e.g., 0≤ f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex). After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearch SpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
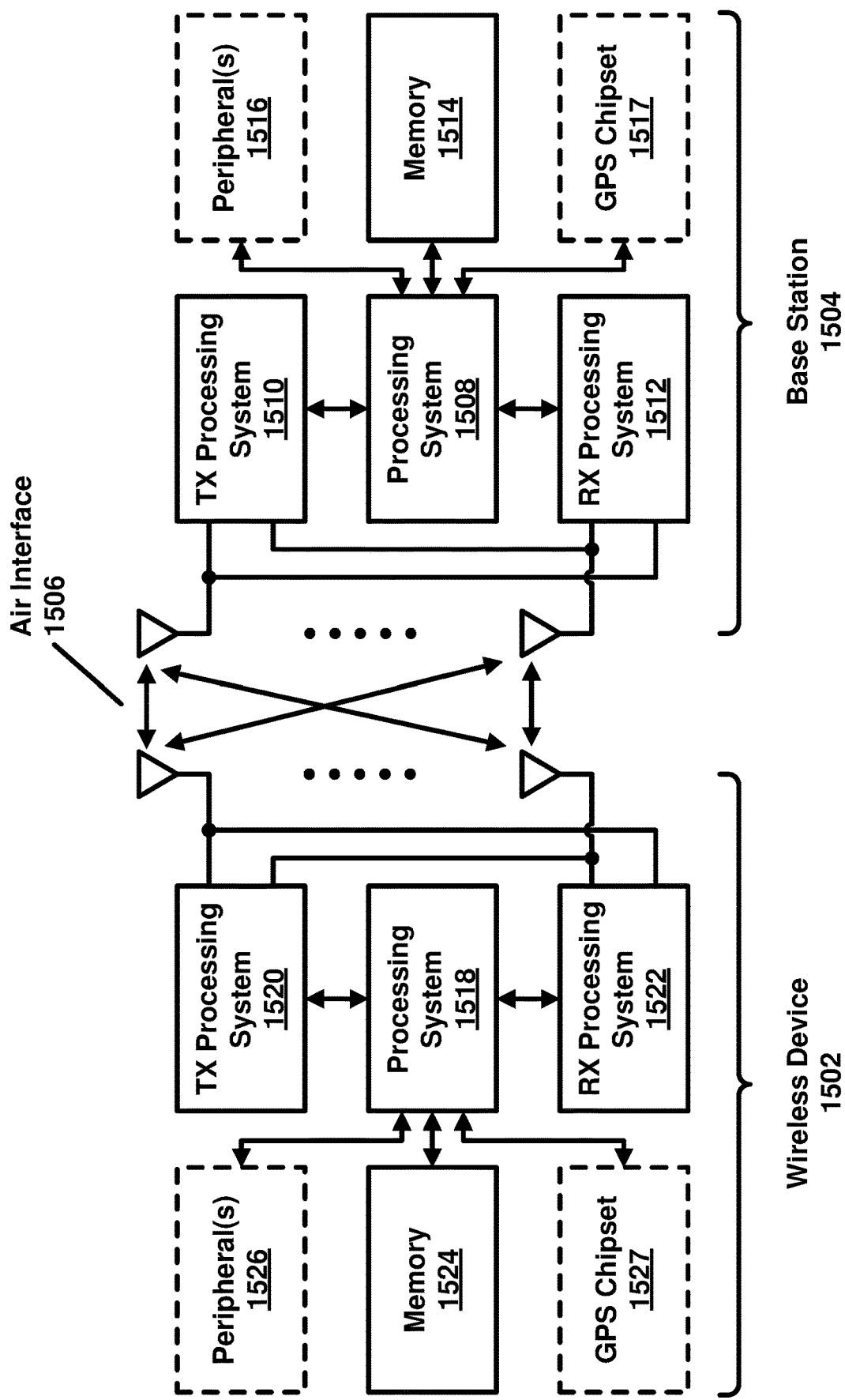
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward. A MAC CE may be a bit string that is byte aligned (e.g., a multiple of eight bits) in length. A MAC subheader may be a bit string that is byte aligned (e.g., a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 17A:
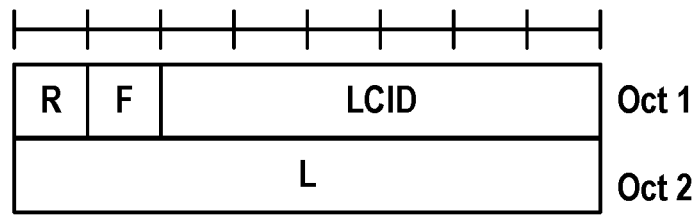
FIG. 17A, FIG. 17B and FIG. 17C show examples of MAC subheaders.
Figure 17B:
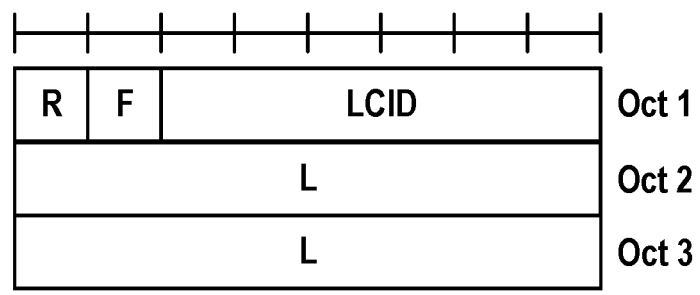
Figure 17C:
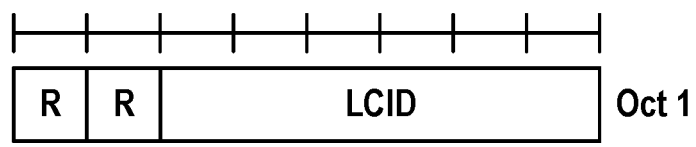

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader of FIG. 17B, the LCID field may be six bits in length, and the L field may be sixteen bits in length. When a MAC subheader corresponds to a fixed sized MAC CE or padding, the MAC subheader may comprise: an R field with a two bit length and an LCID field with a multi-bit length. FIG. 17C shows an example of a MAC subheader with an R field and an LCID field. In the example MAC subheader of FIG. 17C, the LCID field may be six bits in length, and the R field may be two bits in length.

Figure 18A:
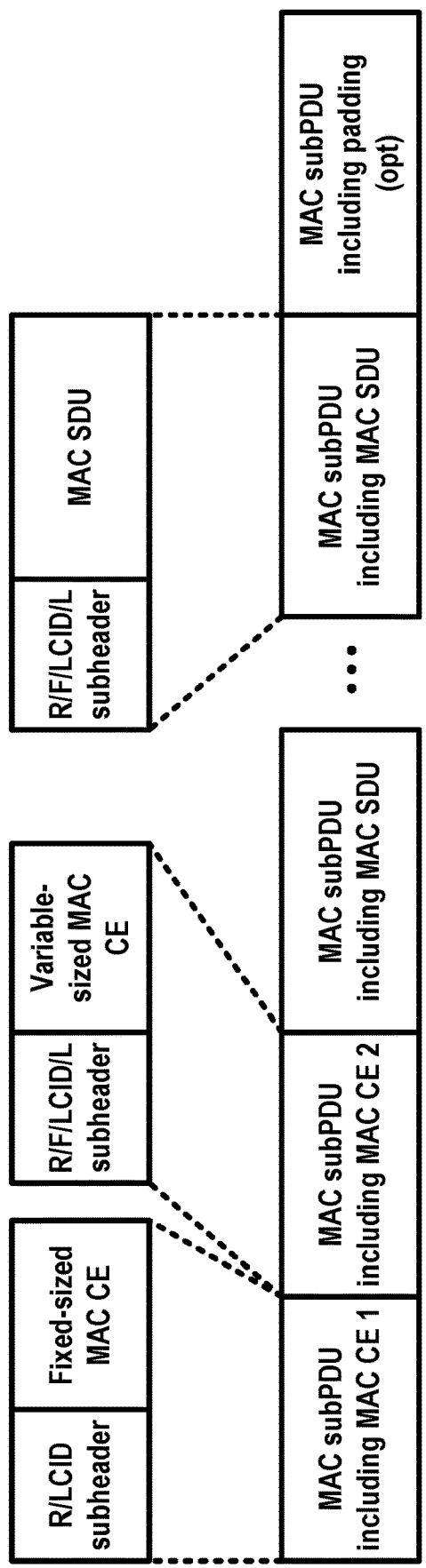
FIG. 18A shows an example of a DL MAC PDU.
Figure 18B:
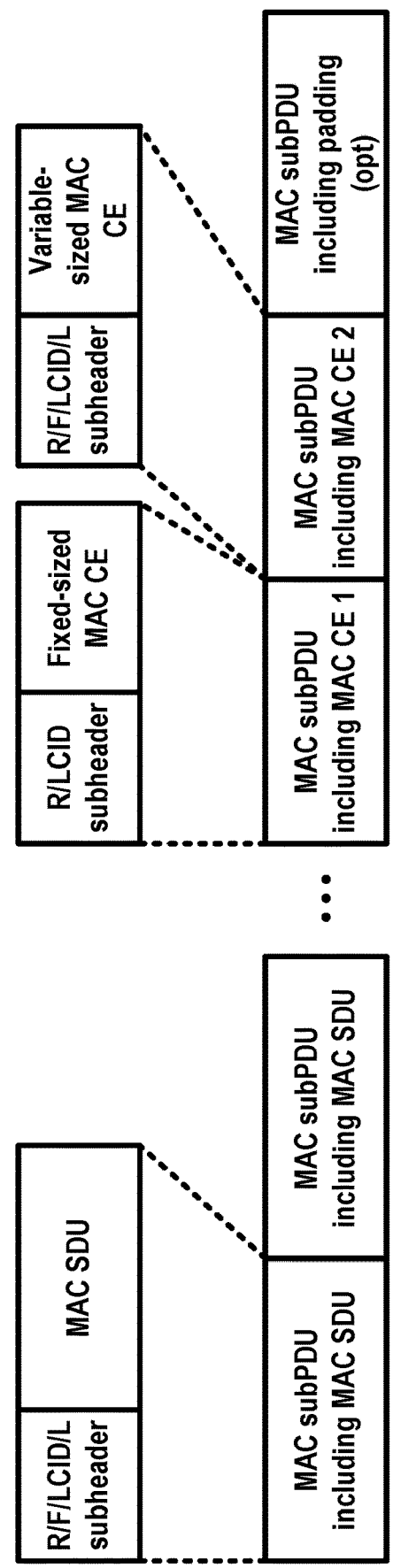
FIG. 18B shows an example of an UL MAC PDU.

FIG. 18A shows an example of a DL MAC PDU. Multiple MAC CEs, such as MAC CE 1 and 2, may be placed together. A MAC subPDU comprising a MAC CE may be placed before any MAC subPDU comprising a MAC SDU or a MAC subPDU comprising padding. FIG. 18B shows an example of a UL MAC PDU. Multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a gNB may transmit, to a wireless device, one or more messages comprising an SCell timer (e.g., sCellDeactivation Timer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell.

In response to the activating the SCell, the wireless device may start or restart a first SCell timer (e.g., sCellDeactivation Timer) associated with the SCell. The wireless device may start or restart the first SCell timer in the slot when the SCell Activation/Deactivation MAC CE activating the SCell has been received. In an example, in response to the activating the SCell, the wireless device may (re-) initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivation Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivation Timer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivation Timer) associated with the activated SCell. In an example, when an SCell is deactivated, if there is an ongoing random access procedure on the SCell, a wireless device may abort the ongoing random access procedure on the SCell.

Figure 21A:
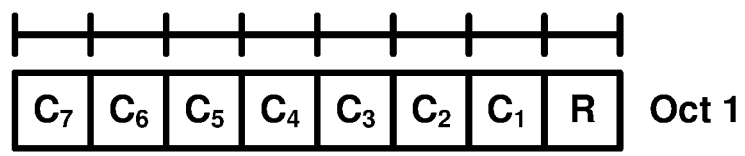
FIG. 21A and FIG. 21B show examples of SCell activation/deactivation MAC CEs.
Figure 21B:
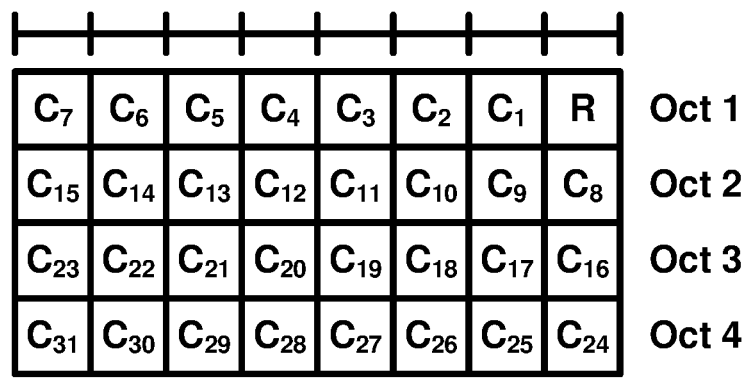

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one). FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the C field. In FIG. 21A and FIG. 21B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device. In an example, when an SCell is in an active state, the wireless device may perform: SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

When an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell. When an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell. When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 21A or FIG. 21B) indicating activation or deactivation of at least one SCell to a wireless device. In FIG. 21A and/or FIG. 21B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 22A shows an example of the second MAC CE with a single octet. In another example, the second MAC CE may consist of four octets containing 31 C-fields and one R-field. FIG. 22B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the $C_i$ field. In an example, when $C_i$ is set to "1", the wireless device may transition an SCell associated with SCell index i into a dormant state. In an example, when $C_i$ is set to "0", the wireless device may activate an SCell associated with SCell index i. In an example, when $C_i$ is set to "0" and the SCell with SCell index i is in a dormant state, the wireless device may activate the SCell with SCell index i. In an example, when $C_i$ is set to "0" and the SCell with SCell index i is not in a dormant state, the wireless device may ignore the $C_i$ field.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 22C.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivation Timer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCellHibernation Timer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivation Timer) per configured SCell (except the SCell configured with PUCCH/SPUCCH, if any), and deactivate the associated SCell upon the dormant SCell deactivation timer expiry if the SCell is in dormant state.

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell. In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated. In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 23:
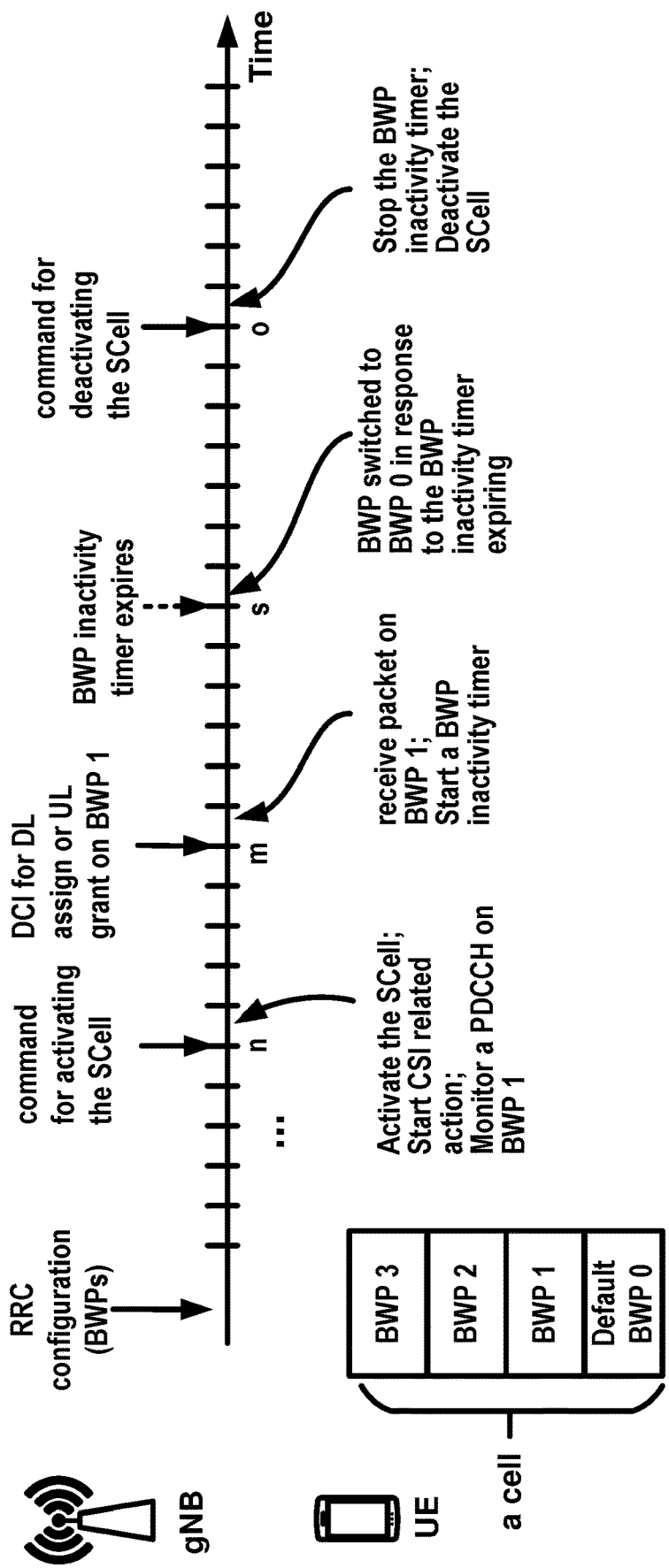
FIG. 23 illustrates BWP management, according to some embodiments.

FIG. 23 shows an example of BWP switching on an SCell. In an example, a UE may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The UE may receive a MAC CE to activate the SCell at $n^{th}$ slot. The UE may start a SCell deactivation timer (e.g., sCellDeactivation Timer), and start CSI related actions for the SCell, and/or start CSI related actions for the first active BWP of the SCell. The UE may start monitoring a PDCCH on BWP 1 in response to activating the SCell.

In an example, the UE may start restart a BWP inactivity timer (e.g., bwp-InactivityTimer) at $m^{th}$ slot in response to receiving a DCI indicating DL assignment on BWP 1. The UE may switch back to the default BWP (e.g., BWP 0) as an active BWP when the BWP inactivity timer expires, at $s^{th}$ slot. The UE may deactivate the SCell and/or stop the BWP inactivity timer when the sCellDeactivation Timer expires.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP. In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

Figure 24B:
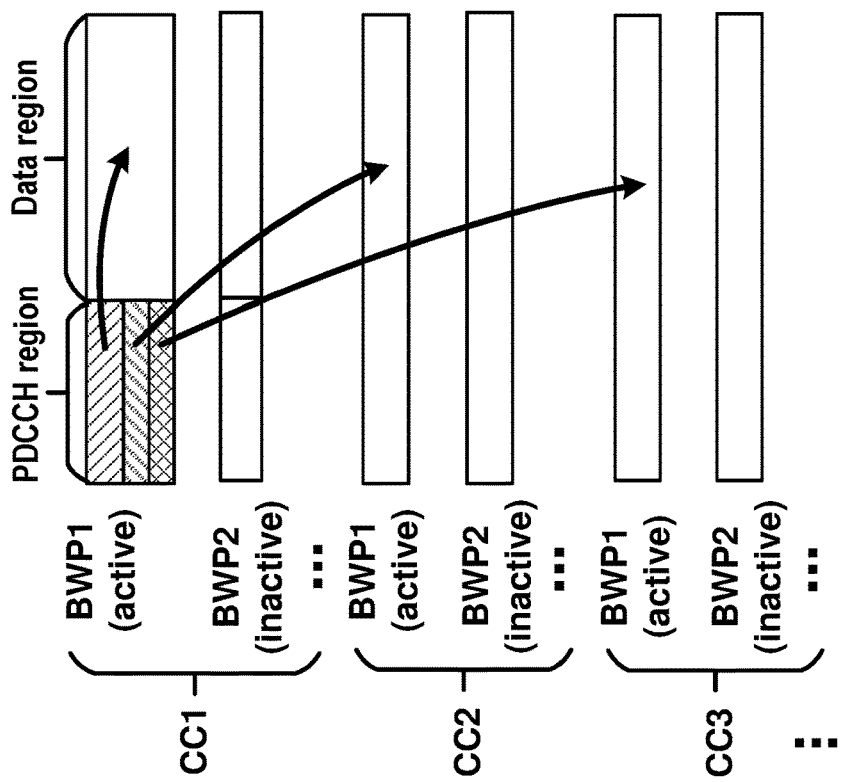
FIG. 24B illustrates cross-carrier scheduling, according to some embodiments.
Figure 24A:
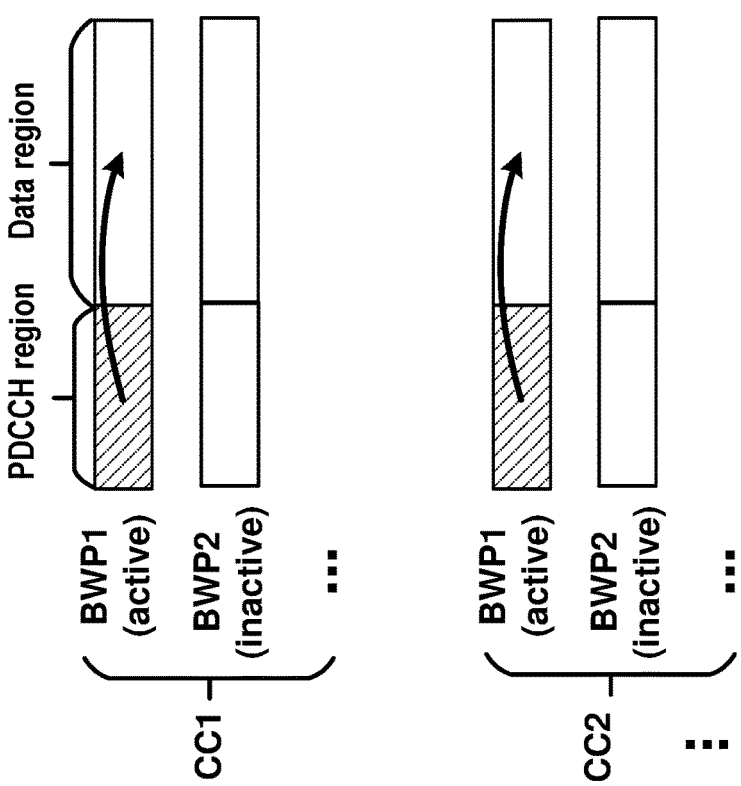
FIG. 24A illustrates self-scheduling, according to some embodiments.

In an example, when BWP operation supported by a gNB and a wireless device, the gNB may transmit one or more DCIs on a first active BWP of a first serving cell, the one or more DCI indicating self-scheduling over the first active BWP, or the one or more DCI indicating cross-carrier scheduling a second active BWP of a second serving cell. FIG. 24A and FIG. 24B show examples of self-scheduling and cross-carrier scheduling when multiple BWPs are configured in a cell.

FIG. 24A shows an example of self-scheduling with multiple BWPs are configured. In an example, a base station (e.g., gNB) may transmit to a wireless device one or more messages comprising configuration parameters of a plurality of cells (e.g., CC1, CC2). The one or more messages (e.g., RRC messages) comprise a serving cell configuration IE (e.g., ServingCellConfig) used to configure (add or modify) the wireless device with a serving cell, which may be a SpCell or an SCell of an MCG or SCG, where the serving cell configuration IE further comprises a PDCCH configuration IE (e.g., PDCCH-ServingCellConfig) and/or a cross-carrier scheduling configuration (e.g., CrossCarrierSchedulingConfig) IE. The cross-carrier scheduling configuration IE may comprise configuration parameters of cross-carrier scheduling configuration. The configuration parameters may comprise a scheduling cell information (e.g., schedulingCellinfo), the scheduling cell information comprising first set of parameters (e.g., cif-Presence) indicating a cell is scheduled by itself. In an example, the configuration parameters may further indicate a cell may comprise multiple BWPs (e.g., BWP1, BWP2). In an example, in each cell, at most one BWP of the multiple BWPs may be in active state. In the example of FIG. 24A, BWP1 in CC1 and BWP1 in CC2 are in active state, BWP2 in CC1 and BWP2 in CC2 are in inactive state. In an example, when CC1 and CC2 are in active state, a wireless device may monitor first PDCCH candidates on BWP1 of CC1 for detecting one or more first DCIs for downlink assignments on BWP 1 of CC 1 or uplink grants of an uplink active BWP of CC1. The wireless device may monitor second PDCCH candidates on BWP1 of CC2 for detecting one or more second DCIs for downlink assignments on BWP 1 of CC 2 or uplink grants of an uplink active BWP of CC2. Monitoring multiple PDCCH candidates on active BWPs of different cells separately or independently may enable flexible cell management. However, monitoring multiple PDCCH candidates on active BWPs of different cells may not be efficient for control channel resource utilization and/or UE battery usage.

In an example, with cross-carrier scheduling configured and multiple BWPs configured, a base station (e.g., gNB) may transmit a DCI on a first active BWP of a first cell for a second active BWP of a second cell, the DCI indicating downlink assignments or uplink grants on the second active BWP of the second cell. Monitoring on the first cell for the second cell may reduce control channel resource on the second cell, and/or may reduce UE battery usage.

FIG. 24B shows an example of cross-carrier scheduling with multiple BWPs configured. In an example, a base station may transmit to a wireless device one or more messages comprising configuration parameters indicating CC2 and/or CC3 are cross-carrier scheduled by CC1. The configuration parameters may comprise a scheduling cell information (e.g., schedulingCellinfo), the scheduling cell information comprising second set of parameters (e.g., schedulingcellId and/or cif-InSchedulingCell) indicating a cell (identified by the cif-InSchedulingCell) is cross-carrier scheduled by another cell identified by the schedulingcellid. In an example, the configuration parameters may indicate a first cif value (indicated by cif-InSchedulingCell) is associated with CC2, and/or a second cif value is associated with CC3 for cross-carrier scheduling. In an example, the configuration parameters may further indicate a cell comprises multiple BWPs (e.g., BWP1, BWP2). In an example, in a cell, at most one BWP of the multiple BWPs may be in active state. In the example of FIG. 24B, BWP1 in CC1, BWP1 in CC2 and BWP1 in CC3 are in active state, BWP2 in CC1, BWP2 in CC2 and BWP2 in CC3 are in inactive state. In an example, when CC1, CC2 and CC3 are in active state, the wireless device may monitor first PDCCH candidates on BWP1 of CC1 for self-scheduling. In an example, the first PDCCH candidates may be in first common search spaces (CSSs) and/or one or more UE specific search spaces (USSs). In an example, the wireless device may monitor second PDCCH candidates on BWP1 of CC1 for CC2 (e.g., cross-carrier scheduling). In an example, the second PDCCH candidates may be identified by the first cif value associated with CC2, in the one or more USSs. In an example, the wireless device may monitor third PDCCH candidates on BWP1 of CC1 for CC3. In an example, the third PDCCH candidates may identified by the second cif value associated with CC3, in the one or more USSs. By the cross-carrier scheduling, the gNB may transmit DCI on an active BWP of CC1 for cross-carrier scheduling CC2 and CC3, e.g., to reduce control channel resource utilization for the wireless device on CC2 and CC3. The wireless device may reduce blind decoding attempts on CC2 and CC3, and/or may save battery power.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by search SpaceZero in PDCCH-ConfigCommon for a DCI format with CRC scrambled by a SI-RNTI on the primary cell of the MCG, a Type0A-PDCCH CSS set configured by search SpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpace Type=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In an example, a wireless device determines a PDCCH monitoring occasion on an active DL BWP based on one or more PDCCH configuration parameters comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $n_{s,f}^{\mu}$ in a frame with number $n_f$ if $(n_f N_{slot}^{frame,\mu} + n_{s,f}^{\mu} - o_s) \mod k_s = 0$. $N_{slot}^{frame,\mu}$ is a number of slot in a frame when numerology μ is configured. $o_s$ is a slot offset indicated in the PDCCH configuration parameters. $k_s$ is a PDCCH monitoring periodicity indicated in the PDCCH configuration parameters. The wireless device monitors PDCCH candidates for the search space set for $T_s$ consecutive slots, starting from slot $n_{s,f}^{\mu}$, and does not monitor PDCCH candidates for search space set s for the next $k_s - T_s$ consecutive slots. In an example, a USS at CCE aggregation level L∈{1, 2, 4, 8, 16} is defined by a set of PDCCH candidates for CCE aggregation level L. If a wireless device is configured with CrossCarrierSchedulingConfig for a serving cell, the carrier indicator field value corresponds to the value indicated by CrossCarrierSchedulingConfig.

For an active DL BWP of a serving cell on which a wireless device monitors PDCCH candidates in a USS, if the wireless device is not configured with a carrier indicator field, the wireless device monitors the PDCCH candidates without carrier indicator field. For an active DL BWP of a serving cell on which a wireless device monitors PDCCH candidates in a USS, if a wireless device is configured with a carrier indicator field, the wireless device monitors the PDCCH candidates with carrier indicator field.

In an example, a wireless device does not expect to monitor PDCCH candidates on an active DL BWP of a secondary cell if the wireless device is configured to monitor PDCCH candidates with carrier indicator field corresponding to that secondary cell in another serving cell. For the active DL BWP of a serving cell on which the wireless device monitors PDCCH candidates, the wireless device monitors PDCCH candidates at least for the same serving cell.

In an example, a wireless device decides, for a search space set s associated with CORESET p, CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^{\mu}}=0$ for any CSS; $Y_{p,n_{s,f}^{\mu}}=(A_p \cdot Y_{p,n_{s,f}^{\mu}-1}) \bmod D$ for a USS, $Y_{p,-1}=N_{RNTI} \neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number of CCEs, numbered from 0 to $N_{CCEp}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $n_{CI}=0$; $m_{s,n_{CI}}=0, \ldots, M_{s,n_{CI}}^{(L)}-1$, where $M_{s,n_{CI}}^{(L)}$ is is the number of PDCCH candidates the wireless device is configured to monitor for aggregation level L of a search space set s for a serving cell corresponding to $n_{CI}$; for any CSS, $M_{s,max}^{(L)}=M_{s,0}^{(L)}$; for a USS, $M_{s,max}^{(L)}$ is the maximum of $M_{s,n_{CI}}^{(L)}$, over all configured $n_{CI}$ values for a CCE aggregation level L of search space set s; and the RNTI value used for $n_{RNTI}$ is the C-RNTI.

In an example, when a base station configures a first cell to be cross-carrier scheduled by a second cell, the base station may link a search space of the first cell to a search space of the second cell. A search space ID of a search space of the first cell is set to be same as a search space ID of a search space of the second cell, which is referred to as search space linkage. Parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a search space type (searchSpaceType). The search space type, when the search space is a common search space, comprises a number of parameters of one or more first DCI formats (e.g., DCI format 0-0/1-0/2-0/2-1/2-2/2-3). The search space type, when the search space is a UE-specific search space, comprises a number of parameters of one or more second DCI formats (e.g., DCI format 0-0/1-0/0-1/1-1). When search space linkage exists between a first search space of the first cell and a second search space of the second cell, a wireless device monitors the second search space of the second cell for detecting a DCI indicating cross-carrier scheduling the first cell. When the first cell is configured to be cross-carrier scheduled by the second cell and search space linkage is configured for a first search space of the first cell and a second search space of the second cell, the base station may set search space configuration parameters (e.g., controlResourceSetId, monitoringSlotPeriodicityAndOffset, duration, monitoringSymbolsWithinSlot, nrofCandidates, and/or searchSpaceType) of the first search space absent except the search space ID of the first search space. When search space configuration parameters (e.g., controlResourceSetId, monitoringSlotPeriodicityAndOffset, duration, monitoringSymbolsWithinSlot, nrofCandidates, and/or searchSpace Type) of the first search space are absent, the wireless device may apply search space configuration parameters of a second search space, of the second cell, linked to the first search space of the first cell, e.g., the second search space having a same search space ID with the first search space.

FIG. 25 shows an example of RRC message of a severing cell configuration. The RRC message of a serving cell configuration may comprise at least one of: a TDD configuration parameter, an initial BWP ID, a plurality of DL BWP, a plurality of UL BWP, a first active BWP, a BWP inactivity timer, a SCell deactivation timer, and/or a cross carrier scheduling configuration information (e.g., CrossCarrierSchedulingConfig). The cross carrier scheduling configuration information comprise one or more cross-carrier scheduling configuration parameters comprising a scheduling cell information (e.g., schedulingCellinfo). The scheduling cell information of the second cell, comprising two parameters (e.g., schedulingcellid and cif-InSchedulingCell), indicates that Cell B (identified by the cif-InSchedulingCell) is cross-carrier scheduled by another cell (Cell A) identified by the schedulingcellid. The configuration parameters may comprise one or more PDCCH configuration parameters of a first cell and one or more PDCCH configuration parameters of a second cell. One or more PDCCH configuration parameters may comprise: one or more control resource sets, one or more search spaces, a downlink preemption indication, one or more PUSCH power control parameters, one or more PUCCH power control parameters, and/or one or more SRS power control parameters.

In an example, in response to the second cell being cross-carrier scheduled by the first cell, the one or more PDCCH configuration parameters of the second cell are absent in the configuration parameters of the second cell, except parameters of the one or more search spaces. In an example, in response to the second cell being cross-carrier scheduled by the first cell, one or more search space configuration parameters of a search space of the second cell, except a search space ID of the search space and the number of candidates for PDCCH monitoring, are absent in the configuration parameters of the search space of the second cell.

FIG. 26 shows an example of configuration of a search space. In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a search space type (searchSpaceType). In an example, in response to the second cell being cross-carrier scheduled by the first cell, the search space of the second cell is linked to a search space, of the first cell, with a same search space ID.

FIG. 27 shows example of maximum MIMO layer configuration in an RRC message. In the example of FIG. 27, a base station may transmit to a wireless device one or more RRC messages (e.g., PDSCH-ServingCellConfig IE) comprising one or more UE specific PDSCH parameters that are common across all BWPs of a cell. The one or more UE specific PDSCH parameters comprise at least one of: a PUCCH cell indicator, and/or a value of maximum MIMO layer (e.g., Lmax=1, 2, 3, . . . or 8) for PDSCH in all BWPs of the cell. Based on the one or more RRC messages, the wireless device may be able to receive a TB via a PDSCH in a BWP of the cell, the TB being transmitted with a number of MIMO layers, the number being equal to or less than Lmax. The wireless device may spend more power for processing PDSCH with a bigger Lmax than for processing PDSCH with a smaller Lmax. The wireless device may obtain higher data throughput with a bigger Lmax than that with a smaller Lmax. In an example, the wireless device may receive PDSCH with at most Lmax MIMO layers when the wireless device is equipped with at least Lmax Rx antennas, each Rx antenna being connected with RF chain, mixer, power amplifier, phase shifter, and/or DAC (digital Analog Converter). A Rx antenna may or may not share one or more baseband digital processing unites with another Rx antenna. Compared with single Rx antenna, the wireless device configured with multiple Rx antenna may receive data packets with higher data rate, therefore may have higher throughput.

In an example, DRX operation may be used by a UE to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state.

In an example, during a DRX mode, the UE may power down most of its circuitry when there are no packets to be received. The UE may monitor PDCCH discontinuously in the DRX mode. The UE may monitor the PDCCH continuously when a DRX operation is not configured. During this time the UE listens to the downlink (DL) (or monitors PDCCHs) which is called DRX Active state. In a DRX mode, a time during which UE doesn't listen/monitor PDCCH is called DRX Sleep state.

Figure 28:
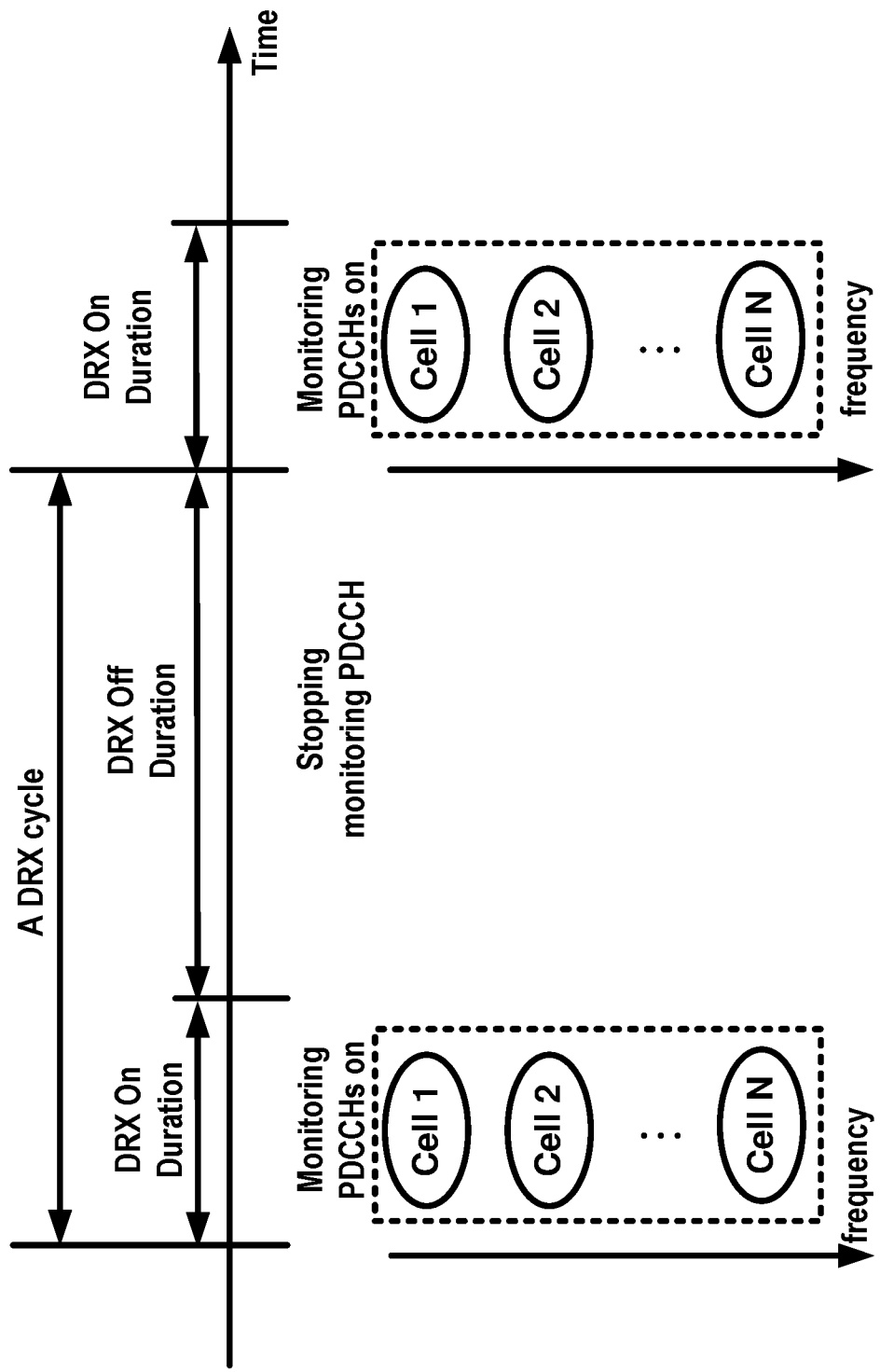
FIG. 28 illustrates a DRX configuration, according to some embodiments.

FIG. 28 shows an example of the embodiment. A gNB may transmit an RRC message comprising one or more DRX parameters of a DRX cycle. The one or more parameters may comprise a first parameter and/or a second parameter. The first parameter may indicate a first time value of the DRX Active state (e.g., DRX On duration) of the DRX cycle. The second parameter may indicate a second time of the DRX Sleep state (e.g., DRX Off duration) of the DRX cycle. The one or more parameters may further comprise a time duration of the DRX cycle. During the DRX Active state, the UE may monitor PDCCHs for detecting one or more DCIs on a serving cell. During the DRX Sleep state, the UE may stop monitoring PDCCHs on the serving cell. When multiple cells are in active state, the UE may monitor all PDCCHs on (or for) the multiple cells during the DRX Active state. During the DRX off duration, the UE may stop monitoring all PDCCH on (or for) the multiple cells. The UE may repeat the DRX operations according to the one or more DRX parameters.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to improve resource utilization efficiency.

In an example, the MAC entity may be configured by RRC with a DRX functionality that controls the UE's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. In an example, in response to being in RRC_CONNECTED, if DRX is configured, the MAC entity may monitor the PDCCH discontinuously using the DRX operation; otherwise the MAC entity may monitor the PDCCH continuously.

In an example, RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ RTT timer (e.g., drx-HARQ-RTT-TimerDL); an uplink DRX HARQ RTT Timer (e.g., drx-HARQ-RTT-TimerUL); a downlink retransmission timer (e.g., drx-Retransmission TimerDL); an uplink retransmission timer (e.g., drx-RetransmissionTimerUL); one or more parameters of a short DRX configuration (e.g., drx-ShortCycle and/or drx-ShortCycleTimer) and one or more parameters of a long DRX configuration (e.g., drx-LongCycle). In an example, time granularity for DRX timers may be in terms of PDCCH subframes (e.g., indicated as psf in the DRX configurations), or in terms of milliseconds.

In an example, in response to a DRX cycle being configured, the Active Time may include the time while at least one timer is running. The at least one timer may comprise drx-on Duration Timer, drx-Inactivity Timer, drx-Retransmission TimerDL, drx-Retransmission TimerUL, or mac-ContentionResolution Timer.

In an example, drx-Inactivity-Timer may specify a time duration for which the UE may be active after successfully decoding a PDCCH indicating a new transmission (UL or DL or SL). This timer may be restarted upon receiving PDCCH for a new transmission (UL or DL or SL). The UE may transition to a DRX mode (e.g., using a short DRX cycle or a long DRX cycle) in response to the expiry of this timer. In an example, drx-ShortCycle may be a first type of DRX cycle (e.g., if configured) that needs to be followed when UE enters DRX mode. In an example, a DRX-Config IE indicates the length of the short cycle. drx-ShortCycleTimer may be expressed as multiples of shortDRX-Cycle. The timer may indicate the number of initial DRX cycles to follow the short DRX cycle before entering the long DRX cycle. drx-on Duration Timer may specify the time duration at the beginning of a DRX Cycle (e.g., DRX ON). drx-onDuration Timer may indicate the time duration before entering the sleep mode (DRX OFF). drx-HARQ-RTT-TimerDL may specify a minimum duration from the time new transmission is received and before the UE may expect a retransmission of a same packet. This timer may be fixed and may not be configured by RRC. drx-Retransmission TimerDL may indicate a maximum duration for which UE may be monitoring PDCCH when a retransmission from the eNodeB is expected by the UE.

In response to a DRX cycle being configured, the Active Time may comprise the time while a Scheduling Request is sent on PUCCH and is pending. In an example, in response to a DRX cycle being configured, the Active Time may comprise the time while an uplink grant for a pending HARQ retransmission can occur and there is data in the corresponding HARQ buffer for synchronous HARQ process.

In response to a DRX cycle being configured, the Active Time may comprise the time while a PDCCH indicating a new transmission addressed to the C-RNTI of the MAC entity has not been received after successful reception of a Random Access Response for the preamble not selected by the MAC entity.

A DL HARQ RTT Timer may expire in a subframe and the data of the corresponding HARQ process may not be successfully decoded. The MAC entity may start the drx-Retransmission TimerDL for the corresponding HARQ process. An UL HARQ RTT Timer may expire in a subframe. The MAC entity may start the drx-Retransmission TimerUL for the corresponding HARQ process. A DRX Command MAC control element or a Long DRX Command MAC control element may be received. The MAC entity may stop drx-onDurationTimer and stop drx-InactivityTimer. In an example, drx-Inactivity Timer may expire or a DRX Command MAC control element may be received in a subframe. In an example, in response to Short DRX cycle being configured, the MAC entity may start or restart drx-ShortCycleTimer and may use Short DRX Cycle. Otherwise, the MAC entity may use the Long DRX cycle.

In an example, drx-ShortCycle Timer may expire in a subframe. The MAC entity may use the Long DRX cycle. In an example, a Long DRX Command MAC control element may be received. The MAC entity may stop drx-ShortCycleTimer and may use the Long DRX cycle.

In an example, if the Short DRX Cycle is used and [(SFN*10)+subframe number] modulo (drx-ShortCycle)= (drxStartOffset) modulo (drx-ShortCycle), the wireless device may start drx-onDuration Timer. In an example, if the Long DRX Cycle is used and [(SFN*10)+subframe number] modulo (drx-longCycle)=drxStartOffset, the wireless device may start drx-on Duration Timer.

Figure 29:
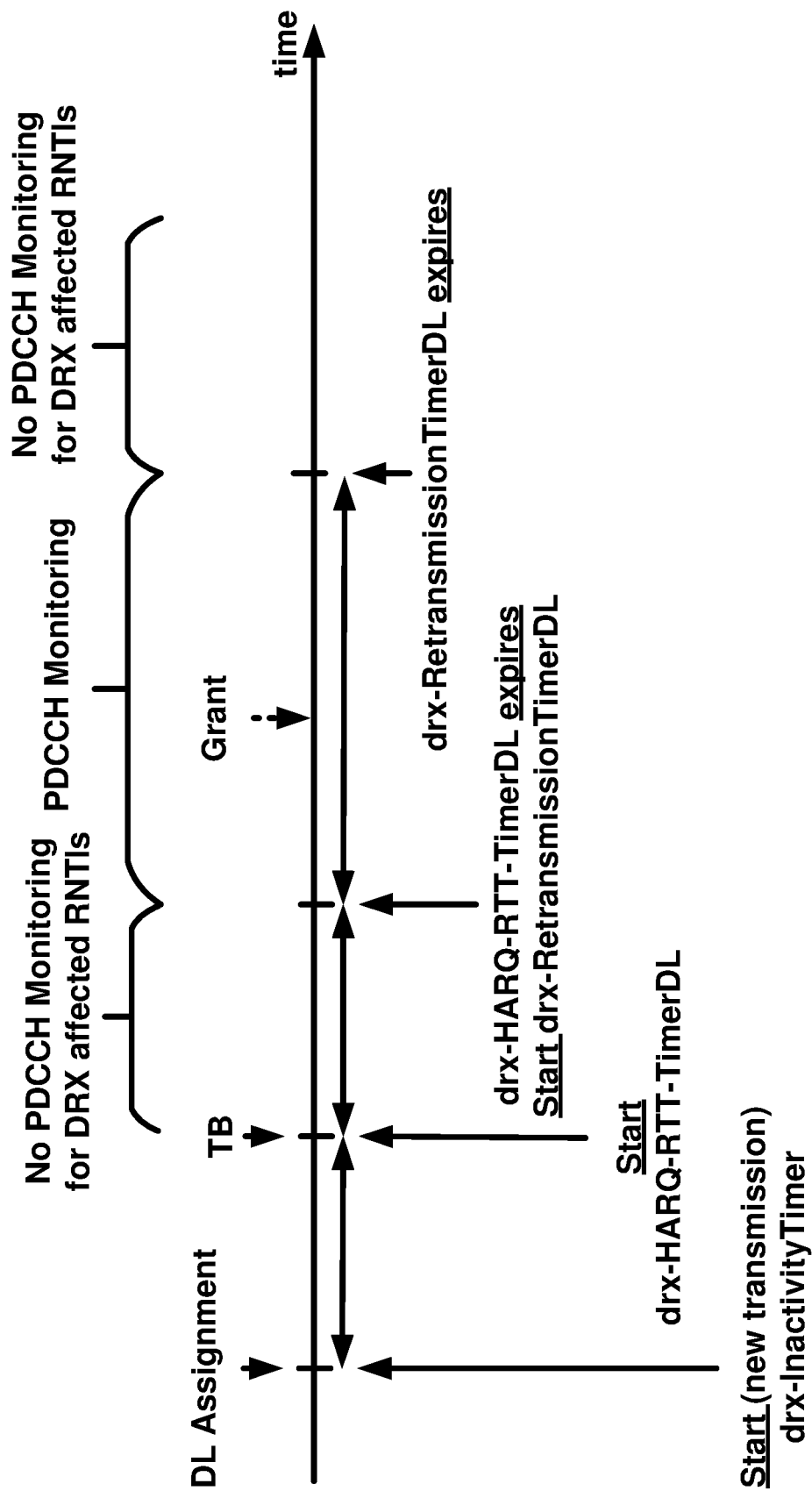
FIG. 29 illustrates one or more DRX timers management, according to some embodiments.

FIG. 29 shows example of DRX operation. A base station may transmit an RRC message comprising configuration parameters of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-Inactivity Timer is running, the UE may start a HARQ RTT Timer (e.g., drx-HARQ-RTT-TimerDL), during which, the UE may stop monitoring the PDCCH. The UE may transmit a NACK to the base station upon unsuccessful receiving the TB. When the HARQ RTT Timer expires, the UE may monitor the PDCCH and start a HARQ retransmission timer (e.g., drx-Retransmission TimerDL). When the HARQ retransmission timer is running, the UE may receive a second DCI indicating a DL grant for the retransmission of the TB. If not receiving the second DCI before the HARQ retransmission timer expires, the UE may stop monitoring the PDCCH.

FIG. 30A show example of a power saving mechanism based on wake-up. A gNB may transmit one or more messages comprising parameters of a wake-up duration (e.g., a power saving duration, or a Power Saving Channel (PSCH) occasion), to a UE. The wake-up duration may be located a number of slots (or symbols) before a DRX On duration of a DRX cycle. The number of slots (or symbols), or, referred to as a gap between a wakeup duration and a DRX on duration, may be configured in the one or more RRC messages or predefined as a fixed value. The gap may be used for at least one of: synchronization with the gNB; measuring reference signals; and/or retuning RF parameters. The gap may be determined based on a capability of the UE and/or the gNB. In an example, the parameters of the wake-up duration may be pre-defined without RRC configuration. In an example, the wake-up mechanism may be based on a wake-up indication via a PSCH. The parameters of the wake-up duration may comprise at least one of: a PSCH channel format (e.g., numerology, DCI format, PDCCH format); a periodicity of the PSCH; a control resource set and/or a search space of the PSCH. When configured with the parameters of the wake-up duration, the UE may monitor the wake-up signal or the PSCH during the wake-up duration. When configured with the parameters of the PSCH occasion, the UE may monitor the PSCH for detecting a wake-up indication during the PSCH occasion. In response to receiving the wake-up signal/channel (or a wake-up indication via the PSCH), the UE may wake-up to monitor PDCCHs according to the DRX configuration. In an example, in response to receiving the wake-up indication via the PSCH, the UE may monitor PDCCHs in the DRX active time (e.g., when drx-onDuration Timer is running). The UE may go back to sleep if not receiving PDCCHs in the DRX active time. The UE may keep in sleep during the DRX off duration of the DRX cycle. In an example, if the UE doesn't receive the wake-up signal/channel (or a wake-up indication via the PSCH) during the wake-up duration (or the PSCH occasion), the UE may skip monitoring PDCCHs in the DRX active time.

In an example, a power saving mechanism may be based on a go-to-sleep indication via a PSCH. FIG. 30B shows an example of a power saving based on go-to-sleep indication. A gNB may transmit one or more messages comprising parameters of a wake-up duration (or a power saving duration), to a UE. The one or more messages may comprise at least one RRC message. The at least one RRC message may comprise one or more cell-specific or cell-common RRC messages (e.g., ServingCellConfig IE, ServingCellConfig-Common IE, MAC-CellGroupConfig IE). The wake-up duration may be located a number of slots (or symbols) before a DRX On duration of a DRX cycle. The number of slots (or symbols) may be configured in the one or more RRC messages or predefined as a fixed value. In an example, a wake-up (for power saving) mechanism may be based on a go-to-sleep indication transmitted via a PDCCH (or a PSCH). Parameters of a wake-up duration (or a PSCH monitoring occasion) may comprise at least one of: a PSCH format (e.g., numerology, DCI format, PDCCH format); a periodicity of the PSCH channel; a control resource set and/or a search space of the PSCH channel. When configured with the parameters of the wake-up duration, the UE may monitor the PSCH during the wake-up duration. In response to receiving a go-to-sleep indication via the PSCH, the UE may go back to sleep and skip monitoring PDCCHs during the DRX active time. In an example, if the UE doesn't receive the go-to-sleep indication via the PSCH during the wake-up duration, the UE monitors PDCCHs during the DRX active time, according to the configuration parameters of the DRX operation. This mechanism may reduce power consumption for PDCCH monitoring during the DRX active time.

Figure 31:
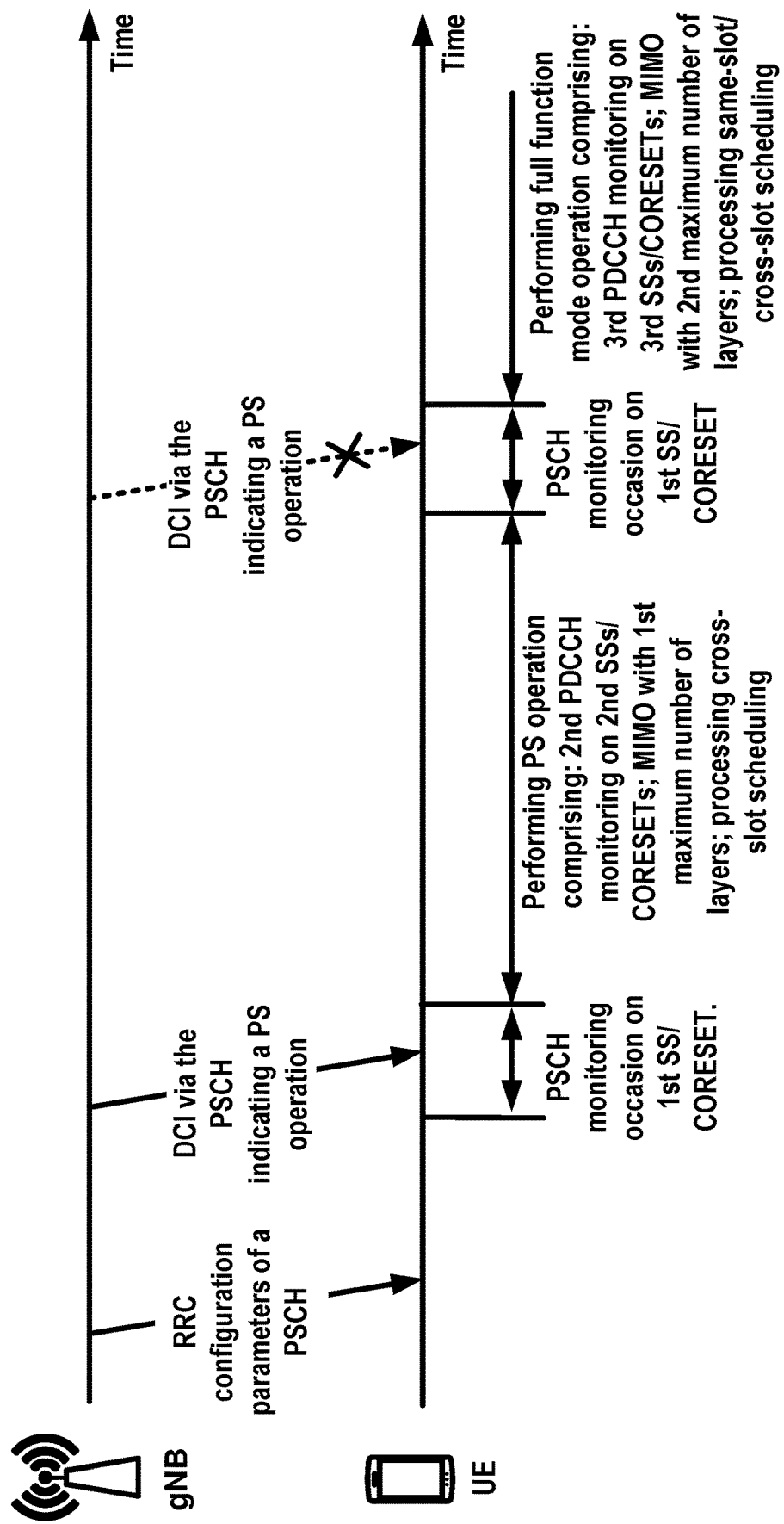
FIG. 31 illustrates a power saving mechanism, according to some embodiments.

FIG. 31 shows an example embodiment of power saving mechanism. A base station (e.g., gNB) may transmit to a wireless device (e.g., UE), one or more RRC messages comprising first configuration parameters of a power saving channel (PSCH) and second configuration parameters of a power saving (PS) operation. The first configuration parameters of the PSCH may comprise at least one of: one or more first search spaces (SSs) and/or one or more first control resource sets (COREST) on which the UE monitors the PSCH, one or more first DCI formats with which the UE monitors the PSCH, a radio network temporary identifier (RNTI) dedicated for monitoring the PSCH (e.g., PS-RNTI different from 3GPP existing RNTI values configured for the wireless device). The second configuration parameters of the PS operation may comprise at least one of: one or more second SSs and/or one or more second CORESTs on which the UE monitors PDCCHs in the PS operation, one or more first DCI formats with which the UE monitors PDCCHs in the PS operation, one or more MIMO parameters indicating a first maximum number of antenna (layers, ports, TRPs, panels, and/or the like) based on which the UE perform MIMO processing (transmission or reception) in the PS operation, one or more first cross-slot scheduling indicator indicating whether cross-slot scheduling is configured or not when the UE is in the PS operation, a BWP index indicating on which the UE transmit or receive data packet in the PS operation, and/or a cell index indicating on which the UE transmit or receive data packet in the PS operation. The one or more RRC messages may further comprise third configuration parameters of a normal function operation (e.g., full function, non-PS). The third configuration parameters may comprise at least one of: one or more third SSs and/or one or more third CORESTs on which the UE monitors PDCCHs in the non-PS operation, one or more second DCI formats with which the UE monitors PDCCHs in the non-PS operation, one or more MIMO parameters indicating a second maximum number of antenna (layers, ports, TRPs, panels, and/or the like) based on which the UE perform MIMO processing (transmission or reception) in the non-PS operation, one or more second cross-slot scheduling indicator indicating whether cross-slot scheduling is configured or not when the UE is in the non-PS operation, and/or the like. The UE, based on cross-slot scheduling being configured, may switch off some receiver modules (e.g., data buffering, RF chain, channel tracking, etc.) after receiving a DCI indicating a cross-slot scheduling and before receiving a data packet based on the DCI, for the purpose of power saving. In an example, the one or more second SSs and/or the one or more second CORESTs may occupy smaller radio resources than the one or more third SSs and/or the one or more third CORESTs, e.g., for the purpose of power saving. The first maximum number may be smaller than the second maximum number, e.g., for the purpose of power saving.

As shown in FIG. 31, when configured with the parameters of the PSCH and PS operation, the UE may monitor the PSCH (e.g., on the $1^{st}$ SS/CORESET) for detecting a DCI with CRC scrambled by the PS-RNTI during the PSCH monitoring occasions. Based on the PSCH monitoring, the UE may detect a PS indication contained in the DCI received via the PSCH. The DCI may further indicate an active BWP switching. In response to receiving the PS indication via the PSCH, the UE may start performing a PS operation based on the one or more second configuration parameters of the PS operation. Performing a PS operation based on the one or more second configuration parameters may comprise at least one of: monitoring PDCCHs on $2^{nd}$ PDCCH occasions and on $2^{nd}$ SSs/CORESETs, refraining from monitoring the PSCH on $1^{st}$ SSs/CORESETs, refraining from monitoring PDCCHs on 3rd PDCCH occasions and on 3rd SSs/CORESETs, transmitting or receiving data packets with the $1^{st}$ maximum number of antenna (layers, ports, TRPs, panels, and/or the like), and/or transmitting or receiving data packets with cross-slot scheduling based on the one or more first cross-slot scheduling indicator. Performing the PS operation may further comprise switching an active BWP of one or more cells (e.g., a PCell/SCell, or a cell group) to a dormant BWP of the one or more cells. The UE may monitor the PDCCHs on $2^{nd}$ PDCCH occasions and on $2^{nd}$ SSs/CORESETs continuously when DRX operation is not configured. The UE may monitor the PDCCHs on $2^{nd}$ PDCCH occasions and on $2^{nd}$ SSs/CORESETs discontinuously in a DRX active time when DRX operation is configured. The UE, based on the monitoring the PDCCH on $2^{nd}$ PDCCH occasions, may transmit or receive data packets or TBs in response to receiving a DCI indicating an uplink grant or a downlink assignment.

As shown in FIG. 31, when configured with the parameters of the PSCH and PS operation, the UE may monitor the PSCH (e.g., on the $1^{st}$ SS/CORESET) during the PSCH monitoring occasions. The UE may not detect a PS indication via the PSCH, e.g., when a base station determines that the UE shall stay in a full function mode, or a non-PS mode. In response to not receiving the PS indication via the PSCH, the UE may start performing a full function operation based on the one or more third configuration parameters. Performing a full function operation based on the one or more third configuration parameters may comprise at least one of: monitoring PDCCHs on 3rd PDCCH occasions and on 3rd SSs/CORESETs, refraining from monitoring the PSCH on $1^{st}$ SSs/CORESETs, refraining from monitoring PDCCHs on $2^{nd}$ PDCCH occasions and on $2^{nd}$ SSs/CORESETs, transmitting or receiving data packets with the $2^{nd}$ maximum number of antenna (layers, ports, TRPs, panels, and/or the like), transmitting or receiving data packets with same-slot scheduling based on the one or more second cross-slot scheduling indicator indicating same-slot scheduling is configured. The UE may monitor the PDCCHs on 3rd PDCCH occasions and on 3rd SSs/CORESETs continuously when DRX operation is not configured. The UE may monitor the PDCCHs on 3rd PDCCH occasions and on 3rd SSs/CORESETs discontinuously in a DRX active time when DRX operation is configured. The UE, based on the monitoring the PDCCH on 3rd PDCCH occasions, may transmit or receive data packets or TBs in response to receiving a DCI indicating an uplink grant or a downlink assignment.

In an example, a wireless device may perform power saving operations when the wireless device is receiving data packets with less transmission periodicity, and/or when the wireless device is suffering from battery power limitation. One of the power saving operations comprises switching off one or more transmission and/or receiving antennas, and one or more RF modules (e.g., mixer, power amplifier, phase shifter, DAC, and the like). The wireless device may reduce (or switch off) a number of receive antennas based on a wireless channel, between the wireless device and a base station, being rank deficient. The wireless device may reduce a number of receive antennas based on knowledge of a maximum number of DL MIMO layers. Informing the wireless device in advance an expected maximum number of MIMO layers may enable the wireless device to configure proper hardware resources to receive downlink transport blocks while being power efficient, e.g., by switching off one or more hardware resources. The hardware resource comprises at least one of: a number of receive antennas, RF configurations, and/or baseband processing. The hardware configurations may differ from a first wireless device to a second wireless device based on wireless device capability.

In an existing technology, in order to facilitate a base station to configure appropriate maximum MIMO layers for a cell, a wireless device may transmit to the base station a RRC message (e.g., UECapabilityInformation message, which may be transmitted in response to receiving from the base station a UECapabilityEnquiry message) comprising physical layer capability parameters of the wireless device, one of the physical capability parameters (e.g., maxLayersMIMO-Indication) indicating whether the wireless device supports (or is capable of) network configuration of the maximum MIMO layers for the cell. In response to the physical capability parameters indicating the wireless device supports the network configuration of the maximum MIMO layers for the cell, the base station may transmit to the wireless device RRC messages, for the cell (e.g., PDSCH-ServingCellConfig IE), comprising configuration parameters of the cell. The configuration parameters of the cell may comprise a cell-specific maximum MIMO layer indication (e.g., maxMIMO-Layers) for the cell. The maxMIMO-Layers (e.g., 1, 2, 3, . . . , 8, or any positive number) may indicate a maximum number of MIMO layers with which the wireless device can receive PDSCH of the cell. Different cells may be configured with different cell-specific maxMIMO-Layers.

In order to align between a base station and a wireless device on whether switching off one or more antennas is allowed, the base station may indicate to the wireless device a number of maximum MIMO layers (e.g., Lmax) with which the wireless device prepares to receive data packets. In an example, the base station may indicate to the wireless device a first number for Lmax at a first time, the wireless device may receive data packet with at most Lmax MIMO layers by operating with a plurality of antennas and RF modules. The base station may indicate to the wireless device a second number for Lmax at a second time, where the second number is less than the first number. The wireless device, based on the second number being less than the first number, may switch off one or more antennas and RF modules from the plurality of antennas and RF modules. After switching off the one or more antennas and RF modules, the wireless device may receive data packet with at most the second number of MIMO layers, by using the rest antennas and RF modules of the plurality of antennas and RF modules. The wireless device may reduce power consumption by switching off the one or more antennas and RF modules. The base station may enable the wireless device to switch off one or more antennas and RF modules by switching an active BWP from a first BWP with larger Lmax to a second BWP with smaller Lmax. The base station may enable the wireless device to switch off the one or more antennas and RF modules by transmitting a power saving indication comprising a new Lmax for an active BWP FIG. 32A and FIG. 32B show examples of Lmax adaptation for a cell.

Figure 32A:
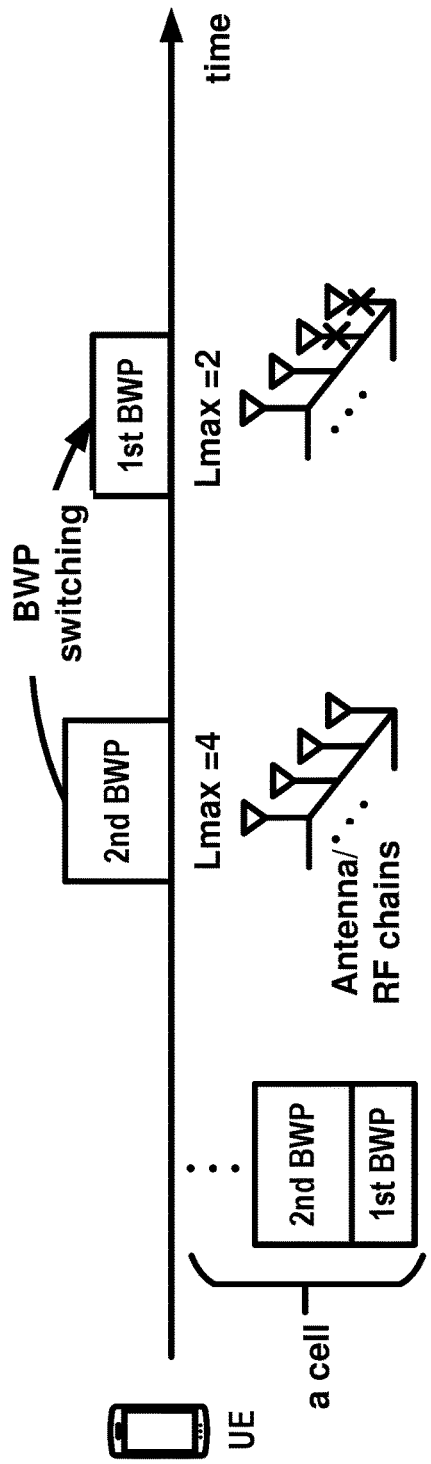
FIG. 32A and FIG. 32B illustrates MIMO layer adaptation mechanisms, according to some embodiments.

As shown in FIG. 32A, a wireless device may receive one or more RRC messages comprising configuration parameters of a cell, the cell comprising a plurality of BWPs (e.g., $1^{st}$ BWP, $2^{nd}$ BWP, and the like). The cell may be a PCell, or a SCell. In the example of FIG. 32A, the $1^{st}$ BWP is configured with a first Lmax (e.g., 2), and the $2^{nd}$ BWP is configured with a second Lmax (e.g., 4). The first BWP may be a default BWP, or an initial active BWP of the cell. In an example, the wireless device may activate the $2^{nd}$ BWP, e.g., when receiving a DCI indicating switching an active BWP to the $2^{nd}$ BWP. When the $2^{nd}$ BWP is in active state, the wireless device may switch on a plurality of antennas and RF modules to receive, via the $2^{nd}$ BWP, downlink TBs with at most the second Lmax of MIMO layers. In the example of FIG. 32A, the wireless device switches the active BWP to the first BWP, e.g., when receiving a DCI indicating switching the active BWP to the first BWP, or when a BWP inactivity timer of the cell expires. When the $1^{st}$ BWP is in active state, the wireless device, based on the first Lmax (e.g., 2) being less than the second Lmax (e.g., 4), may switch off one or more (e.g., 2) of the plurality of antennas and RF modules. The wireless device may receive a DCI indicating a number of MIMO layers for downlink assignment (e.g., dynamic or semi-persistent), the number (e.g., 1, or 2) being equal to or less than the first Lmax (e.g., 2). Based on the DCI indicating the number of MIMO layers, the wireless device may receive, via the $1^{st}$ BWP, downlink TBs with the number of MIMO layers by using the rest antennas and RF modules of the plurality of antennas and RF modules. By configuring different number of maximum MIMO layers for different BWPs, a wireless device may reduce power consumption by switching off one or more antennas and RF modules, when switching active BWP from a first BWP with larger Lmax to a second BWP with smaller Lmax.

Figure 32B:
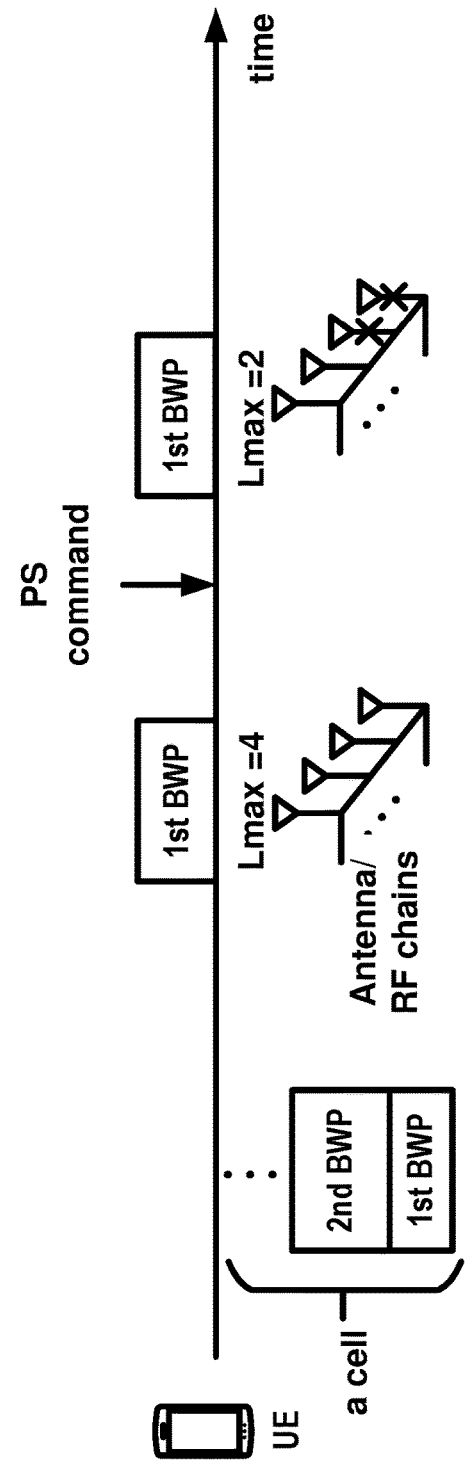

As shown in FIG. 32B, a wireless device may receive one or more RRC messages comprising configuration parameters of a cell, the cell comprising a plurality of BWPs (e.g., $1^{st}$ BWP, $2^{nd}$ BWP, and the like). The cell may be a PCell, or a SCell. In the example of FIG. 32B, the wireless device may receive downlink TBs with at most a first number (e.g., 4) of MIMO layers via an active BWP (e.g., $1^{st}$ BWP), the first number being configured for the active BWP in the one or more RRC messages. The wireless device may receive the downlink TBs by using a plurality of antennas and RF modules. The wireless device receives a power saving command indicating a power saving operation. The power saving operation may be implemented by examples of FIG. 30A, FIG. 30B and/or FIG. 31. The power saving command may be a DCI, a MAC CE, and/or an RRC message. The wireless device receives the power saving command in a DCI via a PDCCH of the active BWP. The power saving command may indicate a second number (e.g., 2) of maximum MIMO layers for the active BWP. In response to receiving the power saving command, the wireless device, based on the second number being less than the first number, may switch off one or more (e.g., 2) of the plurality of antennas and RF modules. The wireless device may receive a DCI indicating a third number of MIMO layers for downlink assignment (e.g., dynamic or semi-persistent), the third number (e.g., 1, or 2) being equal to or less than the second number. Based on the DCI indicating the third number of MIMO layers, the wireless device may receive, via the active BWP, downlink TBs with the third number of MIMO layers. Based on a power saving command indicating a reduced number of maximum MIMO layers for an active BWP, a wireless device may reduce power consumption by switching off one or more antennas and RF modules on the active BWP.

In an example, a wireless device may, for the purpose of power saving, adapt (or reduce) a value of a maximum number (Lmax) of MIMO layers for reception of downlink TBs, based on an active BWP switching when different BWPs are configured with different Lmax values. In an example, a wireless device may, for the purpose of power saving, adapt (or reduce) a value of Lmax for reception of downlink TBs, based on a power saving command indicating the reduction of Lmax value on an active BWP. In an example, the wireless device may operate in multiple cells when the wireless device supports carrier aggregation (CA) technologies. The multiple cells may be in a same frequency band (e.g., intra-band CA), or in different frequency bands (e.g., inter-band CA). The wireless device may use a same plurality of antennas and RF modules for operating on multiple cells when the multiple cells are in a same frequency band. The wireless device may use different plurality of antennas and RF modules for operating on multiple cells when the multiple cells are in different frequency bands.

In an example, a first cell and a second cell may be in a same frequency band, or in a same frequency range, where the first cell and the second cell share a same set of antennas and RF modules. The second cell may be cross-carrier scheduled by the first cell. Each BWP of the first cell and the second cell is configured with a BWP specific Lmax. The wireless device, by using existing technologies, may have difficulty in determining whether to switch off one or more of antennas and RF modules for a first active BWP of the second cell, when indicated by a base station to reduce a value of Lmax for a second active BWP of the first cell, if the first active BWP is configured with a value of Lmax bigger than that of the second active BWP. For example, the wireless device, by using existing technologies, is not allowed to switch off the one or more antennas and RF modules for the first active BWP, when the first active BWP is configured with a BWP specific Lmax with a value greater than that of the second active BWP. Not switching off the one or more antennas and RF modules may increase power consumption of the wireless device, which is conflicting with the goal of each BWP being configured with a BWP specific Lmax. Existing technologies may result in misalignment between the wireless device and a base station regarding a Lmax of a cell, and/or increase power consumption of a wireless device. Embodiments of present disclosure may reduce the misalignment between the wireless device and the base station regarding the maximum value of MIMO layers, and/or reduce the power consumption of the wireless device.

Figure 33:
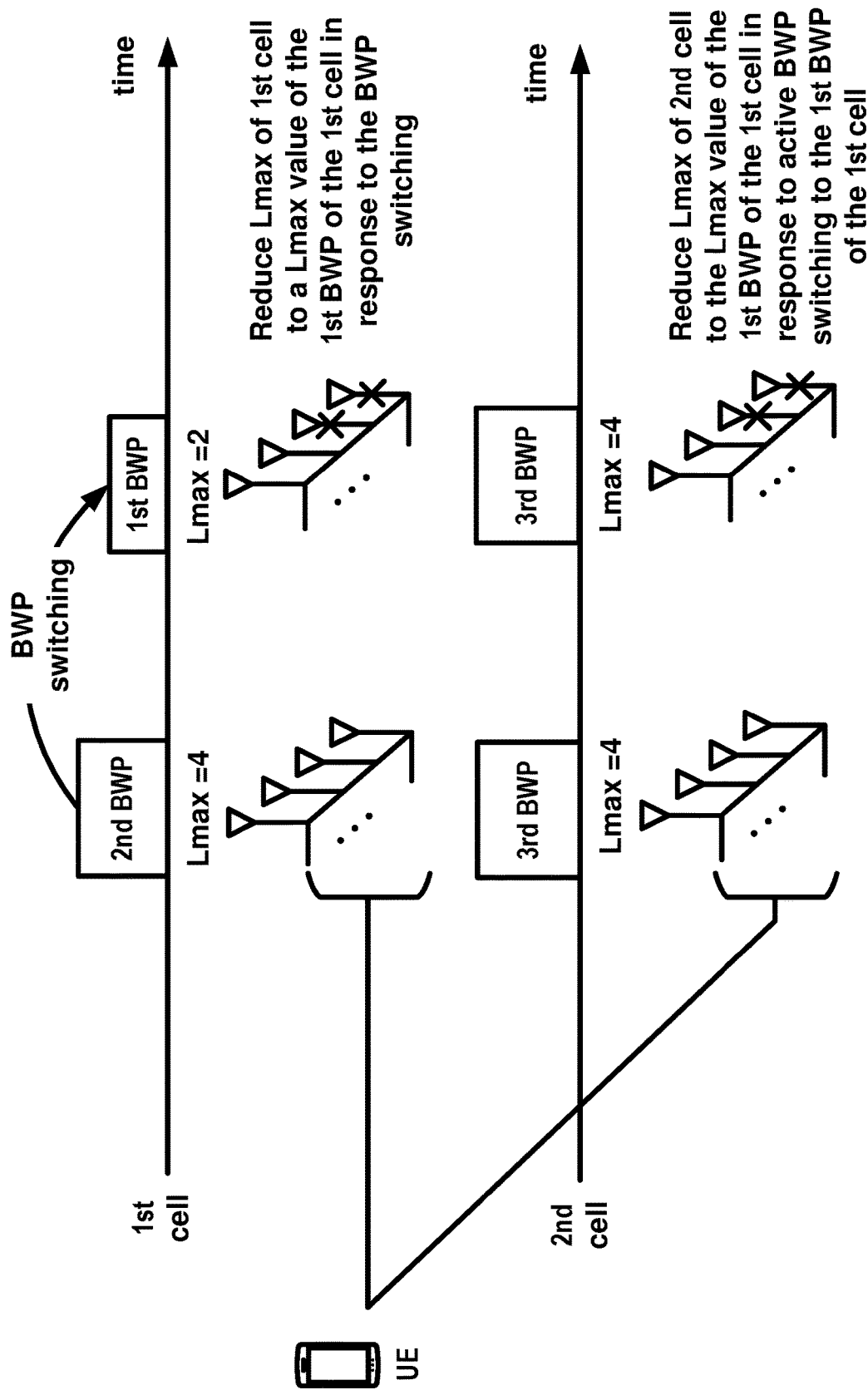
FIG. 33 illustrates MIMO layer adaption in multiple cells, according to some embodiments.

FIG. 33 shows an example of MIMO layer adaptation in CA. In the example of FIG. 33, a wireless device is equipped with a plurality of antennas. Based on the plurality of antennas, the wireless device may transmit to a base station one or more capability (or assistant) parameters in an RRC message (e.g., UE-NR-Capability IE, UE-MRDC-Capability IE, UEAssistanceInforrmation IE and the like) indicating a maximum value of MIMO layers (Lmax) the wireless device may process. The base station may transmit to the wireless device one or more RRC message (e.g., ServingCellConfig IE, PDSCH-Config IE, PDSCH-ServingCell-Config IE, and the like) comprising configuration parameters of a first cell and a second cell, the first cell comprising a first plurality of BWPs, and the second cell comprising a second plurality of BWPs. Based on the one or more capability (or assistant) parameters, each BWP of the first cell and the second cell may be configured with a BWP specific Lmax value, the BWP specific Lmax value being equal to or less than the maximum value of MIMO layers the wireless device indicates to the base station. In the example of FIG. 33, a first BWP ($1^{st}$ BWP) of the first cell is configured with Lmax=2, a second BWP ($2^{nd}$ BWP) of the first cell is configured with Lmax=4, and a third BWP ($3^{rd}$ BWP) of the second cell is configured with Lmax=4. The first cell and the second cell may be in a same frequency band, or in a same frequency range. The second cell and the first cell may be self-scheduled by implementing examples of FIG. 24A. The second cell may be cross-carrier scheduled by the first cell by implementing examples of FIG. 24B. The wireless device may receive TBs via the first cell and the second cell with a same plurality of antennas, RF chains, and/or baseband processors, e.g., when the first cell and the second cell are in a same frequency band or frequency range.

In the example of FIG. 33, the wireless device may receive first TBs with at most Lmax=4 MIMO layers on the second BWP of the first cell, the second BWP being in active state. The wireless device may receive second TBs with at most Lmax=4 MIMO layers on the third BWP of the second cell, the third BWP being in active state. The wireless device switches to the first BWP ($1^{st}$ BWP) of the first cell as the active BWP of the first cell, where the first BWP is configured with Lmax=2 (or any number less than Lmax of the second BWP of the first cell). The wireless device may switch to the first BWP in response to receiving a command (e.g., RRC, MAC CE, and/or DCI) indicating switching to the first BWP. The wireless device may switch to the first BWP in response to receiving a power saving command via a power saving channel, the power saving command indicating the BWP switching. The wireless device may switch to the first BWP in response to an expiry of a BWP inactivity timer of the first cell. The first BWP may be a default or initial active BWP of the first cell. The first BWP may be a non-default BWP of the first cell. As shown in FIG. 33, the wireless device may operate on the first BWP of the first cell and the third BWP of the second cell simultaneously or parallelly. Based on a first Lmax of the first BWP being less than a second Lmax of the third BWP, the wireless device applies the first Lmax to the third BWP of the second cell in response to at least one of: the first cell and the second cell being in a same frequency band, the first cell and the second cell being in a same frequency range (e.g., frequency range 1 below than 6 GHz or frequency range 2 higher than 6 GHZ), the second cell being cross-carrier scheduled by the first cell, and/or the second cell not being configured with reference signals (e.g., SSBs, and/or CSI-RSs) and the first cell being configured with the reference signals. Based on a first Lmax of the first BWP being less than a second Lmax of the third BWP, the wireless device applies the first Lmax to the third BWP in response to at least one of: the first BWP and the third BWP being in a same frequency band, the first BWP and the third BWP being in a same frequency range (e.g., frequency range 1 below than 6 GHz or frequency range 2 higher than 6 GHZ), the third BWP being cross-carrier scheduled by the first BWP, and/or the third BWP not being configured with reference signals (e.g., SSBs, and/or CSI-RSs) and the first BWP being configured with the reference signals. By applying the first Lmax to the third BWP, the wireless device may switch off one or more antennas, RF chains, and/or baseband processors for saving power consumption for the wireless device. By applying the first Lmax to the third BWP, the wireless device may receive downlink TBs with at most the first Lmax MIMO layers, and ignore the second Lmax configured on the third BWP. In an example, the wireless device may receive the downlink TBs with a number of MIMO layers, the number being equal to or less than the first Lmax value, and the number being indicated in a DCI (e.g., DCI format 0_1, 1_1, and the like) indicating transmission of the downlink TBs. By the example embodiment, the wireless device, based on applying a reduced Lmax value of a first BWP of a first cell on a second BWP of a second cell, may switch off one or more of antennas and RF chains configured on the wireless device, when the wireless device switches to the first BWP as an active BWP of the first cell. Example embodiments may improve power consumption. Example embodiments my reduce downlink signal overhead, which otherwise is required to indicate whether the wireless shall apply the reduced Lmax on the second BWP of the second cell. The example embodiments may result in reduction of system throughput on the second cell. The example embodiments may be beneficial for reducing power consumption of the wireless device when power consumption is a higher priority for the wireless device than system throughput.

Figure 34:
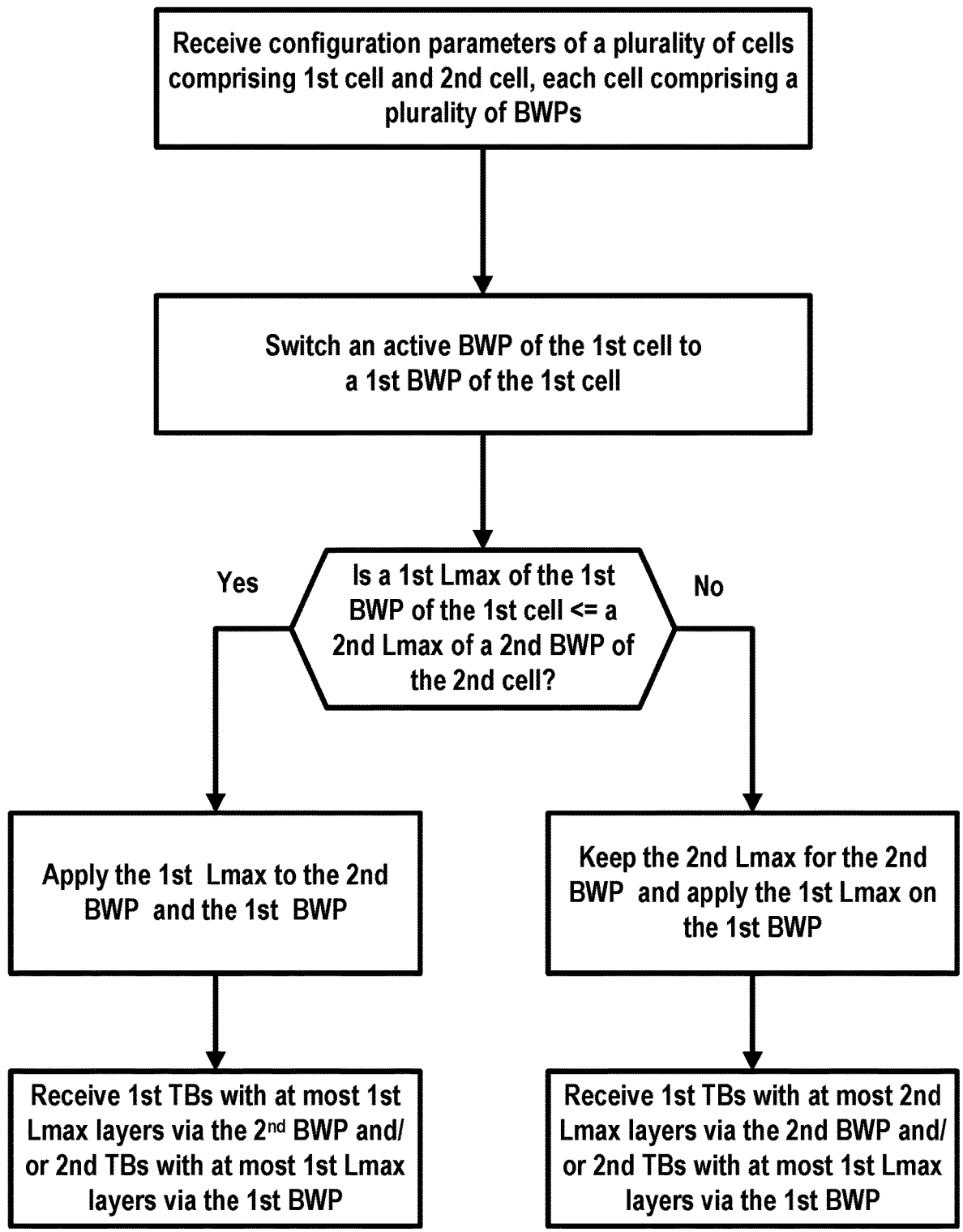
FIG. 34 is a flow diagram of MIMO layer adaptation in multiple cells, according to some embodiments.

FIG. 34 shows an example of flowchart of maximum MIMO layer adaption for power saving. In an example, a wireless device receives configuration parameters of a plurality of cells comprising a first cell and a second cell, each cell comprising a plurality of BWPs. A BWP may be configured with a BWP specific value of maximum number (Lmax) of MIMO layers. In the example of FIG. 34, the wireless device switches to a first BWP of the first cell as an active BWP of the first cell, e.g., based on receiving a DCI indicating the BWP switching or an expiry of a BWP inactivity timer of the first cell. Based on the BWP switching, the wireless device may determine whether a first Lmax of the first BWP of the first cell is less than or equal to a second Lmax of the second BWP of the second cell, where the second Lmax is configured on the second BWP.

In response to the first Lmax being less than or equal to the second Lmax, the wireless device may apply the first Lmax to the second BWP and the first BWP. Based on the applying the first Lmax to the second BWP and the first BWP, the wireless device may switch off one or more antennas, RF chains, and/or baseband processors, in response to the first Lmax being less than the second Lmax. The wireless device may receive, via the first BWP, first TBs with a first number of MIMO layers, the first number being equal to or less than the first Lmax, e.g., when the first TBs are scheduled in a first DCI comprising the first number. The wireless device may receive, via the second BWP, second TB with a second number of MIMO layers, the second number being equal to or less than the first Lmax, e.g., when the second TBs are scheduled in a second DCI comprising the second number.

In response to the first Lmax being greater than the second Lmax, the wireless device may keep the second Lmax for the second BWP and apply the first Lmax for the first BWP. Based on the applying the first Lmax to the first BWP, the wireless device may switch off one or more antennas, RF chains, and/or baseband processors. The wireless device may receive, via the first BWP, first TBs with a first number of MIMO layers, the first number being equal to or less than the first Lmax, e.g., when the first TBs are scheduled in a first DCI comprising the first number. The wireless device may receive, via the second BWP, second TB with a second number of MIMO layers, the second number being equal to or less than the second Lmax, e.g., when the second TBs are scheduled in a second DCI comprising the second number.

By the example embodiments of FIG. 34, the wireless device may determine whether apply a first Lmax of a first BWP of a first cell to a second BWP of a second cell based on whether the first Lmax of the first BWP is less than a second Lmax configured on the second BWP. In response to the first Lmax being greater than the second Lmax, the wireless device may switch off a proper number of antennas and/or RF chains so that the wireless device may receive via the second BWP with at most the second Lmax of MIMO layers and receive via the first BWP with at most the first Lmax of MIMO layers. In response to the first Lmax being less than the second Lmax, the wireless device may switch off a proper number of antennas and/or RF chains so that the wireless device may receive via the second BWP with at most the first Lmax of MIMO layers and receive via the first BWP with at most the first Lmax of MIMO layers. Example embodiment may enable a tradeoff between power saving and system throughput.

In existing technologies, a wireless device may transmit, to a base station, a wireless device capability information indicating a number of maximum MIMO layers the wireless device supports for receiving PDSCH on a cell. The base station may transmit to the wireless device, based on the wireless device capability information, an RRC message comprising configuration parameters of the cell, the configuration parameters comprising a cell specific number (e.g., Lmax) of maximum MIMO layers for the cell. The wireless device may apply the cell specific number of maximum MIMO layers for receiving PDSCH data via the cell. Different cell may be associated with different cell specific number of maximum MIMO layers.

In an example, a wireless device, based on the existing technologies, may assume (or determine) that Lmax for each BWP (e.g., DL BWP or UL BWP) of a plurality of BWPs of the cell is same as the cell specific number of maximum MIMO layers. The base station, based on the wireless device capability information indicating the number of maximum MIMO layers the wireless device supports for receiving PDSCH on the cell, may determine that the cell specific number of maximum MIMO layers are applied on each BWP of the cell. However, some wireless devices may be equipped with advanced multiple antenna algorithm (implementation, or structure). These wireless devices may support a BWP specific, rather than a cell specific, number of maximum MIMO layers for a BWP of a cell. In an example, other wireless devices may be equipped with normal multiple antenna algorithm, which may only support a cell specific number of maximum MIMO layers for the cell. The base station, based on existing technologies, may not be able to configure a BWP specific number of maximum MIMO layers for a wireless device although the wireless device is capable of processing PDSCHs with different number of maximum MIMO layers for different BWPs of a cell. This may restrict the base station from flexibly configuring maximum MIMO layers for different BWPs of the cell. Lacking flexible configuration of maximum MIMO layers per BWP for a cell may increase power consumption of the wireless device, e.g., where the wireless device assumes that the number of maximum MIMO layers are same for all BWPs of the cell. The wireless device may not be enabled to switch off some antenna modules (e.g., for power saving) when switching active BWP of the cell. There is a need to improve power consumption for MIMO layer adaptation for a cell when the cell comprises a plurality of BWPs.

In an example, one of embodiments comprises a wireless device transmitting to a base station a wireless device capability information indicating a plurality of numbers of maximum MIMO layers for a cell comprising a plurality of BWPs. In an example, the wireless device capability information may indicate that the wireless device support configuration of a BWP specific number of maximum MIMO layers for a BWP of a cell. Based on the wireless device capability information, the base station may transmit to the wireless device RRC message comprising configuration parameters of the cell, the configuration parameters comprising a first Lmax value indicating a first number of maximum MIMO layers for a first BWP of the cell and a second Lmax value indicating a second number of maximum MIMO layers for a second BWP of the cell. The wireless device may apply a Lmax value, selected from the first Lmax value and the second Lmax value, corresponding to an active BWP (e.g., the first BWP or the second BWP), for receiving downlink packets via a PDSCH of the active BWP. Example embodiment may enable the base station to flexibly configure BWP specific Lmax for a BWP of a cell for a wireless device based on the wireless device capability information. Example embodiment may enable the wireless device to reduce power consumption by switching off some antenna modules (e.g., for power saving) when switching active BWP of the cell.

Figure 35:
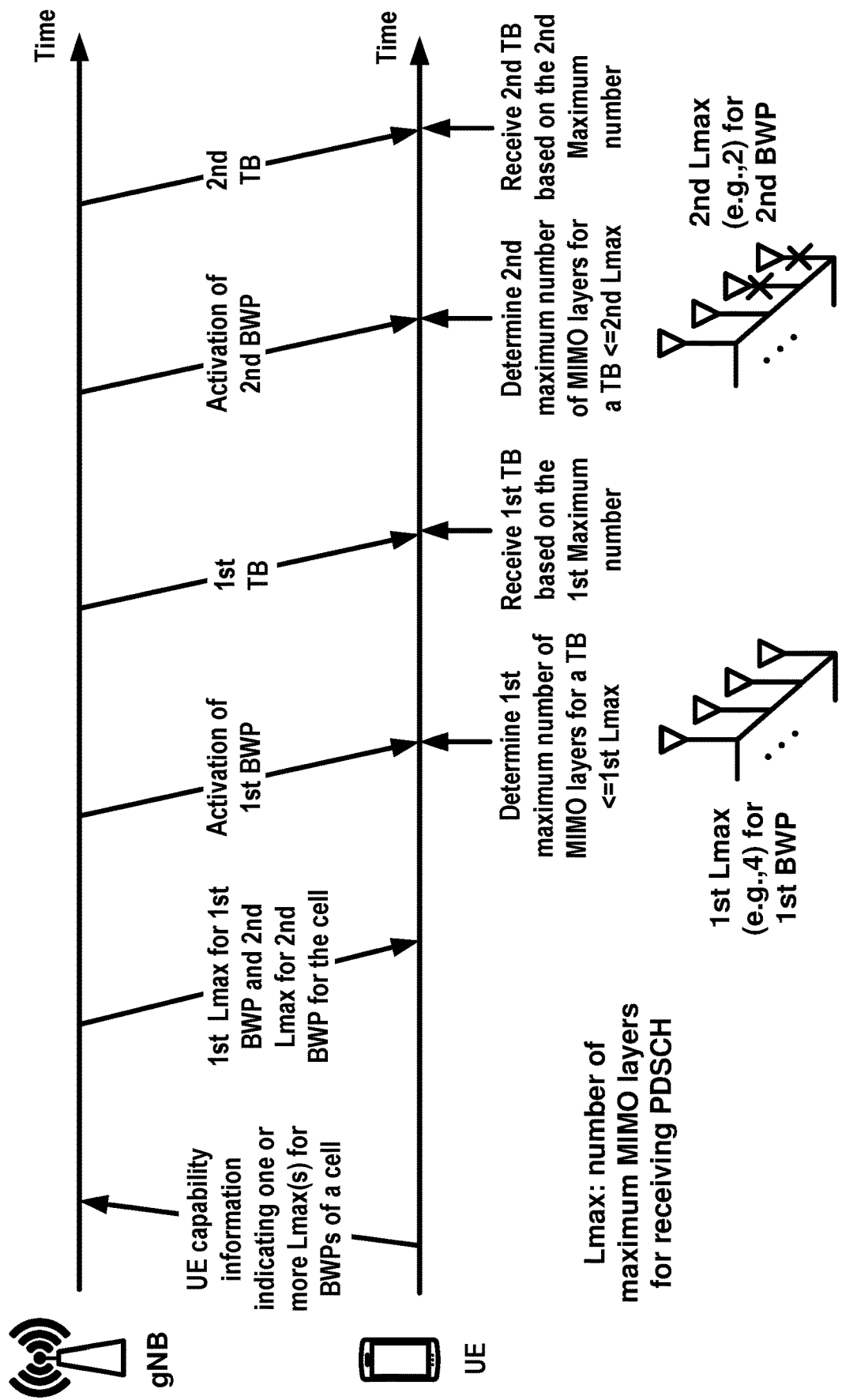
FIG. 35 illustrates MIMO layer adaptation in multiple cell groups, according to some embodiments.

FIG. 35 shows an example of embodiment for MIMO layer adaptation. In an example, a wireless device may transmit to a base station a wireless device capability information (e.g., UE-NR-Capability IE, UE-MRDC-Capability IE, UECapabilityInformation message, etc.). The wireless device may transmit the wireless device capability information in response to receiving a wireless device capability request message (e.g., UECapabilityEnquiry IE, etc.) from the base station. The wireless device capability information may comprise one or more numbers (e.g., Lmax) indicating number of maximum MIMO layers for a plurality of BWPs of a cell. Each of the one or more numbers may correspond to a respective one of the plurality of BWPs. In an example, the wireless device capability information may indicate that the wireless device supports configuration of a BWP specific number of maximum MIMO layers for a BWP of a cell.

As shown in FIG. 35, the base station, based on the wireless device capability information, may transmit to the wireless device RRC message comprising configuration parameters of the cell, the configuration parameters comprising a first Lmax value (e.g., 4 as shown in FIG. 35) for the first BWP and a second Lmax value (e.g., 2 as shown in FIG. 35) for the second BWP. In an example, the first Lmax value may be less than or equal to a first one of the one or more numbers indicated in the wireless device capability information, wherein the first one of the one or more numbers corresponds to the first BWP. The second Lmax value may be less than or equal to a second one of the one or more numbers indicated in the wireless device capability information, wherein the second one of the one or more numbers corresponds to the second BWP. In an example, when the wireless device capability information indicates that the wireless device support a cell specific Lmax configuration, the configuration parameters may comprise a cell specific Lmax for the cell, the cell specific Lmax being applied on all BWPs of the cell.

As shown in FIG. 35, the wireless device may activate the first BWP of the cell, e.g., in response to receiving a DCI indicating the activating the first BWP or in response to an expiry of a BWP inactivity timer. Based on the activating the first BWP, the wireless device may determine that the first Lmax value is the number of maximum MIMO layers with which the wireless device may apply for receiving transport block (TB) via a PDSCH of the first BWP. In an example, the wireless device may activate a number of antenna modules, from a plurality of antenna modules the wireless device is quipped, for accommodating TB reception with a number of MIMO layers wherein the number is less than or equal to the first Lmax value. In an example, the wireless device may receive via the first BWP, a first TB with a number of MIMO layers based on the first Lmax value.

As shown in FIG. 35, the wireless device may switch from the first BWP to the second BWP as the active BWP of the cell. Based on the activating the second BWP, the wireless device may determine that the second Lmax value is the number of maximum MIMO layers with which the wireless device may apply for receiving transport block (TB) via a PDSCH of the second BWP. In an example, the wireless device may activate a number of antenna modules, from a plurality of antenna modules the wireless device is quipped, for accommodating TB reception with a number of MIMO layers wherein the number is less than or equal to the second Lmax value. In an example, the wireless device may receive via a second BWP, a second TB with a number of MIMO layers based on the second Lmax value. By implementing example embodiment of FIG. 35, the base station may be enabled to flexibly configure BWP specific Lmax for a BWP of a cell for a wireless device based on the wireless device capability information. By implementing example embodiment of FIG. 35, the wireless device may reduce power consumption by switching off some antenna modules (e.g., for power saving) when switching active BWP of the cell.

Figure 36:
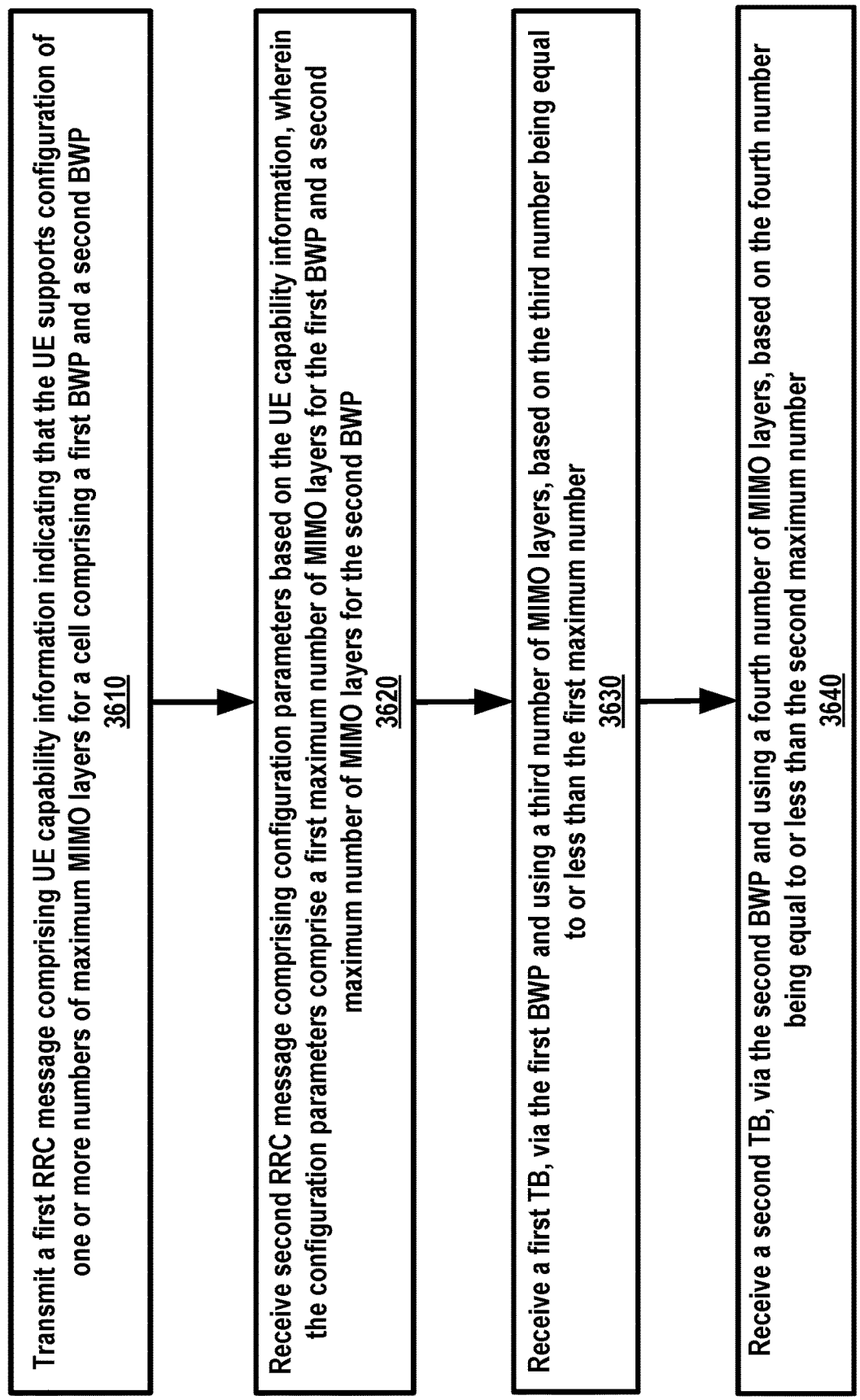
FIG. 36 illustrates MIMO layer adaptation, according to some embodiments.

FIG. 36 shows a flowchart of MIMO layer adaptation as per an aspect of an example embodiment of the present disclosure. At 3610, a wireless device transmits first RRC message comprising wireless device capability information indicating that the wireless device supports configuration of one or more numbers of maximum MIMO layers for a cell comprising a first BWP and a second BWP. At 3620, the wireless device receives second RRC message comprising configuration parameters based on the wireless device capability information, wherein the configuration parameters comprise a first maximum number of MIMO layers for the first BWP and a second maximum number of MIMO layers for the second BWP. At 3630, the wireless device receives a first TB, via the first BWP and using a third number of MIMO layers, based on the third number being equal to or less than the first number. At 3640, the wireless device receives a second TB, via the second BWP and using a fourth number of MIMO layers, based on the fourth number being equal to or less than the second number.

In an example, a wireless device may transmit, to a base station, a capability information indicating that the wireless device supports configuration of one or more numbers of maximum multiple-input multiple-output (MIMO) layers for a cell comprising a first bandwidth part (BWP) and a second BWP. The wireless device may receive, based on the capability information, configuration parameters comprising a first maximum number of MIMO layers associated with the first BWP and a second maximum number of MIMO layers associated with the second BWP. The wireless device may receive a transport block, via the first BWP and using a number of MIMO layers based on the number being equal to or less than the first maximum number.

According to an example embodiment, the number is equal to or less than the first maximum number based on the receiving the transport block via the first BWP. The configuration parameters are comprised in a radio resource control message received by the wireless device. The capability information is comprised in a radio resource control message transmitted by the wireless device.

According to an example embodiment, the one or more numbers comprise a first BWP specific maximum number of MIMO layers for the first BWP of the cell and a second BWP specific maximum number of MIMO layers for the second BWP of the cell.

According to an example embodiment, the first maximum number is less than or equal to one of the one or more numbers. The second maximum number is less than or equal to one of the one or more numbers.

According to an example embodiment, the wireless device receives a first downlink control information scheduling the transport block, wherein the first downlink control information indicates the number.

According to an example embodiment, the wireless device switches from the first BWP to the second BWP in response to receiving a downlink control information indicating the switching. The wireless device switches from the first BWP to the second BWP in response to an expiry of a BWP inactivity timer of the cell.

According to an example embodiment, the wireless device receives a second transport block, via the second BWP and using a third number of MIMO layers based on the third number being equal to or less than the second maximum number. The wireless device receives a second downlink control information scheduling the second transport block, wherein the second downlink control information indicates the third number.

According to an example embodiment, the wireless device receives a radio resource control message comprising a wireless device capability request. The wireless device, in response to receiving the radio resource control message, transmits a second radio resource control message comprising the capability information.

According to an example embodiment, the cell comprises a first transmission reception point (TRP) and a second TRP. The configuration parameters comprise a third maximum number of MIMO layers for the first TRP and a fourth maximum number of MIMO layers for the second TRP. The first TRP is associated with a first plurality of control resource sets, wherein the first plurality of control resource sets is associated with a first control resource set pool index. The second TRP is associated with a second plurality of control resource sets, wherein the second plurality of control resource sets is associated with a second control resource set pool index. The wireless device receives, via one of the first plurality of control resource sets associated with the first TRP, a first downlink control information scheduling a third transport block. The wireless device receives the third transport block, based on the first downlink control information and via the first TRP and using a third number of MIMO layers based on the third number being equal to or less than the third maximum number. The third number is indicated in the first downlink control information. The wireless device receives, via one of the second plurality of control resource sets associated with the second TRP, a second downlink control information scheduling a fourth transport block. The wireless device receives the fourth transport block, based on the second downlink control information and via the second TRP and using a fourth number of MIMO layers based on the fourth number being equal to or less than the fourth maximum number. The fourth number is indicated in the second downlink control information.

Figure 37:
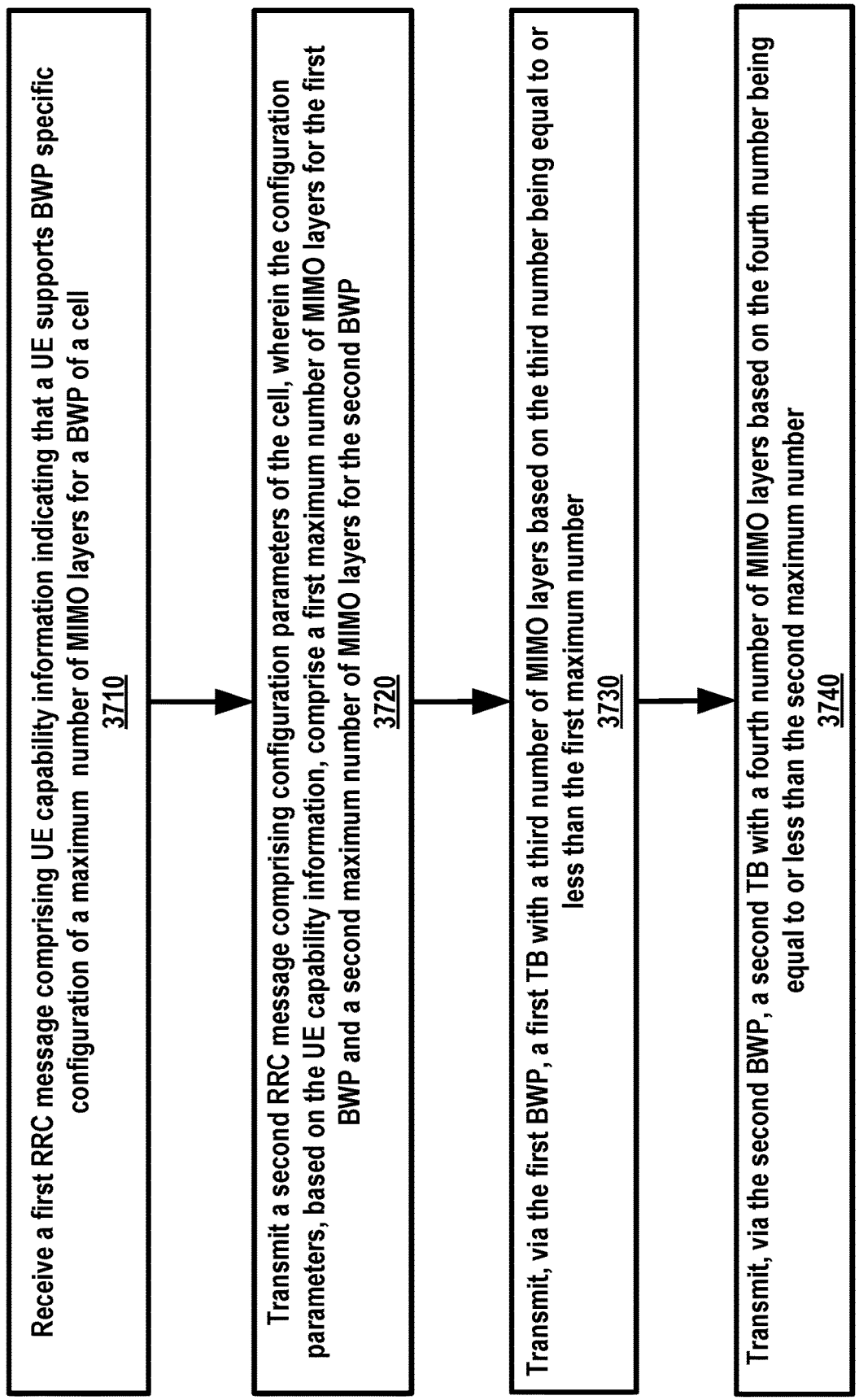
FIG. 37 is a flow diagram of MIMO layer adaptation, according to some embodiments.

FIG. 37 shows a flowchart of MIMO layer adaptation for a base station as per an aspect of an example embodiment of the present disclosure. At 3710, a base station receives first RRC message comprising wireless device (or UE) capability information indicating that the wireless device supports a BWP specific configuration of a maximum number of MIMO layers for a BWP of a cell. At 3720, the base station transmits a second RRC message comprising configuration parameters of the cell, wherein the configuration parameters, based on the wireless device capability information, comprise a first maximum number of MIMO layers for a first BWP of the cell and a second maximum number of MIMO layers for a second BWP of the cell. At 3730, the base station transmits, via the first BWP, a first TB with a third number of MIMO layers based on the third number being equal to or less than the first maximum number. At 3740, the base station transmits, via the second BWP, a second TB with a fourth number of MIMO layers based on the fourth number being equal to or less than the second maximum number.

In existing technologies, a wireless device may transmit to a base station a wireless device assistance information (e.g., UEAssistanceInformation message) indicating a number of MIMO layers to be reduced, from a current number of MIMO layers, for PDSCH reception when the wireless device experiences internal overheating. The number of MIMO layers to be reduced may be indicated per cell group (e.g., a first cell group in FR1, a second cell group in FR 2). In an example, the wireless device assistance information may comprise a first number for reduced MIMO layers for each cell in a first cell group and a second number for reduced MIMO layers for each cell in a second cell group. The wireless device may experience internal overheating when the wireless device operates in a transmission or reception with high data rate and/or high power out, e.g., by using all antenna modules, or all carriers). The reduced number of MIMO layers indicated in the wireless device assistance information may be transmitted in response to the wireless device experiencing the internal overheating. The wireless device may not transmit the wireless device assistance information indicating the reduced number of MIMO layers in response to not experiencing the internal overheating.

In an example, based on existing technologies, a base station may be not aware of a number of maximum MIMO layers a wireless device may process in a power saving operation. The wireless device may switch to a power saving operation (e.g., reduced data rate, reduced PDCCH monitoring, reduced bandwidth, etc.) when data traffic is sporadic, or data traffic is not urgent. A power saving operation may be implemented based on example of FIG. 30A, FIG. 30B and/or FIG. 31. In an example, by implementing existing technologies, the wireless device may reuse the process, of wireless device assistance information transmission designed for the internal overheating, for MIMO layer adaptation in the power saving operation. However, if the wireless device reuses the process, of wireless device assistance information transmission designed for the internal overheating, for MIMO layer adaptation in the power saving operation, the base station may not determine whether the number of MIMO layers the wireless device indicates is for the internal overheating, or for the power saving operation. There is a need to improve power consumption for a power saving operation when MIMO layer adaption is supported by a wireless device.

In an example, one of example embodiments may comprise transmitting by a wireless device a UE assistance information for a power saving operation, the UE assistance information comprising a first number (Lmax) of maximum MIMO layers for a first cell group (e.g., FR 1) and a second number of maximum MIMO layers for a second cell group (e.g., FR 2). In an example, the UE assistance information for the power saving operation may be different and separate from a UE assistance information for internal overheating. The UE assistance information for the internal overheating may comprise a third number of maximum MIMO layers for the first cell group and a fourth number of maximum MIMO layers for the second cell group. The first number may be independently or separately configured from the third number. The second number may be independently or separately configured from the fourth number. The UE assistance information for the power saving operation may be triggered/transmitted independently or separately form the UE assistance information for the internal overheating. Based on the UE assistance information, of the power saving operation, comprising the first number (Lmax) of maximum MIMO layers for the first cell group and the second number of maximum MIMO layers for the second cell group, the base station may transmit to the wireless device RRC messages comprising configuration parameters. The configuration parameters may comprise a third number of maximum MIMO layers for a first cell, wherein the third number is less than or equal to the first number in response to the first cell belonging to the first cell group. The configuration parameters may comprise a fourth number of maximum MIMO layers for a second cell, wherein the fourth number is less than or equal to the second number in response to the second cell belonging to the second cell group. Based on the RRC messages, the wireless device may receive first TB via the first cell based on the third number of maximum MIMO layers. The wireless device may receive second TB via the second cell based on the fourth number of maximum MIMO layers. Example embodiments may improve power consumption of the wireless device and/or reduce signaling overhead (e.g., transmitted from the wireless device and/or transmitted from the base station).

Figure 38:
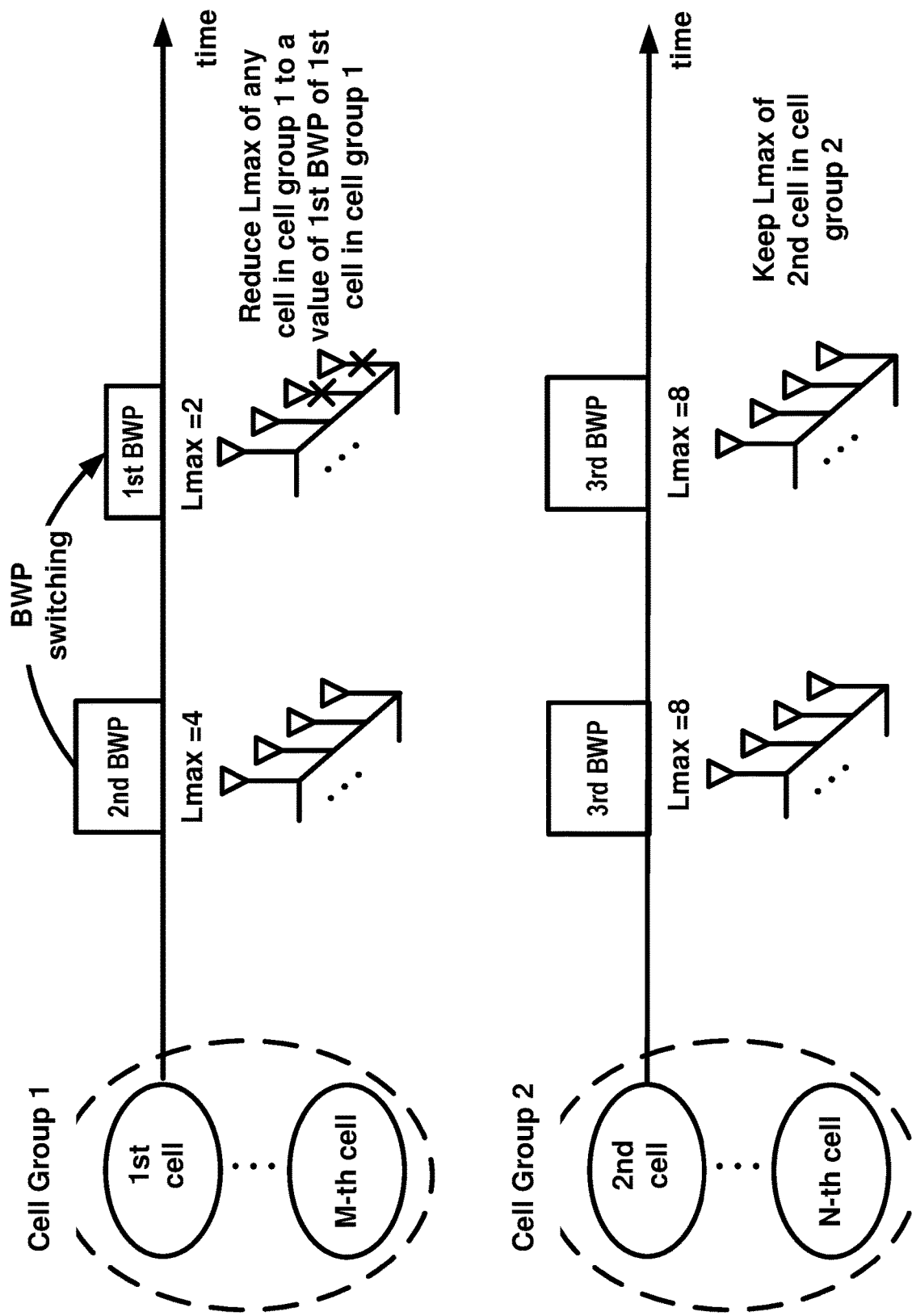
FIG. 38 illustrates MIMO layer adaptation in multiple cells, according to some embodiments.

FIG. 38 shows an example of cell group based MIMO layer adaptation. In the example of FIG. 38, a wireless device may receive from a base station one or more RRC messages comprising configuration parameters of a plurality of cells grouped into a plurality of cell groups. The base station may group the plurality of cells based on one or more criteria comprising at least one of: a timing advance value, a frequency band, a frequency range, a radio interface type (e.g., Uu interface or sidelink interface), and the like. In an example, a first cell and a second cell may belong to a same cell group in response to at least one of: the first cell and the second cell having a same timing advance value (e.g., in a same TAG), the first cell and the second cell being in a same frequency band, the first cell and the second cell being in a same frequency range, the first cell and the second cell both being for an Uu interface between a wireless device and a base station. In an example, a first cell and a second cell may belong to different cell groups in response to at least one of: the first cell and the second cell having different timing advance values, the first cell and the second cell being in different frequency bands, the first cell and the second cell being in different frequency ranges, the first cell being for an Uu interface and the second cell being for V2X interface or vice versa.

In an example, the wireless device may transmit to the base station one or more UE assistant messages (e.g., UEAssistanceInforrmation IE) comprising indication of one or more cell groups. The wireless device may group a plurality of cells into the one or more cell groups based on antenna deployment and/or hardware implementation. In response to one or more cells being grouped into a same cell group, the one or more cells (or default BWPs of the one or more cells) may be allowed to be configured with a same Lmax, e.g., when the one or more cells share a same set of antennas and/or RF chains. Each cell group may be configured with different Lmax value. When receiving an indication of Lmax change for a cell (or a BWP) in a cell group, the wireless device may apply the change for multiple cells (or multiple active BWPs of the multiple cells) in the same cell group. When receiving an indication of Lmax change for a cell (or a BWP) in a cell group, the wireless device may maintain Lmax values for multiple cells (or active BWPs of the multiple cells) in a different cell group.

One or more embodiments of this specification may be combined to implement as an embodiment. In an example, FIG. 32~FIG. 38 may be combined to further improve power consumption of the wireless device. In an example, the wireless device may transmit to the base station one or more UE assistance messages (e.g., UEAssistanceInforrmation IE), for a power saving operation, comprising a cell group specific number of maximum MIMO layers for a cell group. The UE assistance message may comprise a first number of maximum MIMO layers for a first cell group comprising a first plurality of cells and a second number of maximum MIMO layers for a second cell group comprising a second plurality of cells.

In the example of FIG. 38, the wireless device may operate on a second BWP (e.g., $2^{nd}$ BWP) of a first cell belonging to a first cell group, where the wireless device may be configured with a first Lmax=4 for the second BWP. The wireless device may receive via the second BWP, TBs with at most the first Lmax MIMO layers. The wireless device may operate on a third BWP (e.g., 3rd BWP) of a second cell belonging to a second cell group, where the wireless device may be configured with a second Lmax=8 for the third BWP. The wireless device may receive via the third BWP, TBs with at most the second Lmax MIMO layers.

In the example of FIG. 38, the wireless device may switch from the second BWP to a first BWP (e.g., $1^{st}$ BWP) of the first cell as an active BWP of the first cell, where the first BWP is configured with a third Lmax (e.g., Lmax=2, or any number less than the first Lmax). The wireless device may switch to the first BWP in response to receiving a DCI indicating the BWP switching or an expiry of a BWP inactivity timer of the first cell. In response to switching to the first BWP of the first cell, the wireless device applies the third Lmax of the first BWP to one or more active BWPs of one or more cells in the first cell group. The wireless device may apply the third Lmax of the first BWP to one or more active BWPs of one or more cells in the first cell group, if the third Lmax is smallest among Lmax values of the one or more active BWPs. The wireless device may switch off one or more antennas and/or RF chains so that the wireless device may receive TBs with at most the third Lmax of MIMO layers via any active BWP of an active cell of the first cell group. In response to switching to the first BWP of the first cell, the wireless device will not apply the third Lmax of the first BWP to one or more active BWPs of one or more cells in the second cell group. The wireless device may keep Lmax values configured on the one or more active BWPs unchanged. By grouping cells into cell groups, the wireless device may determine whether apply a first Lmax of a first BWP of a first cell to a second BWP of a second cell, based on whether the first cell and the second belong to a same cell group. Example embodiments may improve power consumption. Example embodiments my reduce downlink signal overhead, which otherwise is required to indicate whether the wireless shall apply the reduced Lmax on the second BWP of the second cell. Example embodiments may reduce power consumption of the wireless device working on a first cell group and maintain system throughput on a second cell group.

In an example, a wireless device receives configuration parameters of a first cell and a second cell, the configuration parameters comprising a first maximum number of multiple input multiple output (MIMO) layers of a first bandwidth part (BWP) of the first cell and a second maximum number of MIMO layers of a second BWP of the second cell. The wireless device receives, via the second BWP, a first transport block (TB) with a third number of MIMO layers based on third number being less than or equal to the second maximum number. The wireless device switches an active BWP of the first cell to the first BWP of the first cell. In respond to the switching, the wireless device selects one of the first maximum number and the second maximum number as a selected number for the second BWP based on whether the first maximum number is less than the second maximum number. The wireless device receives, via the second BWP, a second TB with a fourth number of MIMO layers based on the fourth number being less than or equal to the selected number.

According to an example embodiment, the wireless device selects the first maximum number as the selected number in response to the first maximum number being less than or equal to the second maximum number.

According to an example embodiment, the wireless device selects the second maximum number as the selected number in response to the second maximum number being less than or equal to the first maximum number.

In an example, a wireless device receives configuration parameters comprising a first maximum number of multiple input multiple output (MIMO) layers of a first bandwidth part (BWP) of a first cell and a second maximum number of MIMO layers of a second BWP of a second cell. The wireless device receives, via the second BWP, a first transport block (TB) with a third number of MIMO layers less than or equal to the second maximum number. The wireless device switches to the first BWP of the first cell as an active BWP. The wireless device receives, via the second BWP, a second TB with a fourth number of MIMO layers based on the fourth number being less than or equal to the first maximum number based on the first maximum number being less than or equal to the second maximum number.

In an example, a wireless device receives configuration parameters comprising a first plurality of maximum numbers of MIMO layers for a first cell and a second plurality maximum numbers of MIMO layers for a second cell. The wireless device receives a command via a physical downlink control channel of the first cell, wherein the command indicates a first maximum number of the first plurality of maximum numbers of MIMO layers for a first BWP of the first cell and a second maximum number of the second plurality of maximum numbers of MIMO layers for a second BWP of the second cell. The wireless device receives, via the first BWP and based on the command, a first transport block with a third number of MIMO layers based on the third number being less than or equal to the first maximum number. The wireless device receives, via the second BWP and based on the command, a second transport block with a fourth number of MIMO layers based on the fourth number less than or equal to the second maximum number.

In an example, a wireless device receives configuration parameters comprising a first plurality of maximum numbers of MIMO layers for a first cell and a second plurality maximum numbers of MIMO layers for a second cell. The wireless device receives a downlink control information indicating a first maximum number of the first plurality of maximum numbers of MIMO layers for a first BWP of the first cell and a second maximum number of the second plurality of maximum numbers of MIMO layers for a second BWP of the second cell. The wireless device receives, via the first BWP, a first transport block with a third number of MIMO layers, the third number being less than or equal to the first maximum number. The wireless device receives, via the second BWP, a second transport block with a fourth number of MIMO layers, the fourth number being less than or equal to the second maximum number.

In an example, a wireless device receives configuration parameters comprising a first plurality of maximum numbers of MIMO layers for a first cell and a second plurality maximum numbers of MIMO layers for a second cell. The wireless device receives a downlink control information indicating a first maximum number of the first plurality of maximum numbers of MIMO layers for a first BWP of the first cell and a second maximum number of the second plurality of maximum numbers of MIMO layers for a second BWP of the second cell. The wireless device receives, based on the downlink control information, at least one transport block.

In an example, a wireless device receives configuration parameters of cells grouped into cell groups. The wireless device activates a first bandwidth part (BWP) of a first cell, wherein the first BWP is associated with a first maximum number of multiple input multiple output (MIMO) layers. The wireless device receives, via a second BWP of a second cell, transport block with a second number of MIMO layers, wherein the second number, based on the activating, is less than or equal to the first number, in response to the second cell and the first cell belonging to a same cell group of the cell groups.

According to an example embodiment, the wireless device receives, via a third BWP of a third cell, second transport block with a third number of MIMO layers, wherein the third number, based on the activating, is less than or equal to a fourth number configured on the third BWP, in response to the third cell and the first cell belonging to different cell groups of the plurality of cell groups.

Figure 39:
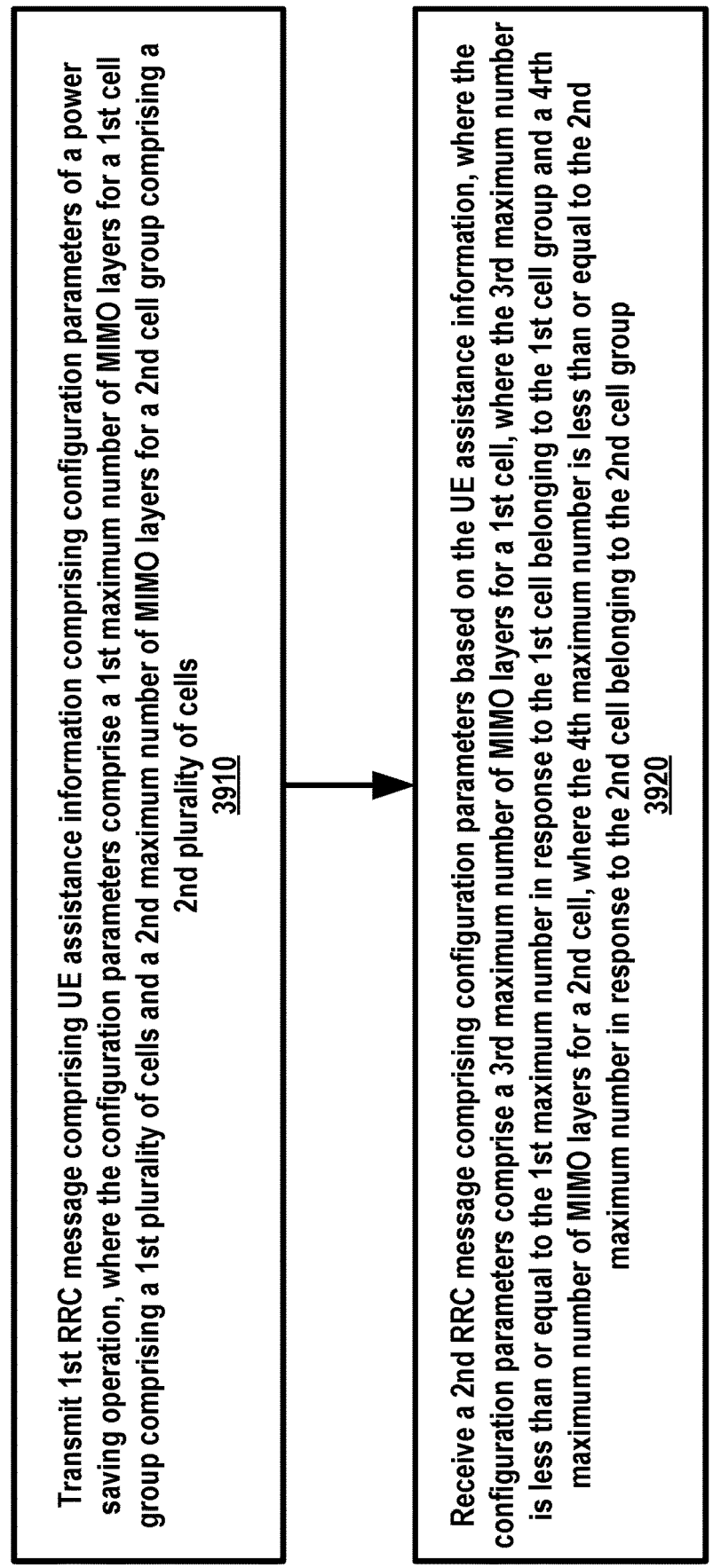
FIG. 39 is a flow diagram of MIMO layer adaptation, according to some embodiments.

FIG. 39 shows an example flowchart of MIMO layer adaptation as per an aspect of an example embodiment of the present disclosure. At 3910, a wireless device transmits to a base station first RRC message comprising wireless device assistance information comprising configuration parameters of a power saving operation, wherein the configuration parameters comprise a first maximum number of MIMO layers for a first cell group comprising a first plurality of cells and a second maximum number of MIMO layers for a second cell group comprising a second plurality of cells. At 3920, the wireless device receives a second RRC message comprising configuration parameters determined based on the wireless device assistance information, wherein the configuration parameters comprise a third maximum number of MIMO layers for a first cell, wherein the third maximum number is less than or equal to the first maximum number in response to the first cell belonging to the first cell group and a fourth maximum number of MIMO layers for a second cell, wherein the fourth maximum number is less than or equal to the second maximum number in response to the second cell belonging to the second cell group.

According to an example embodiment, the wireless device receives a first transport block, via the first cell with a fifth number of MIMO layers wherein the fifth number is less than or equal to the third maximum number. The wireless device receives a first transport block, via the second cell with a fifth number of MIMO layers wherein the fifth number is less than or equal to the fourth maximum number.

According to an example embodiment, the first plurality of cells are in a first frequency range. The second plurality of cells are in a second frequency range different from a first frequency range of the first plurality of cells.

According to an example embodiment, the wireless device assistance information further comprises second configuration parameters of overheating assistance information, wherein the second configuration parameters comprise a sixth maximum number for MIMO layers when the wireless device experiences internal overheating. The sixth maximum number is separately and independently configured from the first maximum number and the second maximum number.

In an example, a wireless device transmits assistance information comprising first configuration parameters of a power saving operation of the wireless device, wherein the configuration parameters comprise a first maximum number of multiple-input multiple-output (MIMO) layers for a first cell group and a second maximum number of MIMO layers for a second cell group. The wireless device receives second configuration parameters comprising a third maximum number of MIMO layers for a first cell of the first cell group, wherein the third maximum number is less than or equal to the first maximum number and a fourth maximum number of MIMO layers for a second cell of the second cell group, wherein fourth maximum number is less than or equal to the second maximum number.

In an example, a wireless device transmits assistance information comprising first configuration parameters comprising a first number of MIMO layers for a first cell group and a second number of MIMO layers for a second cell group. The wireless device receives second configuration parameters comprising a third number of MIMO layers for a first cell of the first cell group, wherein the third number is less than or equal to the first number and a fourth number of MIMO layers for a second cell of the second cell group, wherein fourth number is less than or equal to the second number.

Figure 40:
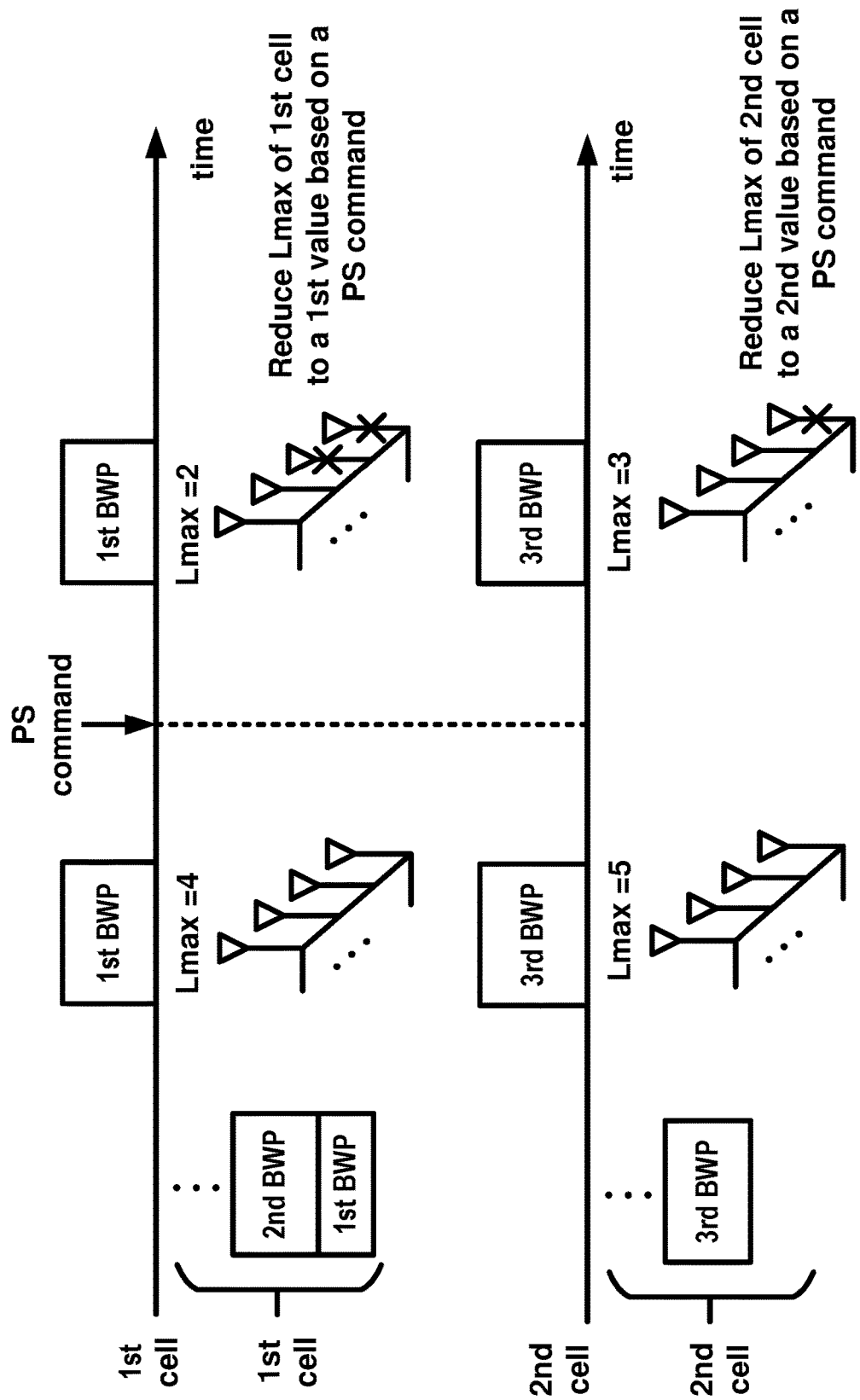
FIG. 40 illustrates MIMO layer adaptation in multiple cell groups, according to some embodiments.

FIG. 40 shows an example of a power saving command based MIMO layer adaptation in CA scenario. In the example of FIG. 40, a wireless device is equipped with a plurality of antennas. Based on the plurality of antennas, the wireless device may transmit to a base station one or more capability (or assistant) parameters in an RRC message (e.g., UE-NR-Capability IE, UE-MRDC-Capability IE, UEAssistanceInforrmation IE and the like) indicating a maximum value of MIMO layers (Lmax) the wireless device may process. The base station may transmit to the wireless device one or more RRC message (e.g., ServingCellConfig IE, PDSCH-Config IE, PDSCH-ServingCellConfig IE, and the like) comprising configuration parameters of a first cell and a second cell, the first cell comprising a first plurality of BWPs, and the second cell comprising a second plurality of BWPs. Based on the one or more capability (or assistant) parameters, each BWP of the first cell and the second cell may be configured with a BWP specific Lmax value, the BWP specific Lmax value being equal to or less than the maximum value of MIMO layers the wireless device indicates to the base station. In the example of FIG. 40, a first BWP ($1^{st}$ BWP) of the first cell is configured with Lmax (e.g., Lmax=4), and a third BWP (3rd BWP) of the second cell is configured with Lmax (e.g., Lmax=5). The first cell and the second cell may be in different frequency bands, or ranges. The wireless device may receive TBs via the first cell and the second cell with different sets of antennas, RF chains, and/or baseband processors.

In the example of FIG. 40, the wireless device may receive first TBs with at most Lmax=4 MIMO layers on the first BWP of the first cell, the first BWP being in active state. The wireless device may receive second TBs with at most Lmax=5 MIMO layers on the third BWP of the second cell, the third BWP being in active state.

In the example of FIG. 40, the wireless device may receive a power saving (PS) command via a power saving channel or a PDCCH, by implementing examples of FIG. 30A, FIG. 30B and/or FIG. 31. The PS command may comprise one or more bit fields indicating a first Lmax value (e.g., 2) for the first BWP and a second Lmax value (e.g., 3) for the third BWP. In response to receiving the PS command, the wireless device may reduce the Lmax (e.g., 4) configured on the first BWP to the first Lmax value (e.g., 2). The wireless device may switch off one or more antennas and/or RF chains of a first set of antennas and/or RF chains so that the wireless device may receive via the first BWP, TBs with at most the first Lmax of MIMO layers. In response to receiving the PS command, the wireless device may reduce the Lmax (e.g., 5) configured on the third BWP to the second Lmax value (e.g., 3). The wireless device may switch off one or more antennas and/or RF chains of a second set of antennas and/or RF chains so that the wireless device may receive via the third BWP, TBs with at most the second Lmax of MIMO layers. Example embodiments may separately or independently change Lmax values for different active BWPs of different cells, based on a power saving command's indication. With the extra power saving command indication, the base station may flexibly control power consumption of a wireless device and at the same time maintain acceptable throughput for the wireless device.

In an example, the PS command (e.g., via a DCI or an RRC message) in FIG. 40 may indicate whether a Lmax value for the first BWP of the first cell is applicable for the third BWP of the second cell. In an example, in response to the PS command indicating the Lmax value for the first BWP of the first cell is applicable for the third BWP of the second cell, the wireless device may reduce Lmax of the third BWP of the second cell to the Lmax value of the first BWP of the first cell. In an example, in response to the PS command indicating the Lmax value for the first BWP of the first cell is not applicable for the third BWP of the second cell, the wireless device may maintain Lmax value of the third BWP of the second cell as it is.

In an example, the PS command (e.g., via a DCI or an RRC message) in FIG. 40 may indicate BWP switching for the first cell and the second cell. The PS command may indicate switching from the $1^{st}$ BWP of the first cell to a $2^{nd}$ BWP (e.g., a default BWP, or a dormant BWP) of the first cell. The PS command may further indicate switching from the 3rd BWP to a 4th BWP (e.g., a default BWP, or a dormant BWP) of the second cell. In an example, the $2^{nd}$ BWP of the first cell and the 4th BWP of the second cell may be configured with a same Lmax value. Based on the same Lmax value for the two BWPs, the wireless device may switch off one or more antennas and/or RF chains after switching active BWPs for the first cell and the second cell.

In an example, the $2^{nd}$ BWP of the first cell and the 4th BWP of the second cell may be configured with different Lmax values, the $2^{nd}$ BWP having a smaller Lmax value. In response to the switching active BWPs for the first cell and the second cell, the wireless device may apply Lmax value of the $2^{nd}$ BWP of the first cell to the 4th BWP of the second cell. In an example, the PS command may indicate the Lmax value for the $2^{nd}$ BWP of the first cell is applicable for the 4th BWP of the second cell. In response to the PS command indicating the Lmax value of the $2^{nd}$ BWP of the first cell is applicable for the 4th BWP of the second cell, the wireless device may reduce Lmax of the 4th BWP of the second cell to the Lmax value of the $2^{nd}$ BWP of the first cell. In an example, in response to the PS command indicating the Lmax value for the $2^{nd}$ BWP of the first cell is not applicable for the 4th BWP of the second cell, the wireless device may maintain Lmax value of the 4th BWP of the second cell as it is.

In an example, indication of Lmax for each cell may increase signaling overhead, especially when a large number (e.g., 31) of cells are configured and activated in the system. Example embodiments of FIG. 40 may be extended to cell groups, each cell group comprising a plurality of cells.

Figure 41:
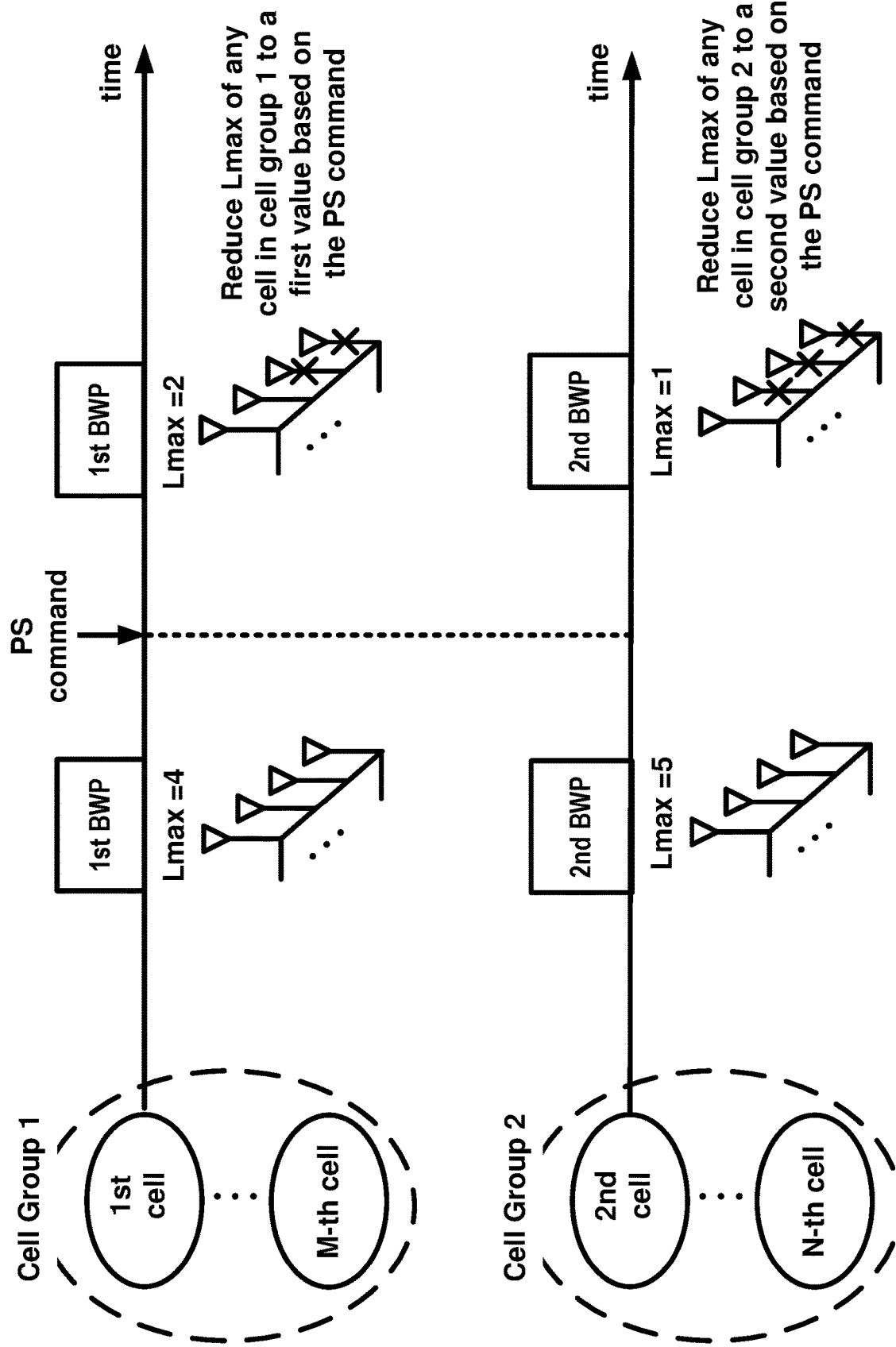
FIG. 41 illustrates MIMO layer adaptation in multiple cell groups, according to some embodiments.

FIG. 41 shows an example of cell group based MIMO layer adaptation when a power saving command is received by a wireless device. In the example of FIG. 41, a wireless device may receive from a base station one or more RRC messages comprising configuration parameters of a plurality of cells grouped into a plurality of cell groups. The base station may group the plurality of cells based on one or more criteria comprising at least one of: a timing advance value, a frequency band, a frequency range, a radio interface type (e.g., Uu interface or sidelink interface), and the like. In an example, a first cell and a second cell may belong to a same cell group in response to at least one of: the first cell and the second cell having a same timing advance value, the first cell and the second cell being in a same frequency band, the first cell and the second cell being in a same frequency range, the first cell and the second cell both being for an Uu interface between a wireless device and a base station. In an example, a first cell and a second cell may belong to different cell groups in response to at least one of: the first cell and the second cell having different timing advance values, the first cell and the second cell being in different frequency bands, the first cell and the second cell being in different frequency ranges, the first cell being for an Uu interface and the second cell being for V2X interface or vice versa.

In the example of FIG. 41, the wireless device may operate on a first BWP (e.g., $1^{st}$ BWP) of a first cell belonging to a first cell group, where the wireless device may be configured with a first Lmax (e.g., Lmax=4) for the first BWP. The wireless device may receive via the first BWP, TBs with at most the first Lmax MIMO layers. The wireless device may operate on a second BWP (e.g., $2^{nd}$ BWP) of a second cell belonging to a second cell group, where the wireless device may be configured with a second Lmax (e.g., Lmax=5) for the second BWP. The wireless device may receive via the second BWP, TBs with at most the second Lmax MIMO layers.

In the example of FIG. 41, the wireless device may receive a power saving (PS) command via a power saving channel or a PDCCH, by implementing examples of FIG. 30A, FIG. 30B and/or FIG. 31. The PS command may comprise one or more bit fields indicating a third Lmax value (e.g., 2) for the first BWP and a fourth Lmax value (e.g., 1) for the second BWP. The third Lmax value is applied on any active cell in the first cell group. The fourth Lmax value is applied on any active cell in the second cell group.

In response to receiving the PS command, the wireless device may reduce a Lmax value configured on any active BWP of any active cell in the first cell group to the third Lmax value (e.g., 2), if applicable. The wireless device may switch off one or more antennas and/or RF chains of a first set of antennas and/or RF chains so that the wireless device may receive via the first BWP, or any active BWP of any active cell in the first cell group, TBs with at most the third Lmax of MIMO layers.

In response to receiving the PS command, the wireless device may reduce a Lmax value configured on any active BWP of any active cell in the second cell group to the fourth Lmax value (e.g., 1), if applicable. The wireless device may switch off one or more antennas and/or RF chains of a second set of antennas and/or RF chains so that the wireless device may receive via the second BWP, or any active BWP of any active cell in the second cell group, TBs with at most the fourth Lmax of MIMO layers. Example embodiments may separately or independently change Lmax values for different cells from different cell groups, based on a power saving command's indication. With the extra power saving command indication, the base station may flexibly control power consumption of a wireless device and at the same time maintain acceptable throughput for the wireless device.

Figure 42:
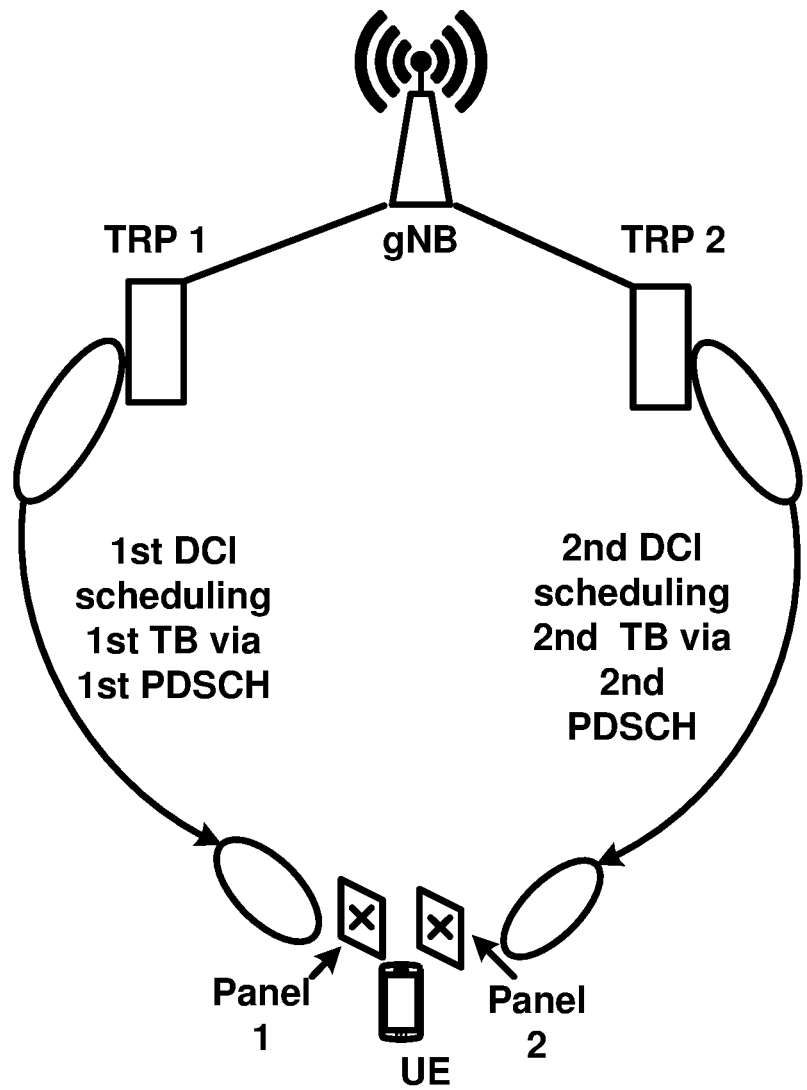
FIG. 42 illustrates multiple TRPs/panels configuration, according to some embodiments.

FIG. 42 shows an example of transmission and reception with multiple transmission reception points (TRPs) and/or multiple panels. In an example, a base station (e.g., gNB) may be equipped with more than one TRP (e.g., TRP 1 and TRP 2). A wireless device (e.g., UE) may be equipped with more than one panel (e.g., Panel 1 and Panel 2). Transmission and reception with multiple TRPs and/or multiple panels may improve system throughput and/or transmission robustness for a wireless communication in a high frequency (e.g., above 6 GHz). In an example, a TRP of multiple TRPs of the base station may be identified by at least one of: a TRP identifier (ID), a cell index, or a reference signal index. In an example, a TRP ID of a TRP may comprise a control resource set group index of a control resource set group from which a DCI is transmitted from the base station on a control resource set. In an example, a TRP ID of a TRP may comprise a TRP index indicated in the DCI. In an example, a TRP ID of a TRP may comprise a TCI state group index of a TCI state group. A TCI state group may comprise at least one TCI state with which the wireless device receives the downlink TBs, or with which the base station transmits the downlink TBs.

In existing technologies, a wireless device may transmit, to a base station, a wireless device capability information indicating a number of maximum MIMO layers the wireless device supports for receiving PDSCH on a cell. The base station may transmit to the wireless device, based on the wireless device capability information, an RRC message comprising configuration parameters of the cell, the configuration parameters comprising a cell specific number (e.g., Lmax) of maximum MIMO layers for the cell. The wireless device may apply the cell specific number of maximum MIMO layers for receiving PDSCH data via the cell. Different cell may be associated with different cell specific number of maximum MIMO layers.

In an example, a wireless device may be equipped with multiple panels. A base station may be equipped with multiple TRPs. Different panel or different TRP may be used for data transmission with different MIMO layers. The wireless device, based on the existing technologies, may assume (or determine) that Lmax for each TRP (or panel) of a plurality of TRPs (or panels) of the cell is same as the cell specific number of maximum MIMO layers. The base station, based on the wireless device capability information indicating the number of maximum MIMO layers the wireless device supports for receiving PDSCH on the cell, may determine that the cell specific number of maximum MIMO layers are applied on each TRP or panel of the cell. However, a wireless device may support different number of MIMO layers for different TRP or panel. The base station, based on existing technologies, may not enable to configure a TRP/panel specific number of maximum MIMO layers for a wireless device although the wireless device is capable of processing PDSCHs with different number of maximum MIMO layers for different TRPs/panels of a cell. This may restrict the base station from flexibly configuring maximum MIMO layers for different TRPs/panels of the cell. Lacking flexible configuration of maximum MIMO layers per TRP/panel for a cell may increase power consumption of the wireless device, e.g., where the wireless device assumes that the number of maximum MIMO layers are same for all TRPs/panels of the cell. The wireless device may not be enabled to switch off some antenna modules (e.g., for power saving) when using different panels for receiving data or receiving data from different TRPs of a base station. There is a need to improve power consumption for MIMO layer adaptation for a cell when the cell comprises a plurality of TRPs/panels.

In an example, one of example embodiments may comprise transmitting by a wireless device one or more capability information comprising a TRP/panel specific number of maximum MIMO layers for a TRP/panel of a plurality of TRPs/panels of a BWP/cell. The one or more capability information may comprise a first number of maximum MIMO layers for a first TRP/panel of the plurality of TRPs/panels and a second number of maximum MIMO layers for a second TRP/panel of the plurality of TRPs/panels.

In an example, one of example embodiments may comprise transmitting by a wireless device one or more UE assistance information comprising a TRP/panel specific number of maximum MIMO layers for a TRP/panel of a plurality of TRPs/panels of a BWP/cell. The one or more UE assistance information may comprise a first number of maximum MIMO layers for a first TRP/panel of the plurality of TRPs/panels and a second number of maximum MIMO layers for a second TRP/panel of the plurality of TRPs/panels.

In an example, one of example embodiments may comprise transmitting by a base station one or more RRC message comprising configuration parameters of a cell, the configuration parameters comprising a TRP/panel specific number of maximum MIMO layers for a TRP/panel of a plurality of TRPs/panels of a BWP/cell. The configuration parameters may comprise a first number of maximum MIMO layers for a first TRP/panel of the plurality of TRPs/panels and a second number of maximum MIMO layers for a second TRP/panel of the plurality of TRPs/panels.

In an example, one of example embodiments may comprise transmitting by a base station a DCI comprising a TRP/panel specific number of maximum MIMO layers for a TRP/panel of a plurality of TRPs/panels of a cell. The DCI may comprise a first number of maximum MIMO layers for a first TRP/panel of the plurality of TRPs/panels and a second number of maximum MIMO layers for a second TRP/panel of the plurality of TRPs/panels. Example embodiments may improve power consumption of a wireless device equipped with multiple panels when communicating with a base station equipped with multiple TRPs.

Figure 43:
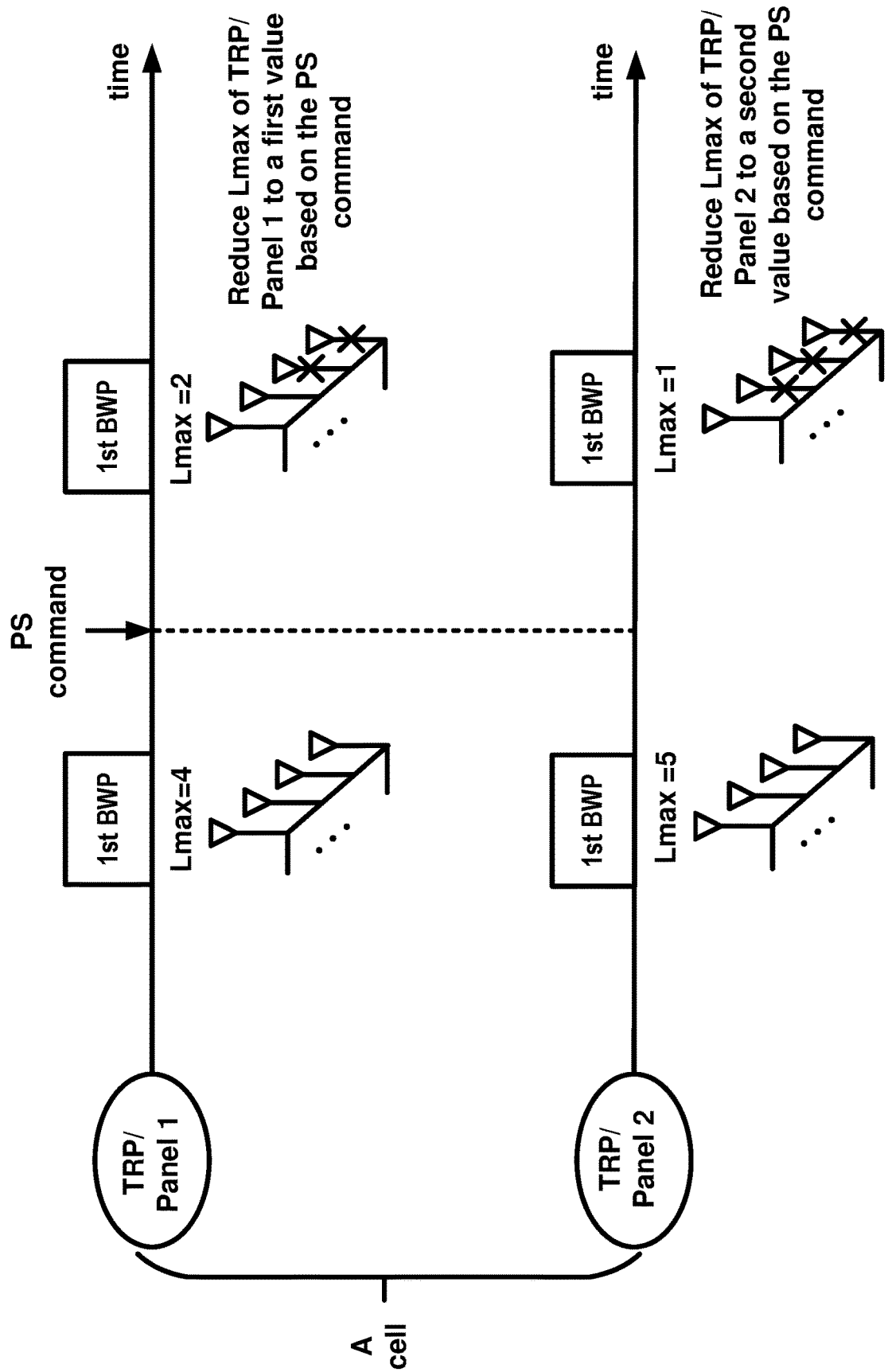
FIG. 43 illustrates MIMO layer adaptation when multiple TRPs/panels are configured, according to some embodiments.

FIG. 43 shows an example of MIMO adaptation when multiple TRPs or panels are configured. In the example of FIG. 43, a wireless device is equipped with a plurality of panels, each panel comprising a plurality of antennas. Based on the plurality of panels and the plurality of antennas, the wireless device may transmit to a base station one or more capability (or assistant) parameters in an RRC message (e.g., UE-NR-Capability IE, UE-MRDC-Capability IE, UEAssistanceInforrmation IE and the like) indicating a maximum value of MIMO layers (Lmax) the wireless device may process on each panel of the plurality of panels. The base station may transmit to the wireless device one or more RRC message (e.g., ServingCellConfig IE, PDSCH-Config IE, PDSCH-ServingCellConfig IE, and the like) comprising configuration parameters of a first TRP and a second TRP of a cell. Based on the one or more capability (or assistant) parameters, each TRP of the cell may be configured with a TRP specific Lmax value. The TRP specific Lmax value may be equal to or less than the maximum value of MIMO layers for the TRP the wireless device indicates to the base station. In the example of FIG. 43, a first TRP of the cell is configured with a first Lmax value (e.g., Lmax=4), and a second TRP of the cell is configured with a second Lmax value (e.g., Lmax=5). Configuring each TRP with a TRP specific Lmax value may improve power consumption of the wireless device. In the example of FIG. 43, the wireless device may receive first TBs with at most Lmax=4 MIMO layers on the first TRP of the cell via a first BWP of the cell, the first BWP being in active state. The wireless device may receive second TBs with at most Lmax=5 MIMO layers on the second TRP of the cell via the first BWP of the cell.

In the example of FIG. 43, the wireless device may receive a power saving (PS) command via a power saving channel or a PDCCH, by implementing examples of FIG. 30A, FIG. 30B and/or FIG. 31. The PS command may comprise one or more bit fields indicating a third Lmax value (e.g., 2) for the first TRP and the second TRP In response to receiving the PS command, the wireless device may reduce a Lmax value (e.g., the first Lmax) configured on the first TRP to the third Lmax value (e.g., 2). The wireless device may switch off one or more antennas and/or RF chains of a first set of antennas and/or RF chains so that the wireless device may receive via the first BWP, TBs with at most the third Lmax of MIMO layers on the first TRP.

In response to receiving the PS command, the wireless device may reduce a Lmax value (e.g., the second Lmax) configured on the second TRP to the third Lmax value (e.g., 2). The wireless device may switch off one or more antennas and/or RF chains of a second set of antennas and/or RF chains so that the wireless device may receive via the first BWP, TBs with at most the third Lmax of MIMO layers on the second TRP.

In the example of FIG. 43, the wireless device may receive a power saving (PS) command via a power saving channel or a PDCCH, by implementing examples of FIG. 30A, FIG. 30B and/or FIG. 31. The PS command may comprise one or more bit fields indicating a third Lmax value (e.g., 2) for the first TRP and a fourth Lmax value (e.g., 1) for the second TRP.

In response to receiving the PS command, the wireless device may reduce a Lmax value (e.g., the first Lmax) configured on the first TRP to the third Lmax value (e.g., 2). The wireless device may switch off one or more antennas and/or RF chains of a first set of antennas and/or RF chains so that the wireless device may receive via the first BWP, TBs with at most the third Lmax of MIMO layers on the first TRP.

In response to receiving the PS command, the wireless device may reduce a Lmax value (e.g., the second Lmax) configured on the second TRP to the fourth Lmax value (e.g., 1). The wireless device may switch off one or more antennas and/or RF chains of a second set of antennas and/or RF chains so that the wireless device may receive via the first BWP, TBs with at most the fourth Lmax of MIMO layers on the second TRP. Example embodiments may separately or independently change Lmax values for different TRPs of a cell, based on a power saving command's indication. With the extra power saving command indication, the base station may flexibly control power consumption of a wireless device and at the same time maintain acceptable throughput for the wireless device.

Figure 44:
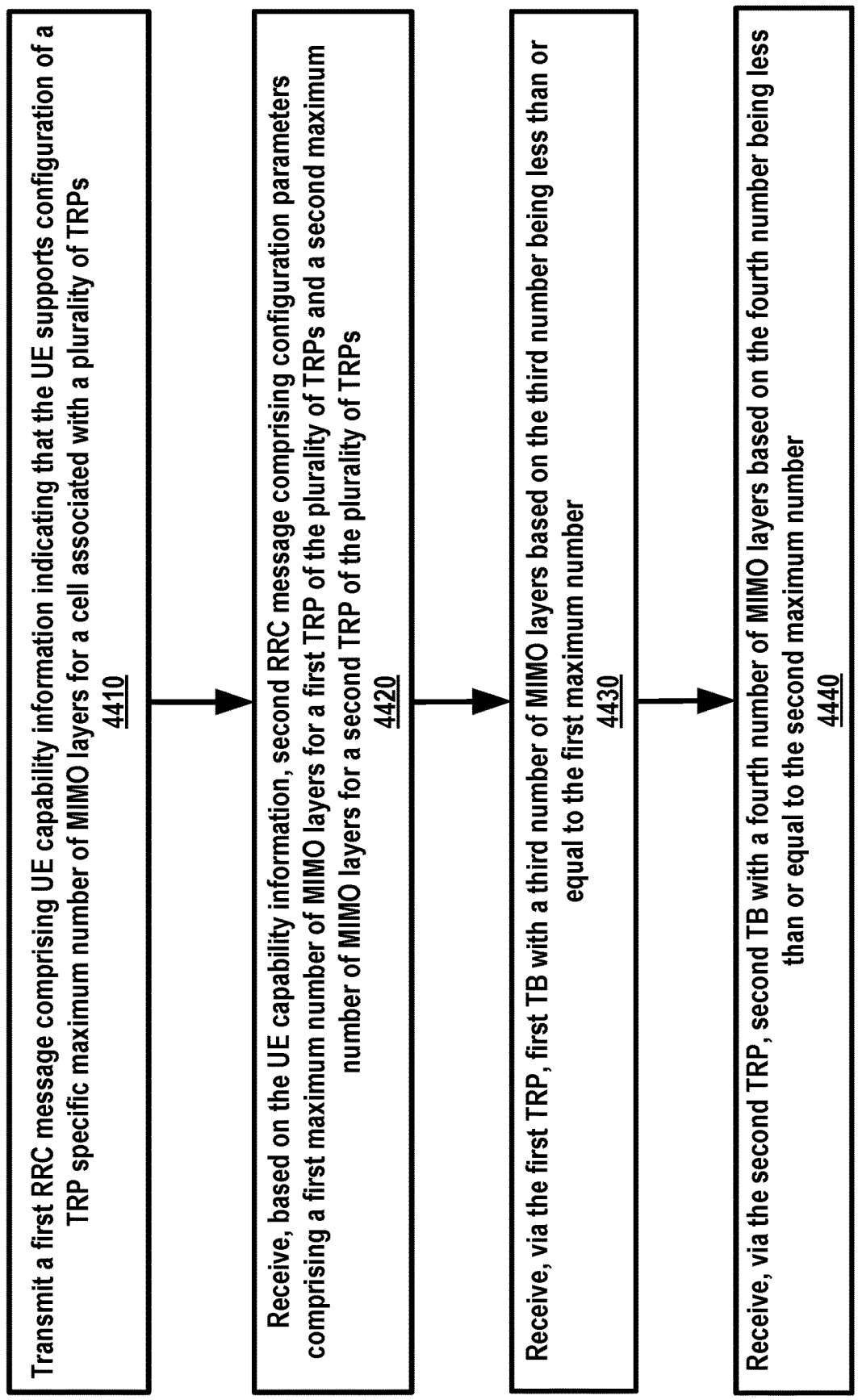
FIG. 44 is a flow diagram of MIMO layer adaptation, according to some embodiments.

FIG. 44 shows an example flowchart of MIMO adaptation with multiple TRPs/panels as per an aspect of an example embodiment of the present disclosure. At 4410, a wireless device transmits first RRC message comprising a wireless device capability information indicating that the wireless device supports configuration of a TRP specific maximum number of MIMO layers for a cell associated with a plurality of TRPs. At 4420, the wireless device receives, based on the capability information, second RRC message comprising configuration parameters comprising a first maximum number of MIMO layers for a first TRP of the plurality of TRPs and a second maximum number of MIMO layers for a second TRP of the plurality of TRPs. A 4430, the wireless device receives, via the first TRP of the cell, first TB with a third number of MIMO layers being less than or equal to the first maximum number. At 4440, the wireless device, via the second TRP of the cell, second TB with a fourth number of MIMO layers being less than or equal to the second maximum number.

In an example, a wireless device transmits capability information indicating that the wireless device supports configuration of a transmission reception point (TRP) specific number of MIMO layers for a cell associated with a first TRP and a second TRP. The wireless device receives, based on the capability information, a second RRC message comprising configuration parameters comprising a first number of MIMO layers for the first TRP and a second number of MIMO layers for the second TRP. The wireless device receives, via the first TRP, first transport block (TB) with a third number of MIMO layers, the third number being less than or equal to the first number. The wireless device receives, via the second TRP, second TB with a fourth number of MIMO layers, the fourth number being less than or equal to the second number.

In an example, a wireless device transmits capability information indicating that the wireless device supports configuration of a transmission reception point (TRP) specific number of MIMO layers for a cell associated with a first TRP and a second TRP. The wireless device receives, based on the capability information, a second configuration parameters comprising a first number of MIMO layers for the first TRP and a second number of MIMO layers for the second TRP. The wireless device receives, via the first TRP and the second TRP and based on the second configuration parameters, transport blocks.

In an example, a wireless device receives configuration parameters of a plurality of transmission and reception points (TRPs) of a cell. receiving a command indicating a first maximum number of multiple input multiple output (MIMO) layers for a first TRP of the plurality of TRPs and a second maximum number of MIMO layers for a second TRP of the plurality of TRP. The wireless device receives, via the first TRP, first transport blocks with a third number of MIMO layers, wherein the third number is less than or equal to the first maximum number. The wireless device receives, via the second TRP, second transport blocks with a fourth number of MIMO layers, wherein the fourth number is less than or equal to the second maximum number.

In an example, a wireless device receives a downlink command indicating a first number of multiple input multiple output (MIMO) layers for a first transmission and reception point (TRP) of a cell and a second number of MIMO layers for a second TRP of the cell. The wireless device receives, via the first TRP, first transport blocks with a third number of MIMO layers, the third number being less than or equal to the first number. The wireless device receives, via the second TRP, second transport blocks with a fourth number of MIMO layers, the fourth number being less than or equal to the second number.

According to an example embodiment, the command comprises at least one of: a downlink control information via a physical downlink control channel, a MAC CE, and radio resource control message.

In an example, a wireless device may receive from a base station, via a PDCCH, a DCI with CRC scrambled by a configured scheduling-Radio Network Temporary Identifier (CS-RNTI) value, the CS-RNTI value being dedicatedly configured for activation/deactivation of a semi-persistent scheduling (SPS) or a configured grant (CG). The CS-RNTI value is separately and/or independently configured from a C-RNTI value used for dynamic downlink assignment or uplink grant. The DCI with CRC scrambled by the CS-RNTI value may indicate an activation or deactivation of downlink transmission over a SPS. The DCI may indicate a number of MIMO layers for the downlink transmission of the SPS.

In response to receiving the DCI activating a SPS, the wireless device may receive TBs with the number of MIMO layers, and/or with a modulation and coding scheme (MCS) indicated in the DCI. The wireless device may receive TBs on radio resources occurring based on downlink assignment indicated in the DCI. The wireless device may keep receiving downlink TBs until receiving a second DCI indicating a deactivation of the SPS.

In an example, during the reception of the TBs of the activated SPS, the wireless device may receive a command indicating a change of Lmax to a first Lmax value, e.g., by implementing examples of FIG. 32A and/or FIG. 32B.

In existing technologies, the wireless device may apply the first Lmax value for receiving downlink packet via PDSCH. In an example, the number of MIMO layers associated with the activated SPS may be bigger than the first Lmax value changed by the command. The wireless device, by implementing existing technologies, may increase power consumption, e.g., by keeping receiving downlink packet with the number of MIMO layers, the number being greater than the first Lmax value. The base station may determine (e.g., without coordination with the wireless device) that the wireless device is applying the first Lmax value for receiving the downlink packet. That may cause misalignment between the base station and the wireless device. Misalignment on the number of MIMO layers for downlink reception may reduce downlink transmission throughput, increase downlink signaling overhead, and/or increase power consumption of the wireless device. There is a need to improve SPS reception of the wireless device when maximum MIMO layers are adapted dynamically on an active BWP. One of example embodiments may comprise ignoring the command for Lmax changing and continuing SPS reception with the original number of MIMO layers. This example may improve SPS transmission latency, e.g., when the SPS transmission is carrying URLLC packets. One of example embodiments may comprise applying the changed Lmax and deactivating/suspending the activated SPS. Example embodiments may improve power consumption of the wireless device.

In an example, in response to receiving the command, the wireless device may determine to ignore the command in response to the first Lmax value being smaller than the number for the reception of SPS. In an example, ignoring the command may comprise not switch off one or more antennas and/or RF chains. Ignoring the command may comprising keep the number for the reception of SPS unchanged. Ignoring the command when the first Lmax value being smaller than the number may improve system throughput.

In an example, in response to receiving the command, the wireless device may determine to apply the first Lmax value for an active BWP. By applying the first Lmax value for the active BWP, the wireless device may deactivate the activated SPS in response to the first Lmax value being smaller than the number. Deactivating the SPS may reduce power consumption of the wireless device. By deactivating the SPS, the base station may reallocate the radio resources for other wireless devices, therefore improve downlink system throughputs. The base station, by transmitting another DCI, may reactivate the deactivated SPS with new number of MIMO layers, the new number being equal to or less than the first Lmax value.

In an example, when the first Lmax value is equal to or greater than the number for reception of SPS, the wireless device may maintain an activated state of the SPS, and continue reception of TBs over radio resource occurring based on the SPS configuration.

Figure 45:
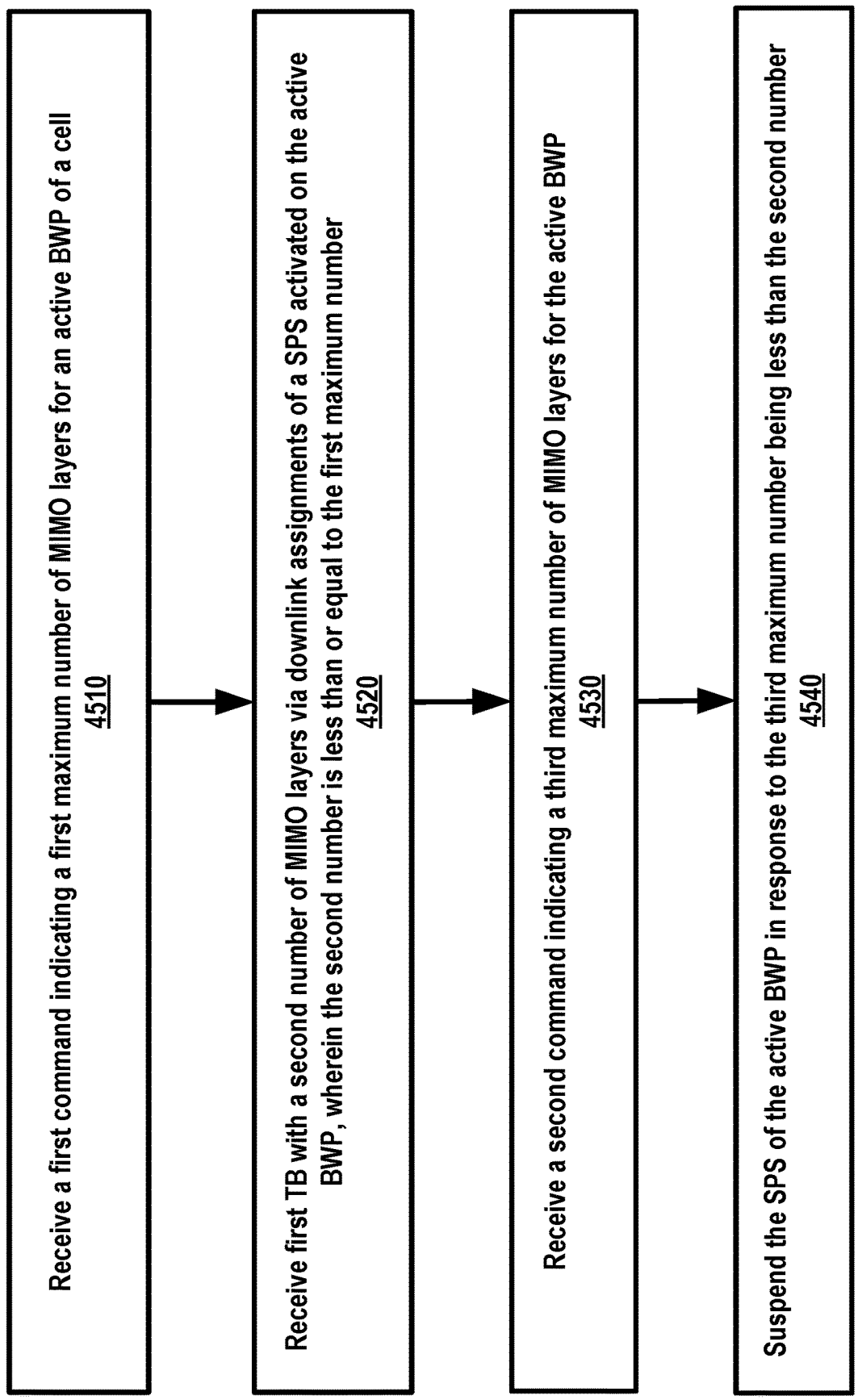
FIG. 45 is a flow diagram of MIMO layer adaptation, according to some embodiments.

FIG. 45 shows an example flowchart for MIMO layer adaptation for SPS transmission as per an aspect of an example embodiment of the present disclosure. At 4510, a wireless device receives a first command indicating a first number of maximum MIMO layers for an active BWP of a cell. At 4520, the wireless device receives first transport block with a second number of MIMO layers via downlink assignments of a SPS activated on the active BWP, wherein the second number is less than or equal to the first number. At 4530, the wireless device receives a second command indicating a third number of maximum MIMO layers for the active BWP. At 4540, the wireless device suspends the SPS of the active BWP in response to the third number being less than the second number.

According to an example embodiment, the wireless device maintains configuration parameters of the SPS for the active BWP based on the suspending the SPS. The wireless device stops receiving second transport block via the downlink assignments of the SPS based on the suspending the SPS.

According to an example embodiment, the wireless device activates the SPS in response to receiving a downlink control information indicating the activating the SPS.

In an example, a wireless device receives a first command indicating a first maximum number of MIMO layers for an active BWP of a cell. The wireless device receives first transport block with a second number of MIMO layers via downlink assignments of a SPS activated on the active BWP, wherein the second number is less than or equal to the first maximum number. The wireless device receives a second command indicating a third maximum number of MIMO layers for the active BWP. The wireless device deactivates the SPS of the active BWP in response to the third maximum number being less than the second number, in response to deactivating the SPS, the wireless device receives stop receiving second transport block via the downlink assignments of the SPS.

In an example, a wireless device receives a first command indicating a first maximum number of MIMO layers for a BWP of a cell. The wireless device receives first transport block with a second number of MIMO layers via downlink assignments of a SPS on the BWP, wherein the second number is less than or equal to the first maximum number. The wireless device receives a second command indicating a third maximum number of MIMO layers for the BWP. The wireless device deactivates the SPS in response to the third maximum number being less than the second number. releasing configuration parameters of the SPS for the active BWP. According to an example embodiment, the downlink assignments of the SPS comprise one or more periodic radio resources on the BWP. The wireless device activates the SPS in response to receiving a downlink control information indicating the activating the SPS. The first command comprises a downlink control information via a physical downlink control channel. The second command comprises a downlink control information via a physical downlink control channel.

In an example, a wireless device may receive one or more RRC messages comprising configuration parameters of a first cell and a second cell, the configuration parameters comprising a first number of MIMO layers of a first BWP of the first cell and a second number of MIMO layers of a second BWP of the second cell. The wireless device may receive, via the second BWP of the second cell, first TBs with no more than the second number of MIMO layers. The wireless device may switch an active BWP of the first cell to the first BWP of the first cell. The wireless device, in response to the switching, may select a third number, from the first number and the second number based on whether the first number is less than or equal to the second number. The wireless device may receive, via the second BWP of the second cell, second TBs with no more than the third number of MIMO layers.

In an example, a wireless device may receive configuration parameters comprising a first plurality of numbers of MIMO layers for a first cell and a second plurality of numbers of MIMO layers for a second cell. The wireless device may receive a power saving command via a downlink control channel of the first cell, wherein the power saving command indicates a first number of the first plurality of numbers for a first active BWP of the first cell and a second number of the second plurality of numbers for a second active BWP of the second cell. The wireless device may receive, via the first active BWP, first TBs with at most the first number of MIMO layers. The wireless device may receive, via the second active BWP, second TBs with at most the second number of MIMO layers.

In an example, a wireless device may receive configuration parameters of a plurality of cells grouped into a first cell group and a second cell group. The wireless device may switch to a first BWP of a first cell as an active BWP of the first cell, where the first BWP is configured with a first number of MIMO layers and the first cell belongs to the first cell group. The wireless device may receive, via a second BWP of a second cell, TBs with at most a second number of MIMO layers, wherein the second number, based on the switching, equals to the first number, in response to the second cell belonging to the first cell group. The wireless device may receive, via the second BWP of a second cell, the TBs with at most the second number of MIMO layers, wherein the second number, equals to a third number configured on the second BWP, in response to the second cell belonging to the second cell group.

In an example, a wireless device may receive configuration parameters of a plurality of TRPs of a cell. The wireless device may receive a power saving command via a downlink control channel of the cell, the power saving command indicating a first number of MIMO layers for a first TRP of the plurality of TRPs and a second number of MIMO layers for a second TRP of the plurality of TRPs. The wireless device, based on the power saving command, may receive, via the first TRP, first TBs with at most the first number of MIMO layers. The wireless device, based on the power saving command, may receive, via the second TRP, second TBs with at most the second number of MIMO layers.

In an example, a wireless device may receive first TBs with a first number of MIMO layers via downlink assignments of a semi-persistent scheduling (SPS) activated on an active BWP. The wireless device may receive a command indicating a second number of MIMO layers for the active BWP. The wireless device may deactivate the SPS of the active BWP in response to the second number being less than he first number. The wireless device may stop, in response to deactivating the SPS, receiving second TBs via the downlink assignments of the SPS.

What is claimed is:

1. A method comprising:
   transmitting, by a wireless device to a base station, one or more first radio resource control (RRC) messages comprising wireless device capability information comprising one or more maximum numbers of multiple-input multiple-output (MIMO) layers for reception of a physical downlink shared channel (PDSCH), of a cell, scheduled by downlink control information (DCI) from each transmit/receive point (TRP) of a plurality of TRPs of the cell;
   receiving, from the base station, one or more second RRC messages comprising one or more parameters indicating a first number of MIMO layers, for a first TRP of the plurality of TRPs of the cell, wherein the first number of MIMO layers is equal to or less than a first maximum number of MIMO layers, of the one or more maximum numbers of MIMO layers, corresponding to the first TRP; and
   receiving, from the base station, one or more transport blocks with a second number of MIMO layers, wherein the second number is equal to or less than the first number.

2. The method of claim 1, wherein:
   the one or more transport blocks are scheduled by a first DCI via a control resource set associated with the first TRP; and
   the control resource set associated with the first TRP is different from a second control resource set associated with a second TRP of the plurality of TRPs.

3. The method of claim 2, wherein:
   the wireless device receives the first DCI via the control resource set associated with the first TRP; and
   the first DCI comprises a DCI field indicating the second number.

4. The method of claim 1, wherein:
   the one or more parameters further indicate a third number of MIMO layers, for a second TRP of the plurality of TRPs of the cell; and
   the third number is equal to or less than a second maximum number of MIMO layers, of the one or more maximum numbers of MIMO layers, corresponding to the second TRP.

5. The method of claim 4, wherein the third number is different from the first number.

6. The method of claim 4, further comprising receiving one or more second transport blocks with a fourth number of MIMO layers, wherein the fourth number is equal to or less than the third number.

7. The method of claim 6, wherein the one or more second transport blocks are scheduled by a second DCI via a control resource set associated with the second TRP.

8. A wireless device comprising:
   one or more processors; and
   memory storing instructions that, when executed by the one or more processors, causes the wireless device to:
      transmit, to a base station, one or more first radio resource control (RRC) messages comprising wireless device capability information comprising one or more maximum numbers of multiple-input multiple-output (MIMO) layers for reception of a physical downlink shared channel (PDSCH), of a cell, scheduled by downlink control information (DCI) from each transmit/receive point (TRP) of a plurality of TRPs of the cell;
      receive, from the base station, one or more second RRC messages comprising one or more parameters indicating a first number of MIMO layers, for a first TRP of the plurality of TRPs of the cell, wherein the first number of MIMO layers is equal to or less than a first maximum number of MIMO layers, of the one or more maximum numbers of MIMO layers, corresponding to the first TRP; and
      receive, from the base station, one or more transport blocks with a second number of MIMO layers, wherein the second number is equal to or less than the first number.

9. The wireless device of claim 8, wherein:
   the one or more transport blocks are scheduled by a first DCI via a control resource set associated with the first TRP; and
   the control resource set associated with the first TRP is different from a second control resource set associated with a second TRP of the plurality of TRPs.

10. The wireless device of claim 9, wherein:
    the wireless device receives the first DCI via the control resource set associated with the first TRP; and
    the first DCI comprises a DCI field indicating the second number.

11. The wireless device of claim 8, wherein:
    the one or more parameters further indicate a third number of MIMO layers, for a second TRP of the plurality of TRPs of the cell; and
    the third number is equal to or less than a second maximum number of MIMO layers, of the one or more maximum numbers of MIMO layers, corresponding to the second TRP.

12. The wireless device of claim 11, wherein the third number is different from the first number.

13. The wireless device of claim 11, wherein:
    the instructions further cause the wireless device to receive one or more second transport blocks with a fourth number of MIMO layers; and
    the fourth number is equal to or less than the third number.

14. The wireless device of claim 13, wherein the one or more second transport blocks are scheduled by a second DCI via a control resource set associated with the second TRP.

15. A non-transitory computer-readable medium comprising instructions that, when executed by one or more processors of a wireless device, cause the wireless device to:
    transmit, to a base station, one or more first radio resource control (RRC) messages comprising wireless device capability information comprising one or more maximum numbers of multiple-input multiple-output (MIMO) layers for reception of a physical downlink shared channel (PDSCH), of a cell, scheduled by downlink control information (DCI) from each transmit/receive point (TRP) of a plurality of TRPs of the cell;

receive, from the base station, one or more second RRC messages comprising one or more parameters indicating a first number of MIMO layers, for a first TRP of the plurality of TRPs of the cell, wherein the first number of MIMO layers is equal to or less than a first maximum number of MIMO layers, of the one or more maximum numbers of MIMO layers, corresponding to the first TRP; and receive, from the base station, one or more transport blocks with a second number of MIMO layers, wherein the second number is equal to or less than the first number.

16. The non-transitory computer-readable medium of claim 15, wherein:
the one or more transport blocks are scheduled by a first DCI via a control resource set associated with the first TRP; and
the control resource set associated with the first TRP is different from a second control resource set associated with a second TRP of the plurality of TRPs.

17. The non-transitory computer-readable medium of claim 16, wherein:
the wireless device receives the first DCI via the control resource set associated with the first TRP; and
the first DCI comprises a DCI field indicating the second number.

18. The non-transitory computer-readable medium of claim 15, wherein:
the one or more parameters further indicate a third number of MIMO layers, for a second TRP of the plurality of TRPs of the cell; and
the third number is equal to or less than a second maximum number of MIMO layers, of the one or more maximum numbers of MIMO layers, corresponding to the second TRP.

19. The non-transitory computer-readable medium of claim 18, wherein the third number is different from the first number.

20. The non-transitory computer-readable medium of claim 18, wherein:
the instructions further cause the wireless device to receive one or more second transport blocks with a fourth number of MIMO layers; and
the fourth number is equal to or less than the third number.

* * * * *